(12) United States Patent
Williams et al.

(10) Patent No.: US 11,105,259 B2
(45) Date of Patent: *Aug. 31, 2021

(54) TURBO-ELECTRIC TURBO-COMPOUNDING METHOD

(71) Applicant: WILLIAMS INTERNATIONAL CO., L.L.C., Pontiac, MI (US)

(72) Inventors: Thomas J. Williams, Milford Township, MI (US); Tristan M. Fletcher, Wixom, MI (US)

(73) Assignee: WILLIAMS INTERNATIONAL CO., L.L.C., Pontiac, MI (US)

( * ) Notice: Subject to any disclaimer, the term of this patent is extended or adjusted under 35 U.S.C. 154(b) by 319 days.

This patent is subject to a terminal disclaimer.

(21) Appl. No.: 16/147,443

(22) Filed: Sep. 28, 2018

(65) Prior Publication Data

US 2019/0032550 A1    Jan. 31, 2019

Related U.S. Application Data

(63) Continuation-in-part of application No. 15/030,350, filed as application No. PCT/US2015/067059 on Dec. 21, 2015, now Pat. No. 10,094,274.
(Continued)

(51) Int. Cl.
*F02B 41/10*    (2006.01)
*F02B 37/18*    (2006.01)
(Continued)

(52) U.S. Cl.
CPC .............. *F02B 41/10* (2013.01); *F02B 37/18* (2013.01); *F02B 63/04* (2013.01); *F02B 63/042* (2013.01);
(Continued)

(58) Field of Classification Search
CPC .............. F02B 41/10; F02B 37/18–186; F02B 63/042; H02K 17/12; H02K 17/32
(Continued)

(56) References Cited

U.S. PATENT DOCUMENTS 2,182,644 A    12/1939  Schaelchlin
3,993,912 A    11/1976  Ekstrom et al.
(Continued)

FOREIGN PATENT DOCUMENTS

EP    0141634 A2    5/1985
EP    0178270 A1    4/1986
(Continued)

OTHER PUBLICATIONS

European Patent Office, International Search Report in International Application No. PCT/US2018/053659, dated Dec. 19, 2018, 4 pp.
(Continued)

*Primary Examiner* — Ngoc T Nguyen
(74) *Attorney, Agent, or Firm* — Raggio & Dinnin, P.C.; Kurt L. VanVoorhies

(57) ABSTRACT

Exhaust gases from an engine, input to turbo-compounder, drive a bladed turbine rotor therein, which drives a multi-phase AC generator, the output of which is used to electrically drive a multi-phase induction motor, the rotor of which is mechanically coupled to the engine, so as to provide for recovering power to the engine. The multi-phase AC generator may be coupled to the engine either by closure of a contactor, engagement of an electrically-controlled clutch, or by control of either a solid-state switching or control system or an AC excitation signal, when the frequency ($f_{GENERATOR}$) of the multi-phase AC generator meets or exceeds that ($f_{MOTOR}$) of the multi-phase induction motor.

27 Claims, 41 Drawing Sheets

Related U.S. Application Data

(60) Provisional application No. 62/678,258, filed on May 30, 2018, provisional application No. 62/111,208, filed on Feb. 3, 2015.

(51) Int. Cl.

| | | |
|---|---|---|
| F16D 28/00 | (2006.01) | |
| F16D 48/06 | (2006.01) | |
| F02B 63/04 | (2006.01) | |
| H02K 7/11 | (2006.01) | |
| H02K 11/00 | (2016.01) | |
| H02K 11/04 | (2016.01) | |
| H02K 51/00 | (2006.01) | |
| H02P 17/00 | (2006.01) | |
| H02K 7/18 | (2006.01) | |
| H02P 11/00 | (2006.01) | |
| H02P 9/04 | (2006.01) | |
| F02D 29/06 | (2006.01) | |
| H02P 103/10 | (2016.01) | |
| H02P 101/25 | (2016.01) | |

(52) U.S. Cl.
CPC ........... *F16D 28/00* (2013.01); *F16D 48/064* (2013.01); *H02K 7/11* (2013.01); *H02K 7/1823* (2013.01); *H02K 11/0094* (2013.01); *H02K 11/046* (2013.01); *H02K 51/00* (2013.01); *H02P 9/04* (2013.01); *H02P 11/00* (2013.01); *H02P 17/00* (2013.01); *F02D 29/06* (2013.01); *F16D 2500/10412* (2013.01); *F16D 2500/70424* (2013.01); *H02P 2101/25* (2015.01); *H02P 2103/10* (2015.01)

(58) Field of Classification Search
USPC .......................................................... 60/624
See application file for complete search history.

(56) References Cited

U.S. PATENT DOCUMENTS

| | | |
|---|---|---|
| 4,338,525 A | 7/1982 | Kilgore |
| 4,665,704 A | 5/1987 | Hartwig |
| 4,694,654 A | 9/1987 | Kawamura |
| 4,745,754 A | 5/1988 | Kawamura |
| 4,756,377 A | 7/1988 | Kawamura et al. |
| 4,798,257 A | 1/1989 | Kawamura et al. |
| 4,886,978 A | 12/1989 | Kawamura |
| 4,958,497 A | 9/1990 | Kawamura |
| 5,105,624 A | 4/1992 | Kawamura |
| 5,079,913 A | 6/1992 | Kishishita |
| 6,031,294 A | 2/2000 | Geis et al. |
| 6,093,975 A | 7/2000 | Peticola |
| 6,265,786 B1 | 7/2001 | Bosley et al. |
| 6,495,929 B2 | 12/2002 | Bosley et al. |
| 6,604,360 B1 | 8/2003 | Vuk |
| 7,019,413 B2 | 3/2006 | Kinoshita |
| 7,336,000 B2 | 2/2008 | Stahlhut et al. |
| 7,893,554 B2 | 2/2011 | Stahlhut et al. |
| 8,082,730 B2 | 12/2011 | Yang et al. |
| 8,522,756 B2 | 9/2013 | Vuk et al. |
| 8,584,459 B2 | 11/2013 | Richards |
| 8,708,083 B2 | 4/2014 | Dewis et al. |
| 8,959,912 B2 | 2/2015 | Hoess et al. |
| 9,341,145 B2 | 5/2016 | Maier |
| 9,771,165 B2 | 9/2017 | Ullyott et al. |
| 9,777,620 B2 | 10/2017 | Jaeger |
| 10,094,274 B2 | 10/2018 | Williams et al. |
| 2006/0205553 A1* | 9/2006 | Lee ........................ F16H 3/724 475/5 |
| 2009/0156068 A1 | 6/2009 | Barrett et al. |
| 2009/0215328 A1 | 8/2009 | Daffey |
| 2010/0018203 A1 | 1/2010 | Richards |
| 2011/0094485 A1 | 4/2011 | Vuk et al. |
| 2013/0336818 A1 | 12/2013 | Kanerva et al. |
| 2016/0356212 A1 | 12/2016 | Williams et al. |

FOREIGN PATENT DOCUMENTS

| | | |
|---|---|---|
| EP | 0225026 A1 | 6/1987 |
| EP | 0225026 B1 | 10/1989 |
| EP | 1848084 A1 | 10/2007 |
| EP | 2096278 A1 | 9/2009 |
| EP | 2236409 A1 | 10/2010 |
| GB | 0458508 A | 12/1936 |
| GB | 1068840 A | 5/1967 |
| JP | 59141714 A | 8/1984 |
| JP | 62093430 A | 4/1987 |
| JP | 05033668 A | 2/1993 |
| JP | 06050162 A | 2/1994 |
| JP | 07180564 A | 7/1995 |
| SU | 1477576 A1 | 5/1998 |
| WO | 201119891 A1 | 2/2011 |
| WO | 201444865 A1 | 3/2014 |

OTHER PUBLICATIONS

European Patent Office, Written Opinion of the International Searching Authority in International Application No. PCT/US2018/053659, dated Dec. 19, 2018, 6 pp.

European Patent Office, Communication Pursuant to Article 94(3) EPC in European Patent Application No. 15828434.9, dated Jul. 10, 2018, 3 pp.

European Patent Office, Communication Pursuant to Article 94(3) EPC in European Patent Application No. 15828434.9, dated Feb. 18, 2019, 4 pp.

Chinese Patent Office, First Office Action in Chinese Patent Application No. 201580075420.9, English & Chinese, May 29, 2019, 16pp.

Chinese Patent Office, Search Report in Chinese Patent Application No. 201580075420.9, May 29, 2019, 3pp.

United States Patent Office, International Preliminary Report on Patentability and associated Notification and Communication in International Application No. PCT/US2018/053659, May 13, 2020, 35 pp.

Lepda, Jaroslav and Stekl, Petr, "3-Phase AC Induction Motor Vector Control Using a 56F80x, 56F8100 or 56F8300 Device", Application No. No. AN1930, Freescale Semiconductor, Rev. 2, Feb. 2005, 68 pp.

"Variable-frequency drive", Wikipedia, downloaded from www.wikipedia.com on Apr. 30, 2014, 7 pp.

International Search Report in International Application No. PCT/US2015/067059, Mar. 24, 2016, 4 pages.

Written Opinion of the International Searching Authority in International Application No. PCT/US2015/067059, Mar. 24, 2016, 6 pages.

Internet download from http://kaskod.ee/technology/switched-meluctance-motor-generator-technology/ on May 2, 2018, 3 pp.

Internet download from http://kaskod.ee/products-services/switched-reluctance-generators/switched-reluctance-generators/ on Sep. 9, 2018, 4 pp.

Internet download from https://www.maccon.de/fileadmin/redaktion/downloads/Produkte/Schritt-Reluktanzmotoren/SRM-GENERATORS_03_10_2016.pdf on May 2, 2018, 4 pp.

Nassereddine, M., Rizk, J., and Nagrial, M.; "Switched Reluctance Generator for Wind Power Applications," World Acadamy of Scient, Engineering and Technology, International Journal of Mechanical and Mechatronics Engineering, vol. 2, No. 5, 2008, pp. 583-587.

Torrey, David A.; "Switched Reluctance Generators and Their Control", IEEE Transaction on Industrial Electronics, vol. 49, No. 1, Feb. 2002, pp. 3-14.

* cited by examiner

Three phase motor driver output to induction motor

TURBO-ELECTRIC TURBO-COMPOUNDING METHOD

CROSS-REFERENCE TO RELATED APPLICATIONS

The instant application is a continuation-in-part of U.S. application Ser. No. 15/030,350, filed on 18 Apr. 2016 as the U.S. National Phase of International Application No. PCT/US2015/067,059, filed on 21 Dec. 2015, which claims the benefit of prior U.S. Provisional Application Ser. No. 62/111,208 filed on 3 Feb. 2015. The instant application also claims the benefit of prior U.S. Provisional Application Ser. No. 62/678,258 filed on 30 May 2018. Each of the above-identified applications is incorporated herein by reference in its entirety.

DESCRIPTION OF EMBODIMENT(S)

Figure 1:
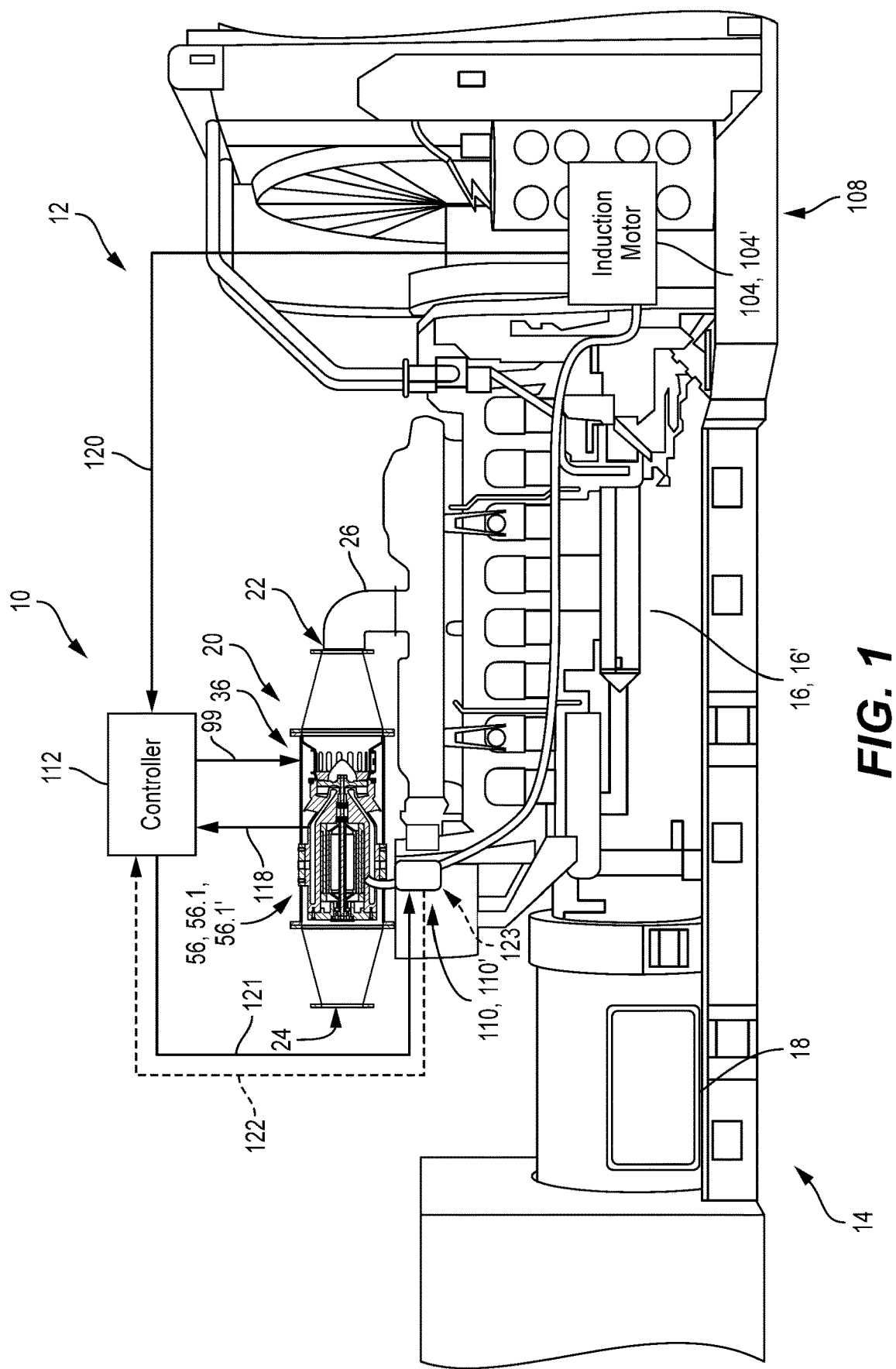
FIG. 1 illustrates a genset comprising a turbo-electric turbo-compounding system in cooperation with a diesel-electric generator system.
Figure 2:
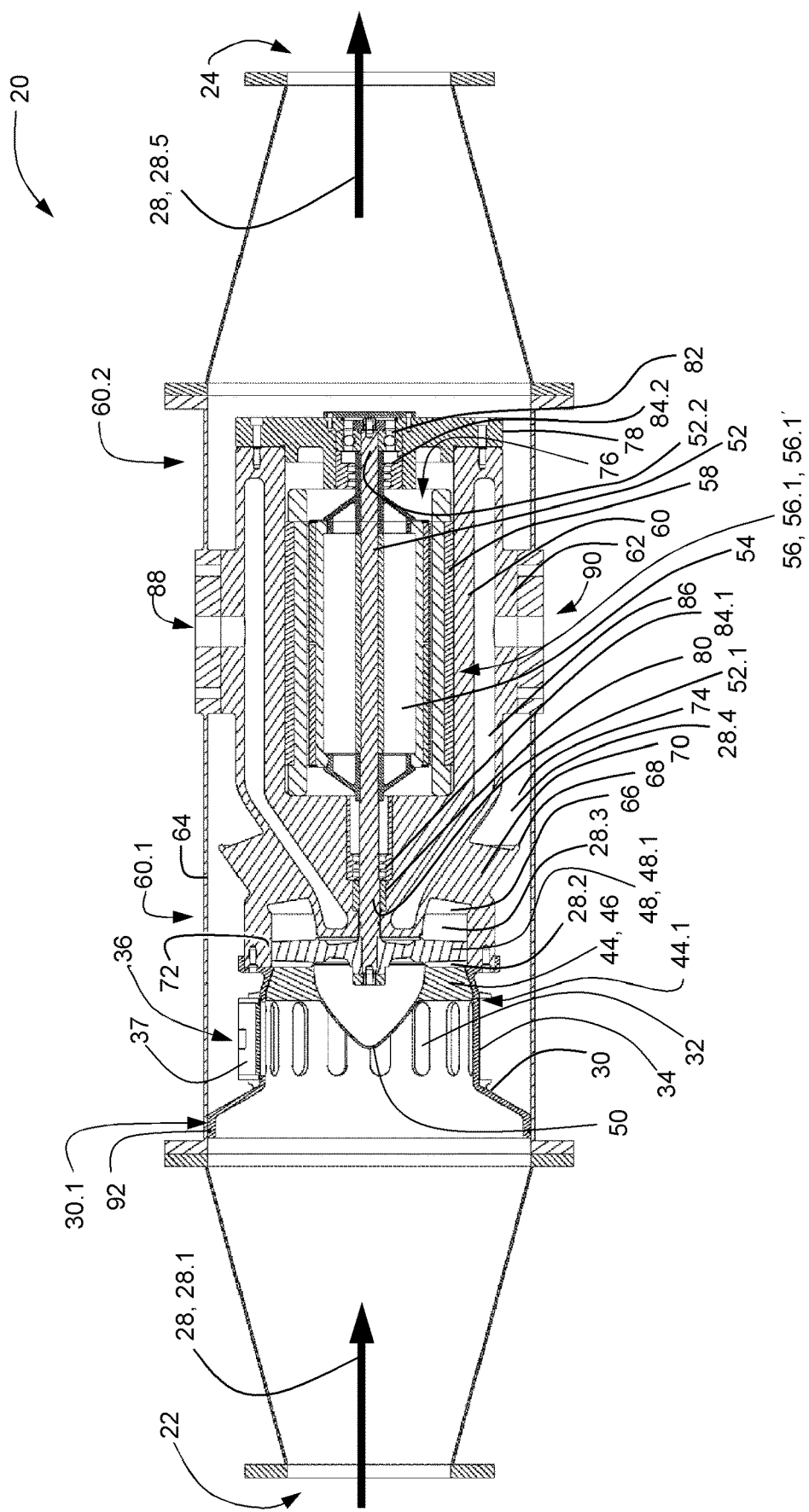
FIG. 2 illustrates a longitudinal-cross-sectional view of the turbo-compounder of the turbo-electric turbo-compounding system illustrated in FIG. 1.
Figure 3:
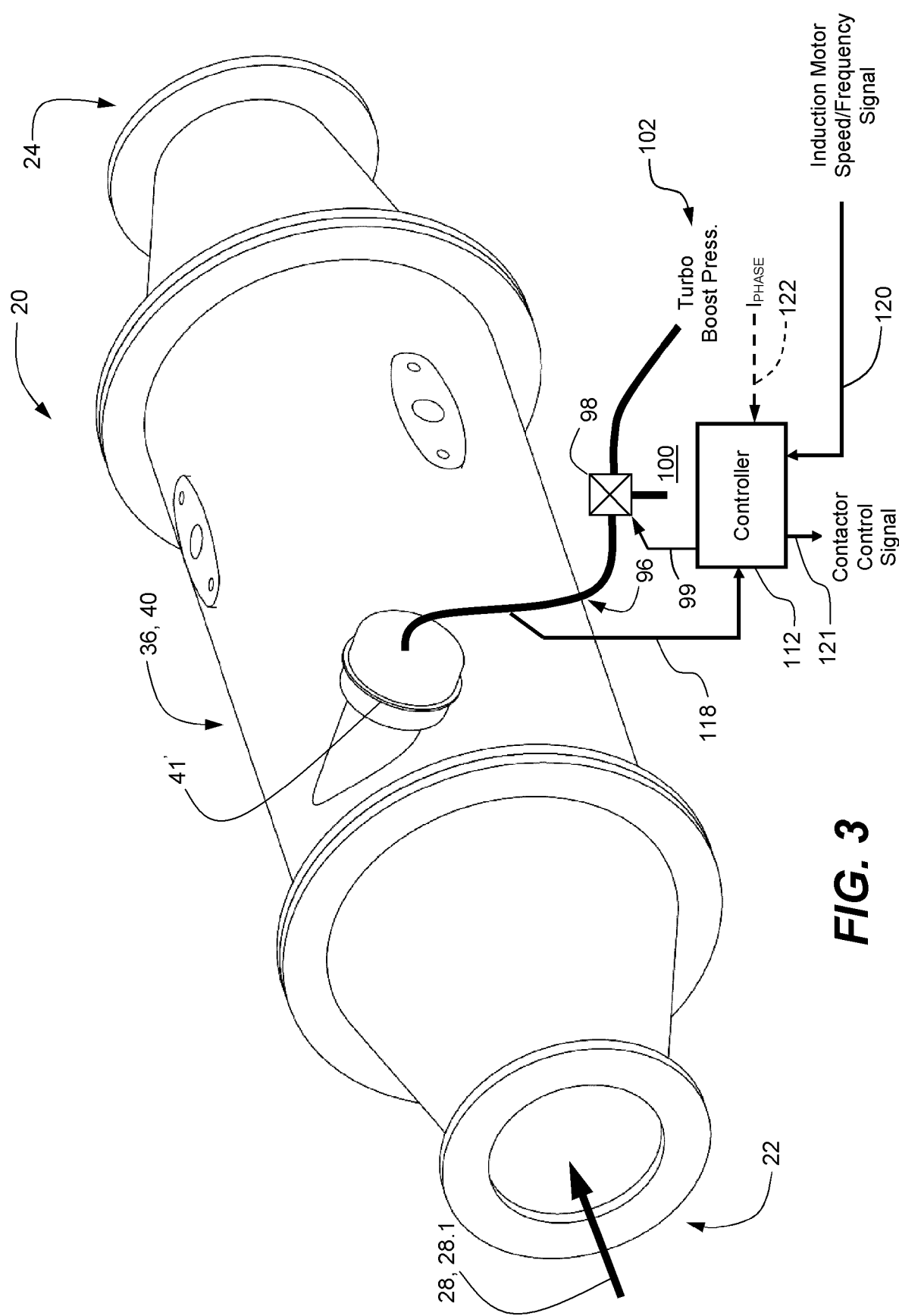
FIG. 3 illustrates an isometric external view of the turbo-compounder illustrated in FIGS. 1 and 2.

Referring to FIG. 1, a turbo-electric turbo-compounding system 10 cooperates with a genset 12 comprising a diesel-electric generator system 14, the latter of which comprises a genset engine 16, for example, a diesel engine 16', operatively coupled to an associated genset main generator 18, wherein the main generator 18 is driven, i.e. rotated, by the crankshaft of the genset engine 16, 16' and provides for generating electrical power for use external of the genset 12. Referring also to FIGS. 2-7, the turbo-electric turbo-compounding system 10 comprises a turbo-compounder 20 having an inlet 22 and an outlet 24 (wherein the relative left-right orientation of the inlet 22 and outlet 24 in FIGS. 2 and 3 is reversed relative to that shown in FIG. 1), the inlet 22 of which is operatively coupled to an exhaust discharge conduit 26 of the genset engine 16, 16' and provides for receiving exhaust gases 28 therefrom into an associated inlet duct 30 that incorporates a plurality of orifices 32 through a cylindrical wall 34 thereof that constitute part of an associated wastegate valve 36 that provides for controlling whether or not exhaust gases 28 may flow therethrough.

Figure 4:
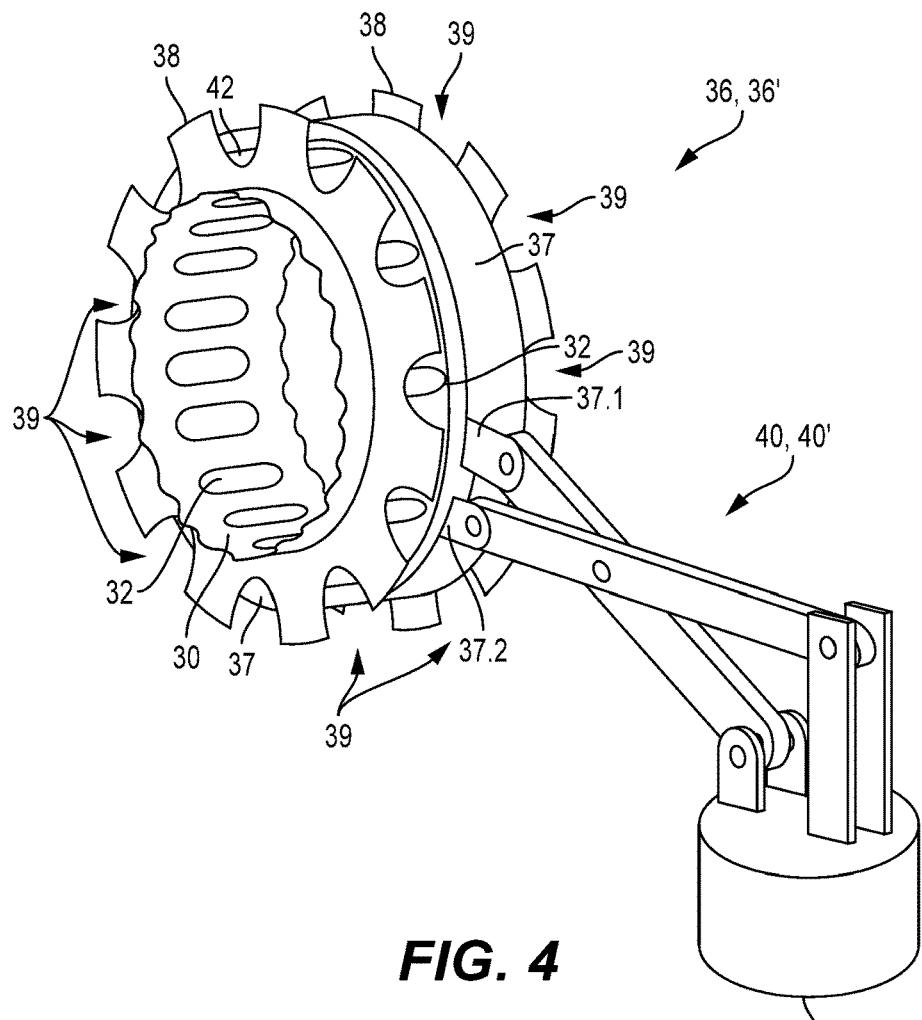
FIG. 4 illustrates a wastegate valve incorporating a "belly-band" wastegate in cooperation with a plurality of orifices through a cylindrical wall of a cylindrical inlet duct.
Figure 5:
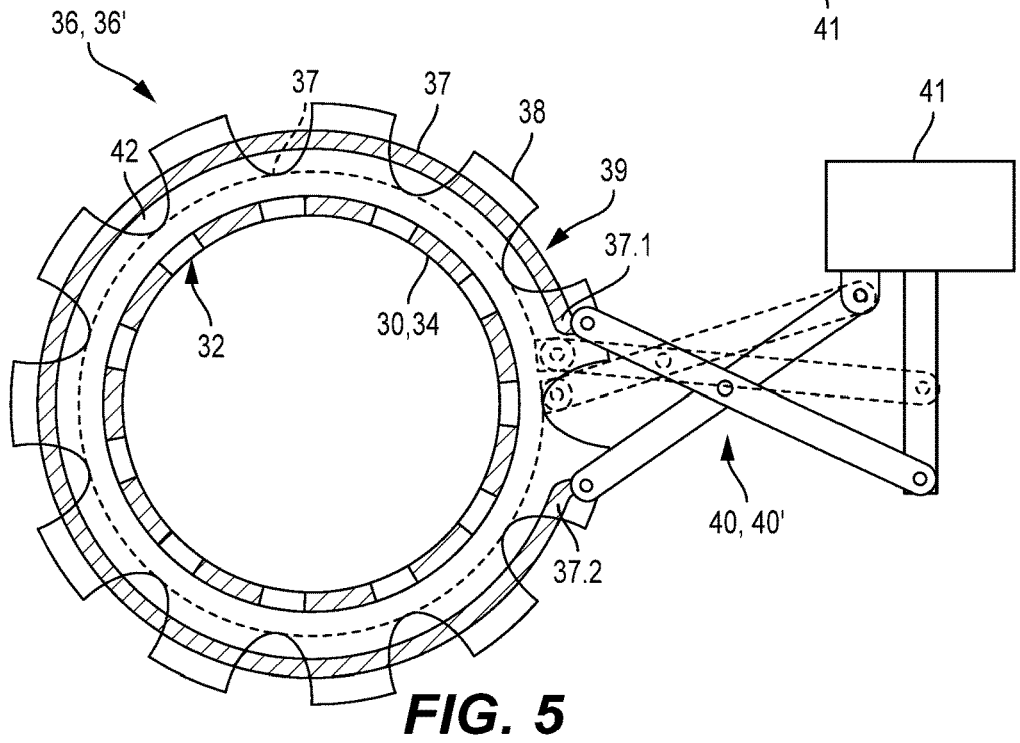
FIG. 5 illustrates a cross-sectional view of the wastegate valve illustrated in FIG. 4.

For example, referring to FIGS. 4 and 5, a "belly-band" wastegate valve 36' comprises a "belly-band" wastegate 37 in cooperation with the orificed portion of the cylindrical wall 34 of the inlet duct 30. The "belly-band" wastegate 37 comprises a flexible metallic band formed as a generally open-ended annular cylindrical shell surrounding the orifices 32 and the annular cylindrical wall 34 of the inlet duct 30. The "belly-band" wastegate 37 is axially-retained by a pair of associated radial guide flanges 38 that extend radially outward from the cylindrical wall 34, fore and aft of the "belly-band" wastegate 37. The radial guide flanges 38 incorporate a plurality of scalloped openings 39 from which the material of at least one radial guide flange 38 is removed. The ends 37.1, 37.2 of the "belly-band" wastegate 37 are coupled to a wastegate actuation mechanism 40, for example, a scissors-type wastegate actuation mechanism 40', which is actuated by an associated linear wastegate valve actuator 41. When the wastegate valve actuator 41 is extended (as illustrated in FIG. 4, and as shown by the primary position illustrated in FIG. 5), the associated scissors-type wastegate actuation mechanism 40' increases the effective diameter of the associated cylindrical shell formed by the "belly-band" wastegate 37, thereby creating an annular gap 42 between the outside of the cylindrical wall 34 of the inlet duct 30 and the inside of the "belly-band" wastegate 37, through which exhaust gases 28 may flow, and from which the exhaust gases 28 may be discharged from the "belly-band" wastegate valve 36' via the associated scalloped openings 39. When the wastegate valve actuator 41 is contracted (as shown by the alternative position illustrated in FIG. 5), the associated scissors-type wastegate actuation mechanism 40' reduces the effective diameter of the associated cylindrical shell of the "belly-band" wastegate 37, until, when fully contracted, the "belly-band" wastegate 37 is constricted tightly around the cylindrical wall 34 of the inlet duct 30, thereby blocking each of the orifices 32, so as to block a flow of exhaust gases 28 therethrough.

Alternatively, the wastegate valve 36 could be implemented with a wastegate band incorporating a plurality of second orifices that are similar in number to the plurality of orifices 32, wherein the wastegate band is then rotationally positioned relative to the cylindrical wall 34 by an associated wastegate actuation mechanism 40 to control the relative alignment of the orifices 32 in the cylindrical wall 34 with the corresponding second plurality of orifices, thereby controlling the effective opening area of the associated wastegate valve 36, which can range from fully closed with all of the orifices 32 blocked by corresponding non-orificed portions of the wastegate band, to fully open with all of the orifices 32 aligned with corresponding second orifices of the wastegate band.

With the wastegate valve 36 closed, nominally all of the exhaust gases 28.1 entering the inlet 22 of the turbo-compounder 20 are directed axially through the inlet duct 30, and upon exit therefrom, flow through an associated turbine nozzle 44 comprising a plurality of vanes 46 upstream of an associated bladed turbine rotor 48. The inlet side 44.1 of the turbine nozzle 44 incorporates a domed shroud 50 that provides for guiding the portion of exhaust gases 28 impinging thereon, onto the vanes 46 and through the openings therebetween of the turbine nozzle 44. The exhaust gases 28.2 exiting the turbine nozzle 44 then impinge upon the blades 48.1 of the bladed turbine rotor 48, causing a rotation thereof responsive thereto. The bladed turbine rotor 48 is operatively coupled by a rotor shaft 52 to the rotor 54 of a synchronous AC generator 56, for example, with the rotor shaft 52 splined to the bladed turbine rotor 48 so as to provide for the transmission of torque from the bladed turbine rotor 48 to the rotor shaft 52 of the synchronous AC generator 56. For example, in one set of embodiments, the synchronous AC generator 56 comprises a permanent magnet AC generator 56.1, for example, a three-phase permanent magnet AC generator 56.1' (for example, of radial-flux design), or more generally, a multi-phase permanent magnet AC generator comprising at least three phases.

Electrical power, for example, three-phase AC power, is extracted from the synchronous AC generator 56 by an associated set of stator windings 58 that are relatively fixed with respected to an associated core housing structure 60 that is supported, for example, via a plurality struts 62, from within and by a housing duct 64 of the turbo-compounder 20. Accordingly, a rotation of the bladed turbine rotor 48 responsive to an interaction with the exhaust gases 28.2 exiting the turbine nozzle 44 causes a rotation of the rotor 54 of the synchronous AC generator 56 relative to the stator windings 58 thereof, which causes the generation of AC power from the stator windings 58. The exhaust gases 28.3 exiting the bladed turbine rotor 48 following the interaction therewith are discharged through an annular exhaust duct 66 that surrounds the core housing structure 60 at a forward end portion 60.1 thereof, wherein an outer shell 68 of the annular exhaust duct 66 depends from the core housing structure 60 via a plurality of associated struts 70 therebetween, wherein a turbine shroud 72 surrounding the bladed turbine rotor 48 extends forward from the outer shell 68 of the annular exhaust duct 66. The exhaust gases 28.4 exiting the annular exhaust duct 66 are discharged into an annular plenum 74 surrounding the core housing structure 60 and in fluid communication both with the outlet 24 of the turbo-compounder 20 and with the exterior of the cylindrical "belly-band" wastegate 37 of the wastegate valve 36.

With the wastegate valve 36 open, exhaust gases 28.1 entering the inlet 22 of the turbo-compounder 20 are able to flow radially through the orifices 32 and into the annular gap 42 of the wastegate valve 36, through the scalloped openings 39 of the associated radial guide flanges 38, and then directly into the annular plenum 74, thereby bypassing the bladed turbine rotor 48 which would not be substantially affected thereby, and which otherwise extracts power from the exhaust gases 28, 28.2, 28.3 flowing thereacross.

The synchronous AC generator 56 is located within an open-ended cavity 76 in the core housing structure 60, the aft end portion 60.2 of which is closed by an end cap 78 secured thereto. A forward portion 52.1 of the rotor shaft 52 is rotationally supported from within the forward end portion 60.1 of the core housing structure 60 by a sleeve bearing 80 depending therefrom, and an aft portion 52.2 of the rotor shaft 52 is rotationally supported from the end cap 78 by a rolling element bearing 82, wherein the rotor shaft 52 is sealed with respect to the core housing structure 60 at locations between the synchronous AC generator 56 and each of the sleeve 80 and rolling element 82 bearings by corresponding respective forward 84.1 and aft 84.2 seals. The core housing structure 60 incorporates an annular coolant cavity 86 in fluid communication with coolant inlet 88 and outlet 90 ports that extend within and through corresponding struts 62 and the housing duct 64, wherein coolant admitted to the coolant inlet port 88 flows into and through the annular coolant cavity 86 and out of the coolant outlet port 90, so as to provide for cooling the synchronous AC generator 56 and the associated sleeve 80 and rolling element 82 bearings from the heat of the exhaust gases 28, and from the operation thereof. The core housing structure 60 also incorporates internal lubrication channels and cavities that provide for the lubrication of the sleeve 80 and rolling element 82 bearings, which are in fluid communication with corresponding ports extending within and through corresponding struts 62 and the housing duct 64 that provide for a respective source and sink of lubricant thereto and therefrom. The outside of a forward extension 30.1 of the inlet duct 30 is sealed to the inside of the housing duct 64 with one or more piston ring seals 92 that provide for translation of the inlet duct 30 relative to the housing duct 64 responsive to thermally-induced expansion and contractions of the associated components.

Referring to FIG. 3, in accordance with one embodiment, the opening position of the wastegate valve 36 is controlled by a pneumatic wastegate-valve actuator 41' of the wastegate actuation mechanism 40 responsive to a pneumatic actuation signal 96 from an electrically-controlled three-way valve 98, responsive to an associated wastegate control signal 99. The pneumatic wastegate-valve actuator 41' incorporates a spring-biased diaphragm that is operatively coupled to the "belly-band" wastegate valve 36' so as to provide for positioning the associated "belly-band" wastegate 37 relative to the inlet duct 30 responsive to the displacement of the diaphragm, the latter of which is responsive to a pressure differential thereacross, wherein spring bias acts to bias the "belly-band" wastegate 37 so that the associated "belly-band" wastegate valve 36' is fully open, one side of the diaphragm is vented to the atmosphere 100, and the pressure on the other side of the diaphragm is controlled by the pneumatic actuation signal 96. With the electrically-controlled three-way valve 98 fully ON, the pneumatic actuation signal 96 is provided by a turbocharger boost pressure 102 from a turbocharger of the genset engine 16, 16', which causes the wastegate valve 36 to become fully closed; and with the electrically-controlled three-way valve 98 fully OFF, the pneumatic actuation signal 96 is vented to the atmosphere 100, so as to provide for the wastegate valve 36 to become fully open responsive to the associated spring bias. Alternatively, the pneumatic wastegate-valve actuator 41' could be configured so as to be responsive to vacuum rather than positive gage pressure. Further alternatively, the wastegate actuation mechanism 40 could be controlled with other types of actuators, for example, electro-mechanical or hydraulic. The collective effective opening area of the orifices 32 and scalloped openings 39 of the wastegate valve 36 is configured so as to provide for sufficient flow therethrough under no-load conditions when the wastegate valve 36 is open, for example, sufficient so that the resulting rotational speed of the synchronous AC generator 56, 56.1, 56.1' does not exceed a safe operating threshold, or to prevent an over-speed of the bladed turbine rotor 48, either during startup of the turbo-electric turbo-compounding system 10, or when the associated electrical load is either absent or removed therefrom, either during normal operation or as a result of a failure scenario.

Figure 6:
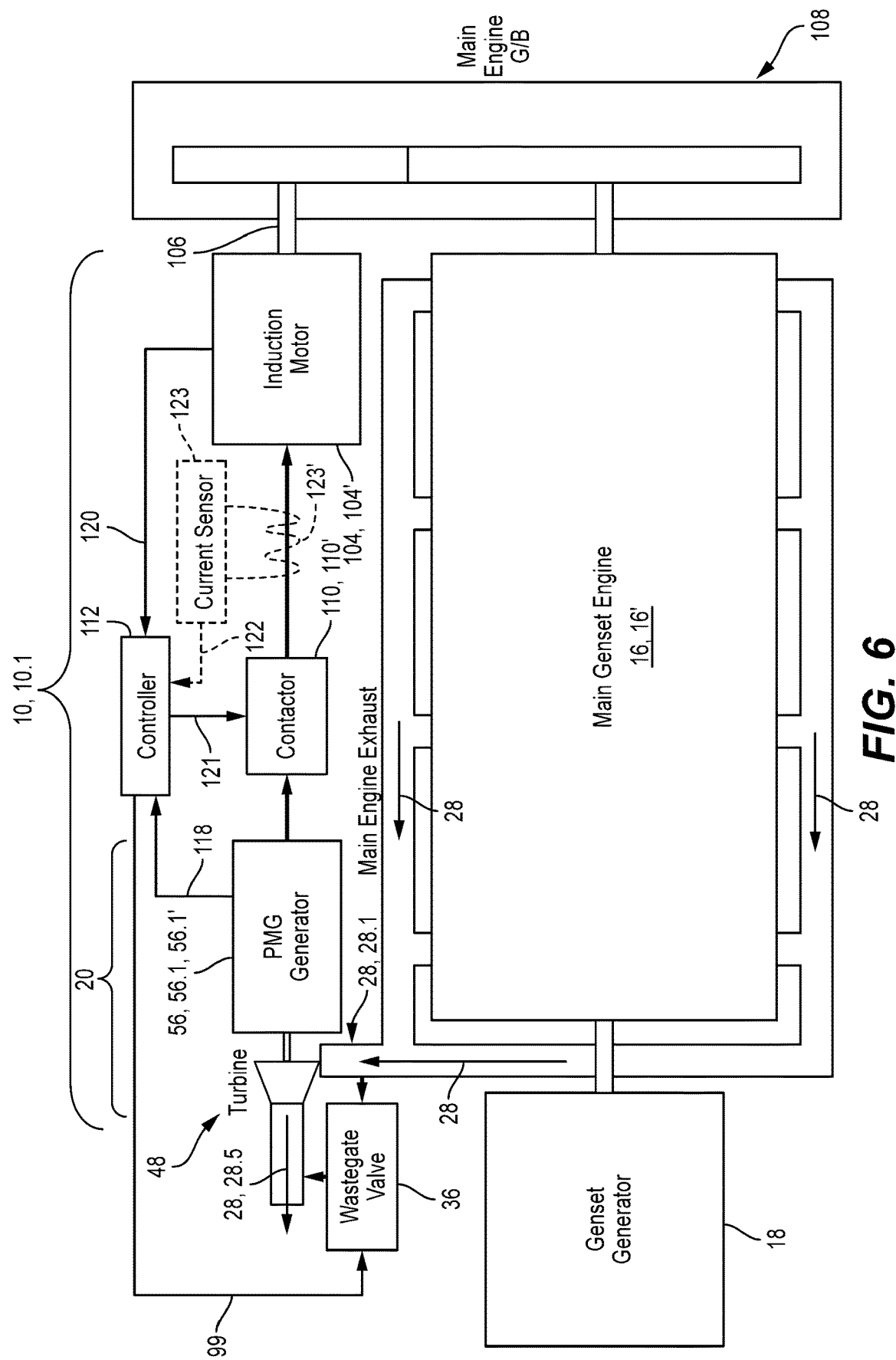
FIG. 6 illustrates a block diagram of a genset incorporating a first aspect of a turbo-electric turbo-compounding system.
Figure 7:
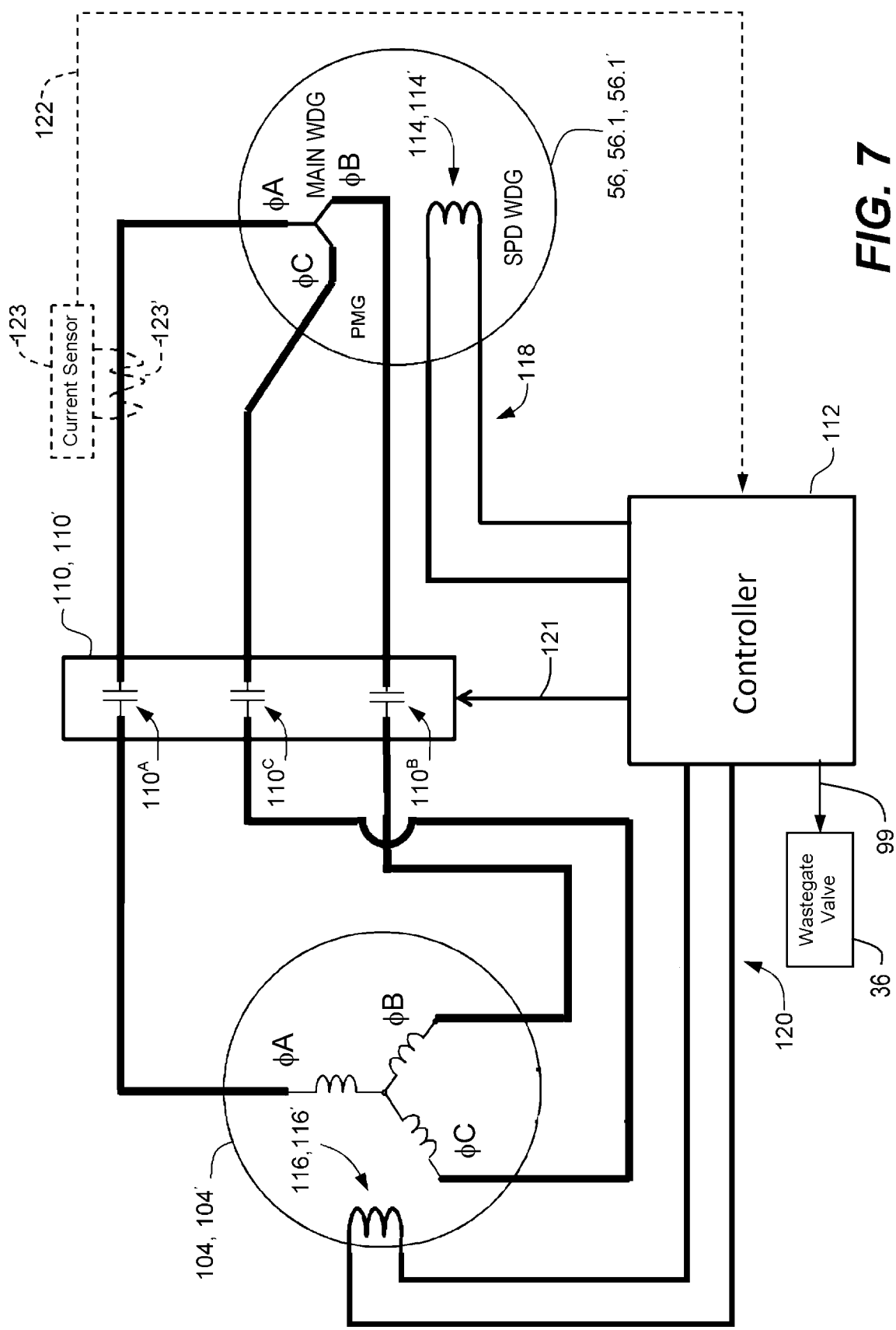
FIG. 7 illustrates a schematic block diagram of a three-phase generator operatively coupled to a three-phase induction motor through a contactor, in accordance with the first aspect of the turbo-electric turbo-compounding system illustrated in FIG. 6.

Referring to FIGS. 1, 6 and 7, the synchronous AC generator 56, 56.1, 56.1' of the turbo-compounder 20 is used to drive an induction motor 104, with the rotor 106 of the induction motor 104 mechanically coupled to the crankshaft of the genset engine 16, 16', for example, through a gearbox 108, (designated as G/B in FIG. 6), so as to provide for the induction motor 104 to supply mechanical shaft power to the genset engine 16, 16'. Accordingly, the turbo-compounder 20 provides for recovering power from the exhaust gases 28 of the genset engine 16, 16' by first using the synchronous AC generator 56, 56.1, 56.1' to convert fluid power of the exhaust gases 28 to AC electrical power, and then using the induction motor 104 to convert that AC electrical power to mechanical shaft power, which can be used to either supplement the mechanical shaft power of the genset engine 16, 16' to drive the associated genset main generator 18, or which could be used separately.

In accordance with a first aspect of the turbo-electric turbo-compounding system 10, 10.1—illustrated in FIGS. 1, 6 and 7—the synchronous AC generator 56, 56.1, 56.1' is directly connected to the induction motor 104 via an associated contactor 110, the latter of which is under control of a controller 112. More particularly, each phase A, B, C of a three-phase permanent magnet AC generator 56.1, 56.1' is directly connected to a corresponding phase A, B, C of a corresponding three-phase induction motor 104' via a corresponding respective contact 110$^A$, 110$^B$, 110$^C$ of an associated three-pole contactor 110', or more generally, a multi-phase induction motor and an associated multi-phase contactor, comprising at least three phases, wherein the number of phases is the same as the number of phases of the associated multi-phase permanent magnet AC generator.

A permanent magnet AC generator 56.1, 56.1' produces an output that is characterized by a relatively fixed relationship between output voltage and frequency—i.e. to the first order without loading and temperature effects, output voltage increases linearly with frequency, copasetic for driving induction motors—and accordingly provides for running the induction motor 104, 104' directly. Accordingly, when directly connected thereto, the permanent magnet AC generator 56.1, 56.1' is a synchronous machine that provides a synchronous frequency directly to the induction motor 104, 104'. Alternatively, the synchronous AC generator 56 could be implemented as a field-controlled synchronous AC generator.

The synchronous AC generator 56, 56.1, 56.1' incorporates a first rotational-speed or frequency sensor 114, for example, a corresponding separate rotational-speed-sensing winding 114' that provides for sensing the rotational speed thereof. Similarly, the induction motor 104, 104' also incorporates a second rotational-speed or frequency sensor 116, for example, a corresponding separate rotational-speed-sensing winding 116' that provides for sensing the rotational speed thereof. The first 114 and second 116 rotational speed or frequency sensors are operatively coupled to the controller 112, which provides for controlling the wastegate valve 36 and contactor 110, 110' responsive to the respective first 118 and second 120 rotational-speed or frequency signals respectively generated therefrom. More particularly, the controller 112 generates both the wastegate control signal 99 for controlling the wastegate valve 36 and a contactor control signal 121 for controlling the contactor 110, 110', responsive to the first 118 and second 120 rotational-speed or frequency signals, and, as described more fully hereinbelow, alternatively, also responsive to a phase-current signal 122 representative of the phase current $I_{PHASE}$ supplied by the synchronous AC generator 56, 56.1, 56.1' to the induction motor 104, 104', for one of the associated phases A, B, C.

For example, either or both the first 114 or second 116 rotational speed or frequency sensor could be implemented with rotational-speed sensor attached to the corresponding shaft of the synchronous AC generator 56, 56.1, 56.1' or induction motor 104, 104'. For example, such a rotational-speed sensor could incorporate either magnetic or optical sensing technology, for example, but not limited to, using either a magnetic pickup in cooperation with a toothed wheel, a resolver, a synchro, an optical encoder or a photodetector in cooperation with a shaft-associated reflector. The rotational-speed sensor generates a corresponding first 118 or second 120 rotational-speed or frequency signal responsive to the associated rotational speed of the shaft being sensed, either in the form of a speed measurement or an associated AC signal having a frequency dependent upon both the rotational speed of the corresponding associated shaft and the associated effective pole count of the rotational-speed sensor, i.e. the number of cycles of the resulting associated signal from the rotational-speed sensor per rotation of the associated shaft being sensed. Alternatively, either the first 114 or second 116 rotational speed or frequency sensor could be implemented with a corresponding first 114' or second 116' rotational-speed-sensing winding as either a corresponding associated separate isolated stator winding, or as one or more of the corresponding associated stator windings of the phases A, B, C of the synchronous AC generator 56, 56.1, 56.1' or induction motor 104, 104', respectively.

Figure 8:
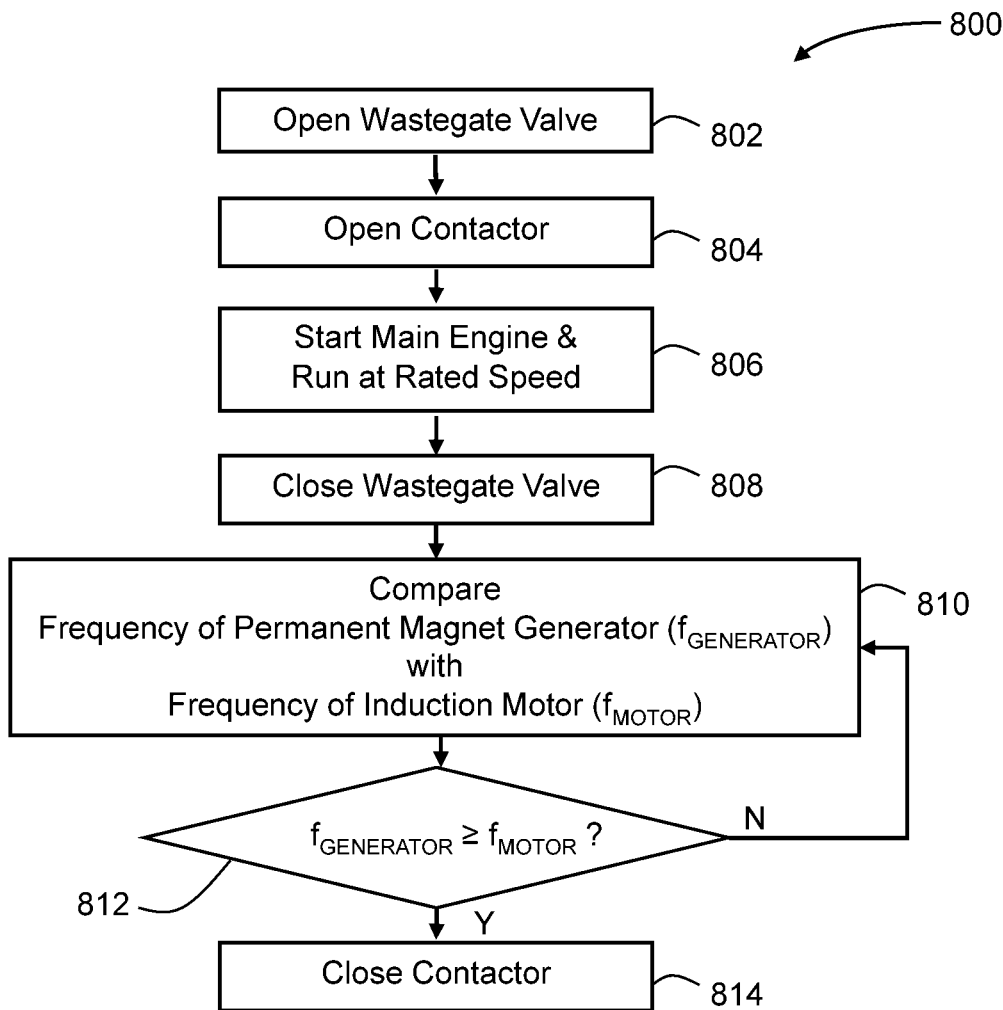
FIG. 8 illustrates a flow chart of a process for controlling the activation of the first aspect of the turbo-electric turbo-compounding system illustrated in FIGS. 1-7.

Referring to FIG. 8, in accordance with a startup process 800 for controlling the startup of a genset 12 incorporating the first aspect of the turbo-electric turbo-compounding system 10, 10.1, in step (802), the wastegate valve 36 is initially open—i.e. with the electrically-controlled three-way valve 98 positioned so that the pneumatic actuation signal 96 acting on the pneumatic wastegate-valve actuator 41' is vented to atmosphere 100—so as to provide for the exhaust gases 28 to flow relatively unimpeded through the turbo-compounder 20 without substantially acting upon the bladed turbine rotor 48. In step (804), the contactor 110, 110' is also initially open, so as to prevent electrical power from being extracted from the synchronous AC generator 56, 56.1, 56.1'. As a result, the exhaust gases 28, 28.1, 28.2 can flow through the turbine nozzle 44 and across the bladed turbine rotor 48 without substantial loss. Accordingly, following step (804), the exhaust gases 28 flowing through the turbo-compounder 20 will either bypass the bladed turbine rotor 48 or flow thereacross without causing the generation of electrical power from the synchronous AC generator 56, 56.1, 56.1', so as to provide for minimum back pressure in the exhaust discharge conduit 26, and thereby not impede a startup of the genset engine 16, 16'—if not already running. Then, in step (806), if not already started, the genset engine 16, 16' is started; and, if not already running at rated speed, the genset engine 16, 16' is run at rated speed, so as to provide for the generation of electrical power by the genset main generator 18. Then, in step (808), the wastegate valve 36 is fully closed by positioning the electrically-controlled three-way valve 98 so that the pneumatic actuation signal 96 acting on the pneumatic wastegate-valve actuator 41' is provided by the turbocharger boost pressure 102, which causes substantially all of the exhaust gases 28.1 entering the inlet 22 of the turbo-compounder 20 to flow through the turbine nozzle 44 and across the bladed turbine rotor 48, thereby causing rotational acceleration of the bladed turbine rotor 48. Meanwhile, with the genset engine 16, 16' running at rated speed following step (806), the rotor 106 of the induction motor 104, 104' will be driven by the genset engine 16, 16' through the associated gearbox 108 at a corresponding rated rotational speed, the latter of which is sensed by the associated second rotational-speed or frequency sensor 116, with the value of the associated resulting second rotational-speed or frequency signal 120 being designated as $f_{MOTOR}$.

The output frequency of the synchronous AC generator 56, 56.1, 56.1' is directly proportional to the rotational speed thereof, and the waveform of the generated voltage is, by definition, synchronized with the rotational position of the synchronous AC generator 56, 56.1, 56.1'. The induction motor 104, 104' will act as a load on the synchronous AC generator 56, 56.1, 56.1' when operated at a rotational speed for which the corresponding associated synchronous frequency is less than the output frequency of the synchronous AC generator 56, 56.1, 56.1' by a frequency difference, referred to as "frequency slip", wherein the magnitude of the frequency slip increases with load as necessary to generate the required torque in the rotor shaft 52 driving the synchronous AC generator 56, 56.1, 56.1'. Under no-load conditions, frequency slip will be nearly zero, but non-zero as a result of parasitic losses, friction, and windage in the induction motor 104, 104'. Under no-load conditions, the ratio of the rotational speeds of the induction motor 104, 104' and the synchronous AC generator 56, 56.1, 56.1' is governed by the ratio of the number of poles of the respective electrical machines, with both the induction motor 104, 104' and the synchronous AC generator 56 operating at nearly the same frequency, wherein the frequency of the excitation signal generated by the synchronous AC generator 56, 56.1, 56.1' would differ from the corresponding rotational frequency of the induction motor 104, 104' because of slip inherent in the operation of the induction motor 104, 104'. Accordingly, the ratio of the number of poles of the synchronous AC generator 56, 56.1, 56.1' to the number of poles of the induction motor 104, 104' provides for a substantial reduction of the speed of the induction motor 104, 104' relative to that of the synchronous AC generator 56, 56.1, 56.1', so as to provide for then mechanically interfacing the induction motor 104, 104' with the genset engine 16, 16' in order to provide for recovering power from exhaust flowing through the turbo-compounder 20 as mechanical shaft power to the genset engine 16, 16'.

In step (810), the rotational speed, or corresponding output frequency, of the synchronous AC generator 56, 56.1, 56.1' is sensed by the associated first rotational speed or frequency sensor 114 so as to generate a corresponding first rotational-speed or frequency signal 118—designated as $f_{GENERATOR}$—, which is compared with the corresponding second rotational-speed or frequency signal 120, i.e. $f_{MOTOR}$, associated with the induction motor 104, 104'. If, in step (812), the rotational speed, or corresponding frequency $f_{GENERATOR}$ of the synchronous AC generator 56, 56.1, 56.1' is greater than or equal to the corresponding rotational speed, or corresponding frequency $f_{MOTOR}$ of the induction motor 104, 104'—indicative of a prospective positive "frequency slip" condition—then, in step (814), the contactor 110, 110' is closed, so as to directly electrically connect the synchronous AC generator 56, 56.1, 56.1' to the induction motor 104, 104'. Otherwise, the process repeats with step (810) until the condition of step (812) is satisfied. More particularly, for a three-phase system, in step (814), each of the contacts $110^A$, $110^B$, $110c$ of the three-pole contactor 110' is closed so as to connect each of the phases A, B, C of the three-phase permanent magnet AC generator 56.1, 56.1' to corresponding respective phases A, B, C of the three-phase induction motor 104'. The closing of the contactor 110, 110' at or near the point at which the frequencies of the synchronous AC generator 56 and the induction motor 104, 104' are equal results in associated contact closure at near zero phase current. Following the connection of the phases A, B, C of the three-phase permanent magnet AC generator 56.1, 56.1' to corresponding phases A, B, C of the three-phase induction motor 104', the rotational speed of the synchronous AC generator 56, 56.1, 56.1' will continue to increase, resulting in a corresponding increase in "frequency slip", which causes the synchronous AC generator 56, 56.1, 56.1' to generate and transfer power to the three-phase induction motor 104', which in turn results in an increase in the torque demand by the synchronous AC generator 56, 56.1, 56.1', which increases the torque in the rotor shaft 52 between the bladed turbine rotor 48 and the rotor 54 of the synchronous AC generator 56, 56.1, 56.1', which acts to reduce the acceleration, or decelerate, the bladed turbine rotor 48, until an equilibrium is reached for which the "frequency slip" and associated torque in the rotor shaft 52 corresponds to the level of power delivered to the induction motor 104, 104' from the synchronous AC generator 56, 56.1, 56.1', the latter of which results in an associated recovery of mechanical shaft power by the genset engine 16, 16' responsive to a torque from the rotor 106 of the induction motor 104 acting on the genset engine 16, 16' via the associated gearbox 108, at the rotational speed of the genset engine 16, 16'.

The controller 112 is designed to change the switching state of the contactor 110, 110' when synchronous AC generator 56, 56.1, 56.1' is synchronized, or nearly synchronized, with the induction motor 104, 104' in respect of the associated operating frequencies. Although an inadvertent closure, or opening, of the contactor 110, 110', for example, as a result of a failure mode, when the synchronous AC generator 56, 56.1, 56.1' is not synchronized with the induction motor 104, 104' will cause arcing in proportion to the magnitude of the associated speed or frequency differential, the contacts $110^A$, $110^B$, $110^C$ of the contactor 110, 110' would be designed to accommodate such occurrences provided these occurrences are infrequent.

Accordingly, the turbo-electric turbo-compounding system 10, 10.1 is self-regulating because as the torque provided by the induction motor 104, 104' to the genset engine 16, 16' increases, the associated phase current in the induction motor 104, 104' increases, which in turn increasingly loads the synchronous AC generator 56, 56.1, 56.1', causing an increase in the torque demand on the bladed turbine rotor 48, which in turn results in a decrease of the rotational speed of the bladed turbine rotor 48 and synchronous AC generator 56, 56.1, 56.1', which in turn results in a decrease of the torque provided by the induction motor 104, 104' to the genset engine 16, 16'. At each operating condition there should be a stable point where the "frequency slip" results in a load condition of the genset engine 16, 16' which is stable and for which the shaft torque of the genset engine 16, 16' is reduced by some percentage, which in turn decreases fuel consumption by the genset engine 16, 16' as a result of energy recovery from waste heat in the exhaust gases 28 therefrom, resulting in a reduction in the temperature of the exhaust gases 28.5 at the outlet 24 of the turbo-compounder 20 relative to that at the inlet 22, for example, as illustrated in FIG. 2.

The genset engine 16, 16' may be shut down without first decoupling the turbo-electric turbo-compounding system 10, 10.1 from the genset engine 16, 16'—i.e. by opening both the wastegate valve 36 and the contactor 110, 110',—provided that the wastegate valve 36 and contactor 110, 110' are both opened prior to the next startup.

Figure 9A:
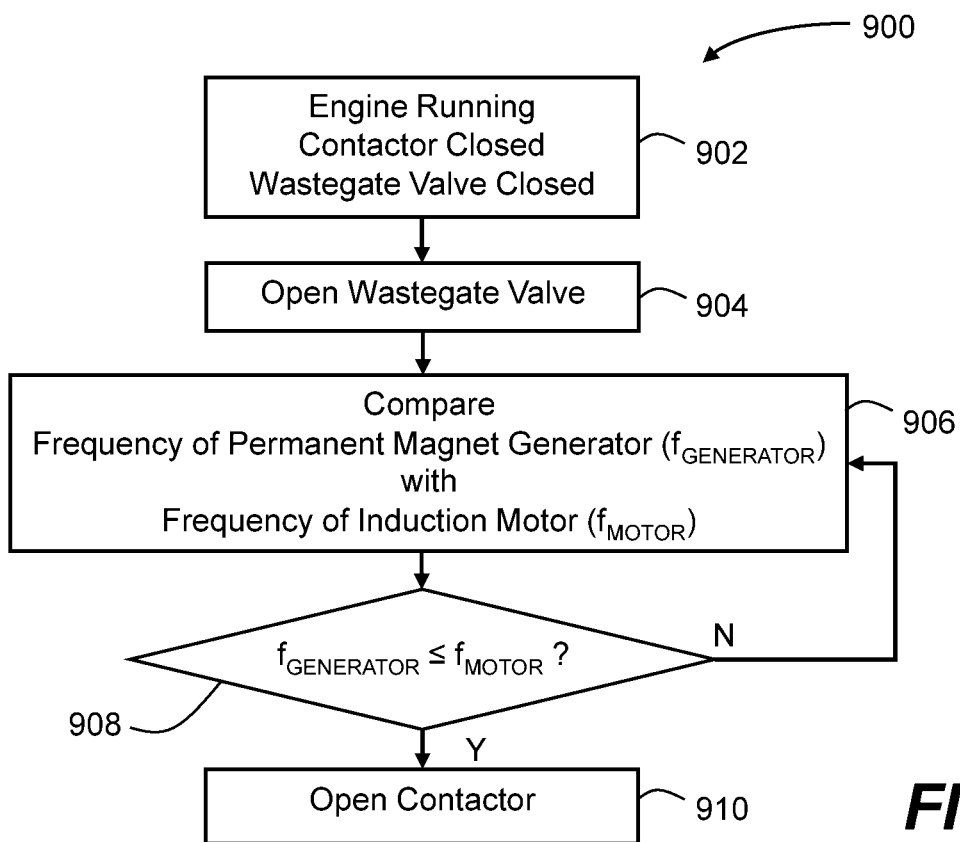
FIG. 9a illustrates a flow chart of a first embodiment of a process for controlling the deactivation of the first aspect of the turbo-electric turbo-compounding system illustrated in FIGS. 1-7.
Figure 9B:
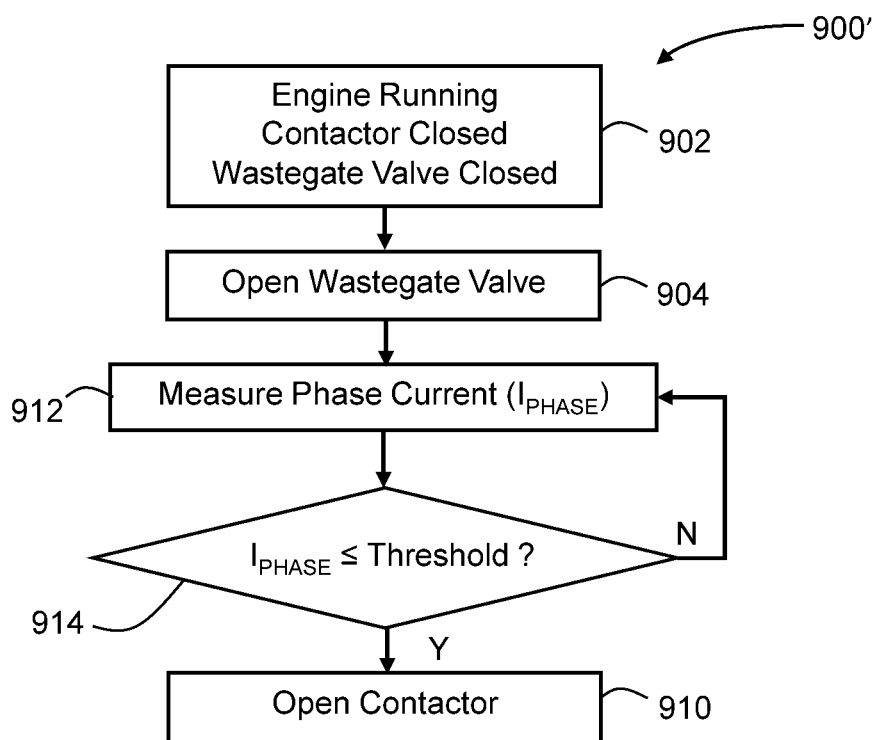
FIG. 9b illustrates a flow chart of a second embodiment of a process for controlling the deactivation of the first aspect of the turbo-electric turbo-compounding system illustrated in FIGS. 1-7.

Alternatively, referring to FIGS. 9a and 9b, the turbo-electric turbo-compounding system 10, 10.1 may be disabled without first shutting down the genset engine 16, 16'. Referring to FIG. 9a in accordance with a first embodiment of a shutdown process 900 for decoupling the first aspect of the turbo-electric turbo-compounding system 10, 10.1, from step (902), with the genset engine 16, 16' running and both the wastegate valve 36 and the contactor 110, 110' closed, in step (904), the wastegate valve 36 is opened so as to prevent a subsequent overspeed of the bladed turbine rotor 48 upon removal of the associated electrical load from the synchronous AC generator 56, 56.1, 56.1'. As a result, the exhaust gases 28 are bypassed around the bladed turbine rotor 48, the latter of which then decelerates from a rotational speed for which the associated frequency of the $f_{GENERATOR}$ of the synchronous AC generator 56, 56.1, 56.1' was in excess of the frequency $f_{MOTOR}$, of the induction motor 104, 104' by an initial level of "frequency slip". In step (906), the rotational speed, or corresponding output frequency $f_{GENERATOR}$, of the synchronous AC generator 56, 56.1, 56.1' sensed by the associated first rotational speed or frequency sensor 114 is compared with the rotational speed, or corresponding frequency $f_{MOTOR}$, of the induction motor 104, 104' sensed by the associated second rotational speed or frequency sensor 116. If, in step (908), the rotational speed, or corresponding output frequency $f_{GENERATOR}$ of the synchronous AC generator 56, 56.1, 56.1' is less than or equal to the corresponding rotational speed, or corresponding frequency $f_{MOTOR}$ of the induction motor 104, 104'—indicative of negligible associated phase current—then, in step (910), the contactor 110, 110' is opened so as to disconnect the synchronous AC generator 56, 56.1, 56.1' from the induction motor 104, 104'. Otherwise, the process repeats with step (906) until the condition of step (908) is satisfied.

The changing of the state of the contactor 110, 110' in steps (814) and (910) when the frequencies $f_{GENERATOR}$, $f_{MOTOR}$ of the synchronous AC generator 56, 56.1, 56.1' and induction motor 104, 104' are equal or nearly equal provides for switching at zero or nearly zero associated phase current, which provides for improving the reliability of the associated contacts 110$^A$, 110$^B$, 110$c$ of the contactor 110, 110'.

Alternatively, referring to FIG. 9b, a second embodiment of a shutdown process 900' for decoupling the first aspect of the turbo-electric turbo-compounding system 10, 10.1 is the same as the above-described first embodiment of the shutdown process 900 except that steps (906) and (908) of the first embodiment 900 are respectively replaced with steps (912) and (914) of the second embodiment 900', the latter which provide for determining when to open the contactor 110, 110' explicitly responsive to a measurement—from an associated phase-current sensor 123—of phase current $I_{PHASE}$ from the synchronous AC generator 56, 56.1, 56.1' to the induction motor 104, 104' for one of the corresponding phases A, B, C. For example, the phase-current sensor 123 may either incorporate, or be implemented with, a current transformer 123'. More particularly, following above-described step (904), in step (912) the phase current $I_{PHASE}$ from the synchronous AC generator 56, 56.1, 56.1' to the induction motor 104, 104' of one of the phases A, B or C is explicitly measured by the phase-current sensor 123 with the contactor 110, 110' closed. Then, in step (914), if the phase current $I_{PHASE}$ is less than a threshold, then, in step (910), the contactor 110, 110' is opened. Otherwise, the process repeats with step (912) until the condition of step (914) is satisfied. Accordingly, the second embodiment of the shutdown process 900' explicitly provides for opening the contactor 110, 110' at a zero or near-zero current condition, which provides for minimizing arcing across the contacts 110$^A$, 110$^B$, 110$c$ of the contactor 110, 110'.

Figure 10:
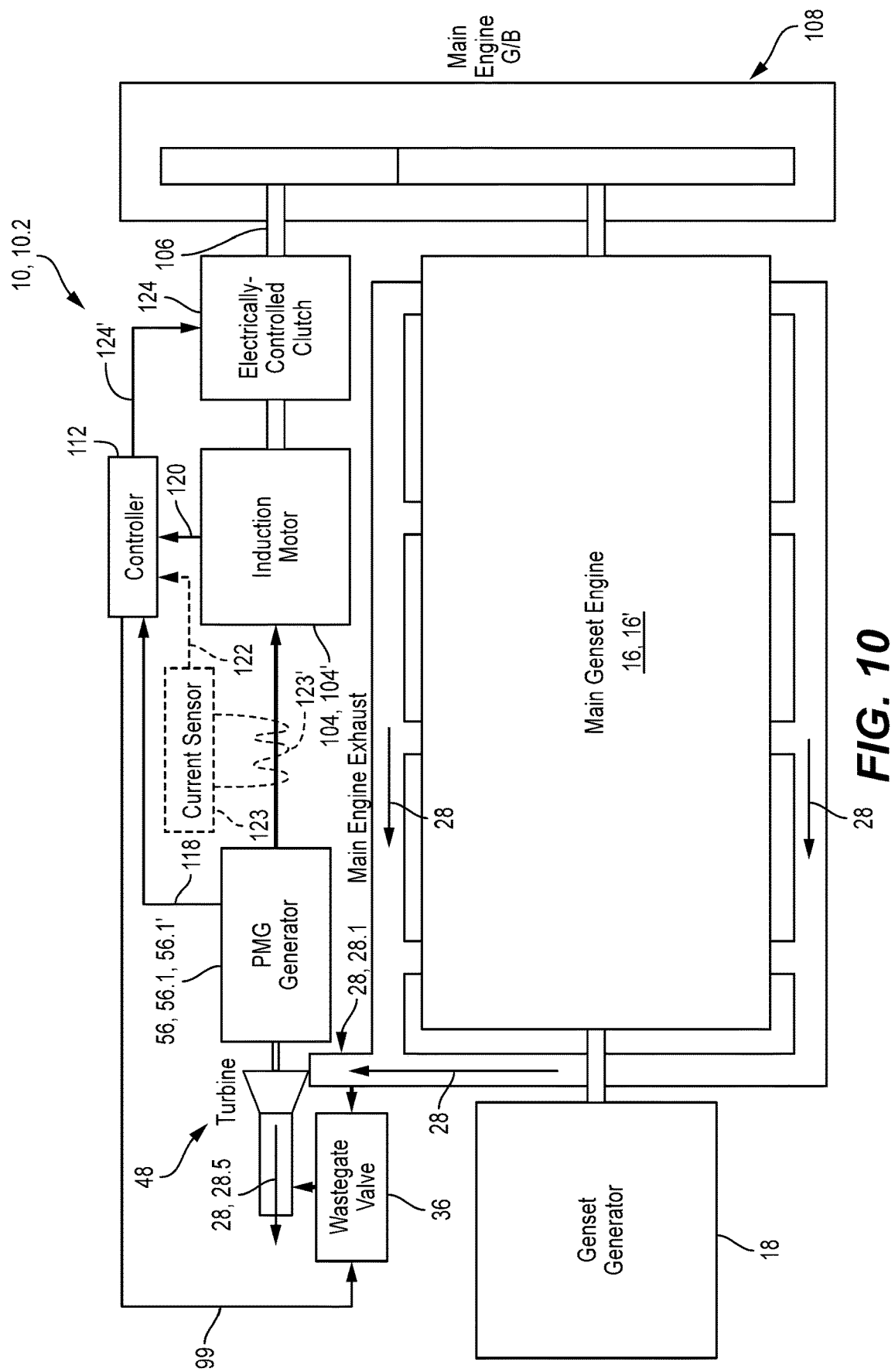
FIG. 10 illustrates a block diagram of a genset incorporating a second aspect of a turbo-electric turbo-compounding system.

Referring to FIG. 10, in accordance with a second aspect of the turbo-electric turbo-compounding system 10, 10.2, the synchronous AC generator 56, 56.1, 56.1' is directly connected to the induction motor 104, 104', the latter of which is operatively connected to the gearbox 108 via an electrically-controlled clutch 124, which, when activated responsive to an clutch-control signal 124' generated by the controller 112, provides for a transmission of torque from the rotor 106 of the induction motor 104 to the gearbox 108; and when deactivated, provides for the rotor 106 of the induction motor 104 to be decoupled from the gearbox 108, and therefore decoupled from the genset engine 16, 16'. More particularly, with the synchronous AC generator 56, 56.1, 56.1' directly connected to the induction motor 104, 104', each phase A, B, C of the three-phase permanent magnet AC generator 56.1, 56.1' is directly connected to a corresponding phase A, B, C of the three-phase induction motor 104'. The electrically-controlled clutch 124 provides for controlling whether or not the induction motor 104, 104' is coupled to the genset engine 16, 16', and therefore, whether or not the induction motor 104, 104' is capable of consuming a substantial amount of power from the three-phase permanent magnet AC generator 56.1, 56.1'. Accordingly, the electrically-controlled clutch 124 provides for effectively controlling whether or not a substantial amount of power can be transferred from the synchronous AC generator 56, 56.1, 56.1' to the induction motor 104, 104', just as the contactor 110, 110' had provided for in the context of the first aspect of the turbo-electric turbo-compounding system 10, 10.1.

Figure 11:
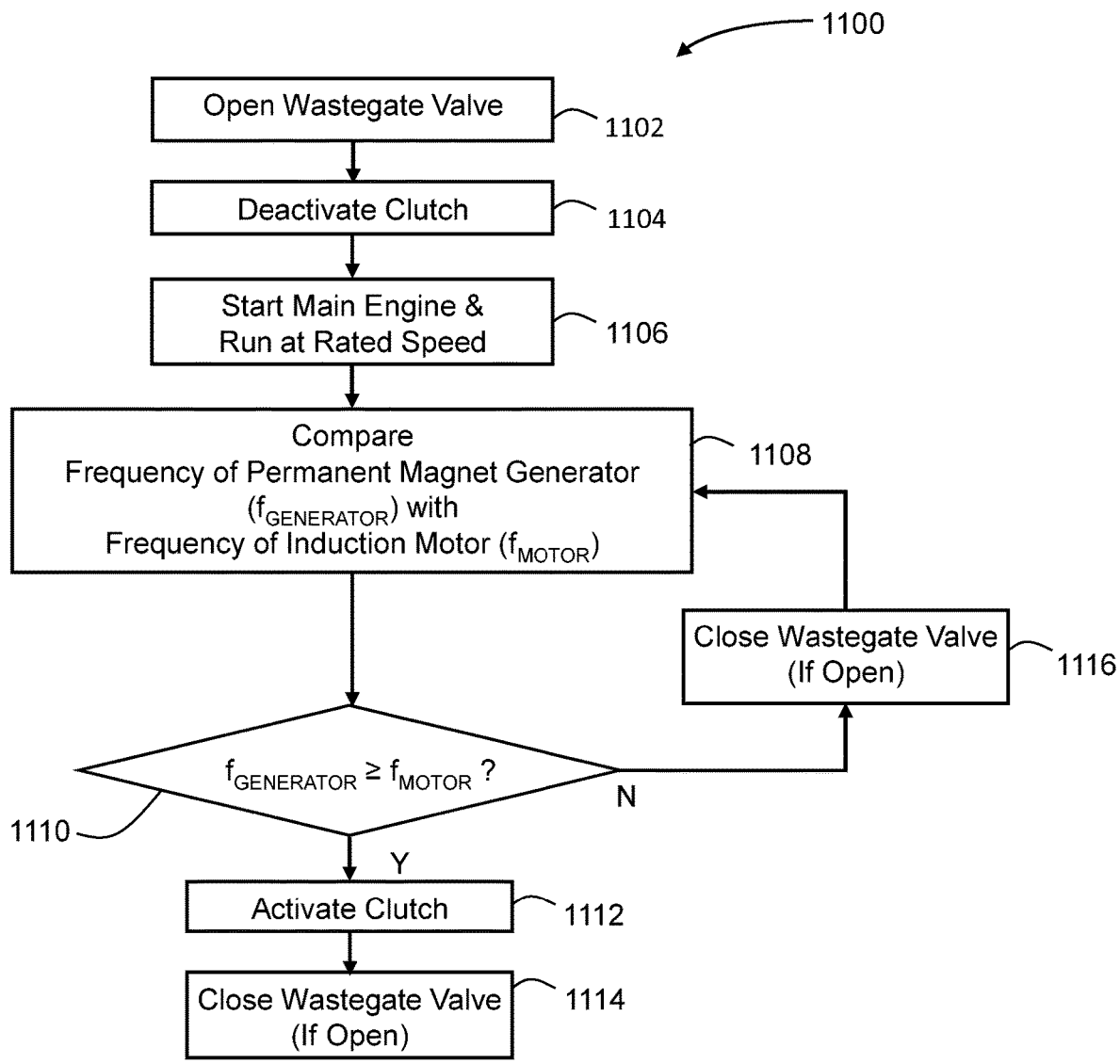
FIG. 11 illustrates a flow chart of a process for controlling the activation of the second aspect of the turbo-electric turbo-compounding system illustrated in FIG. 10.

More particularly, referring to FIG. 11, in accordance with a startup process 1100 for controlling the startup of a genset 12 incorporating the second aspect of the turbo-electric turbo-compounding system 10, 10.2, in step (1102), the wastegate valve 36 is initially open so as to provide for the exhaust gases 28 to flow relatively unimpeded through the turbo-compounder 20 without substantially acting upon the bladed turbine rotor 48. In step (1104), the electrically-controlled clutch 124 is deactivated, so as to prevent a mechanical loading of the induction motor 104, 104', which thereby prevents a more than insubstantial amount of electrical power from being extracted from the synchronous AC generator 56, 56.1, 56.1'. As a result, the exhaust gases 28, 28.1, 28.2 can flow through the turbo-compounder 20 without a substantial loss of energy. Accordingly, following step (1104), the exhaust gases 28 flowing through the turbo-electric turbo-compounding system 10, 10.2 will either bypass the bladed turbine rotor 48 or flow thereacross without causing a substantial electrical load on the synchronous AC generator 56, 56.1, 56.1', so as to provide for minimum back pressure in the exhaust discharge conduit 26, and thereby not impede a startup of the genset engine 16, 16', if the genset engine 16, 16' is not already running. Then, in step (1106), if not already started, the genset engine 16, 16' is started; and, if not already running at rated speed, the genset engine 16, 16' is run at rated speed, so as to provide for the generation of electrical power by the genset main generator 18. With the electrically-controlled clutch 124 initially deactivated following step (1104), if the genset engine 16, 16' is started in step (1106), then the induction motor 104, 104' will initially be stationary, or nearly so depending upon the extent to which exhaust gases 28.2 exiting the turbine nozzle 44 cause a rotation of the bladed turbine rotor 48, notwithstanding the wastegate valve 36 being open.

In step (1108), the first rotational-speed or frequency signal 118 of the synchronous AC generator 56, 56.1, 56.1', sensed by the associated first rotational speed or frequency sensor 114, is compared with the corresponding second rotational-speed or frequency signal 120 associated with the induction motor 104, 104'. If, in step (1110), the rotational speed, or corresponding frequency $f_{GENERATOR}$ of the synchronous AC generator 56, 56.1, 56.1' is greater than or equal to the corresponding rotational speed, or corresponding frequency $f_{MOTOR}$ of the induction motor 104, 104'—indicative of a prospective positive "frequency slip" condition—then, in step (1112), the electrically-controlled clutch 124 is activated, so as to provide for the induction motor 104, 104'—already directly electrically connected the synchronous AC generator 56, 56.1, 56.1'- to load the synchronous AC generator 56, 56.1, 56.1', which in turn, loads the bladed turbine rotor 48, initially causing a rotational deceleration thereof if rotating. Then, in step (1114), the wastegate valve 36 is closed fully, which causes substantially all of the exhaust gases 28.1 entering the inlet 22 of the turbo-compounder 20 to flow through the turbine nozzle 44 and across the bladed turbine rotor 48, thereby causing rotational acceleration of the bladed turbine rotor 48, so as to provide for the latter to reach an equilibrium speed for which the "frequency slip" and associated torque in the rotor shaft 52 corresponds to the level of power delivered to the induction motor 104, 104' from the synchronous AC generator 56, 56.1, 56.1', as described hereinabove. Otherwise, from step (1110), if the rotational speed, or corresponding frequency $f_{GENERATOR}$ of the synchronous AC generator 56, 56.1, 56.1' is not greater than or equal to the corresponding rotational speed, or corresponding frequency $f_{MOTOR}$ of the induction motor 104, 104', then, in step (1116), the wastegate valve 36 is closed, which causes exhaust gases 28.1 entering the inlet 22 of the turbo-compounder 20 to flow through the turbine nozzle 44 and across the bladed turbine rotor 48, thereby causing rotational acceleration of the bladed turbine rotor 48, so as to provide for the rotational speed, or corresponding frequency $f_{GENERATOR}$ of the synchronous AC generator 56, 56.1, 56.1' to become greater than or equal to the corresponding rotational speed, or corresponding frequency $f_{MOTOR}$ of the induction motor 104, 104'. Then, the startup process 1100 proceeds with step (1108) and continues therefrom as described hereinabove.

The genset engine 16, 16' may be shut down without first decoupling the turbo-electric turbo-compounding system 10, 10.2 from the genset engine 16, 16'—i.e. by opening the wastegate valve 36 and deactivating the electrically-controlled clutch 124, —provided that the wastegate valve 36 is opened and the electrically-controlled clutch 124 is deactivated prior to the next startup.

Figure 12A:
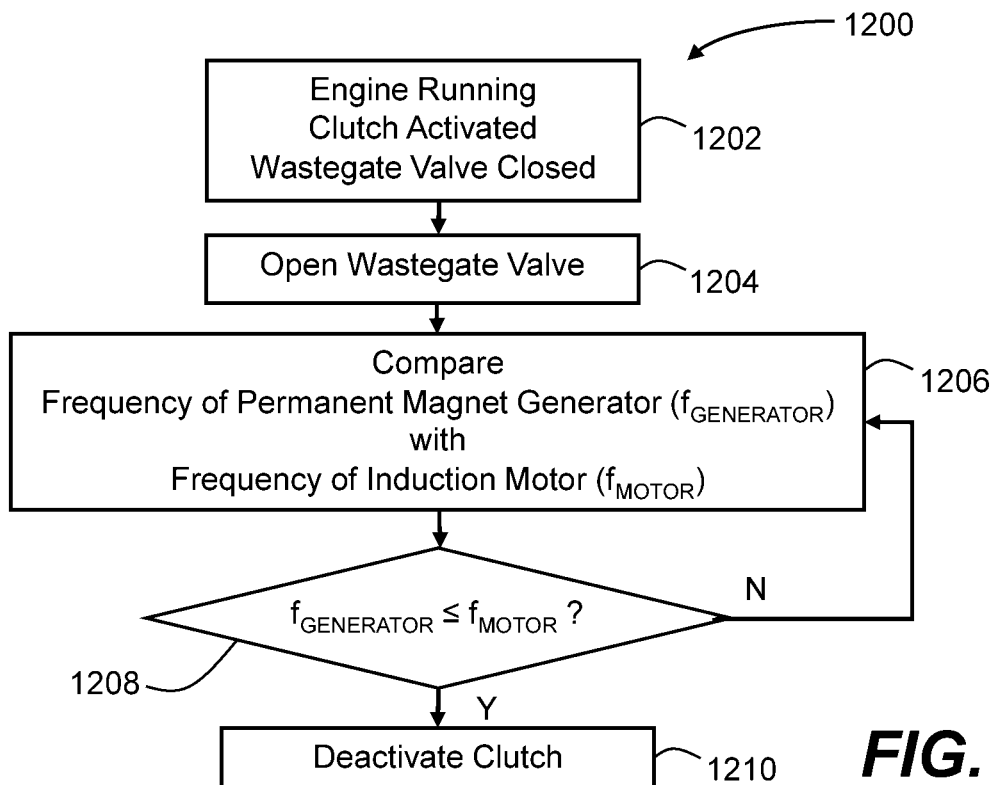
FIG. 12a illustrates a flow chart of a first embodiment of a process for controlling the deactivation of the second aspect of the turbo-electric turbo-compounding system illustrated in FIG. 10.
Figure 12B:
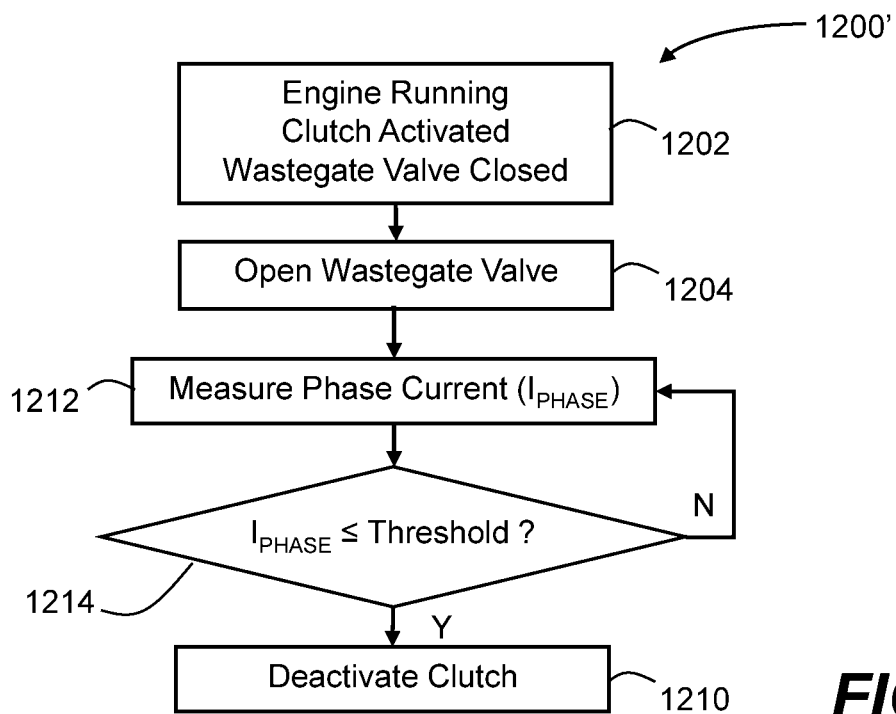
FIG. 12b illustrates a flow chart of a second embodiment of a process for controlling the deactivation of the second aspect of the turbo-electric turbo-compounding system illustrated in FIG. 10.

Alternatively, referring to FIGS. 12a and 12b, the turbo-electric turbo-compounding system 10, 10.2 may be disabled without first shutting down the genset engine 16, 16'. Referring to FIG. 12a in accordance with a first embodiment of a shutdown process 1200 for decoupling the second aspect of the turbo-electric turbo-compounding system 10, 10.2, from step (1202), with the genset engine 16, 16' running, the wastegate valve 36 closed and the electrically-controlled clutch 124 activated, in step (1204), the wastegate valve 36 is opened so as to prevent a subsequent overspeed of the bladed turbine rotor 48 upon removal of the associated electrical load from the synchronous AC generator 56, 56.1, 56.1'. As a result, the exhaust gases 28 are bypassed around the bladed turbine rotor 48, the latter of which then decelerates from a rotational speed for which the associated frequency of the $f_{GENERATOR}$ of the synchronous AC generator 56, 56.1, 56.1' was in excess of the frequency $f_{MOTOR}$, of the induction motor 104, 104' by an initial amount of "frequency slip". In step (1206), the rotational speed, or corresponding output frequency $f_{GENERATOR}$, of the synchronous AC generator 56, 56.1, 56.1' sensed by the associated first rotational speed or frequency sensor 114 is compared with the corresponding rotational speed, or corresponding frequency $f_{MOTOR}$, of the induction motor 104, 104', sensed by the associated second rotational speed or frequency sensor 116. If, and when, in step (1208), the rotational speed, or corresponding output frequency $f_{GENERATOR}$ of the synchronous AC generator 56, 56.1, 56.1' is less than or equal to the corresponding rotational speed, or corresponding frequency $f_{MOTOR}$ of the induction motor 104, 104'—indicative of negligible associated phase current—then, in step (1210), the electrically-controlled clutch 124 is deactivated so as to disconnect the induction motor 104, 104' from the genset engine 16, 16', thereby effectively removing the electrical load from the synchronous AC generator 56, 56.1, 56.1'. Otherwise, the process repeats with step (1206) until the condition of step (1208) is satisfied.

Alternatively, referring to FIG. 12b, a second embodiment of a shutdown process 1200' for decoupling the second aspect of the turbo-electric turbo-compounding system 10, 10.2 is the same as the above-described first embodiment of the shutdown process 1200 except that steps (1206) and (1208) of the first embodiment 1200 are respectively replaced with steps (1212) and (1214) of the second embodiment 1200', the latter which provide for determining when to deactivate the electrically-controlled clutch 124 explicitly responsive to a measurement—from the associated phase-current sensor 123, 123'—of phase current $I_{PHASE}$ from the synchronous AC generator 56, 56.1, 56.1' to the induction motor 104, 104' for one of the corresponding phases A, B, C. More particularly, following above-described step (1204), in step (1212), the phase current $I_{PHASE}$ from the synchronous AC generator 56, 56.1, 56.1' to the induction motor 104, 104' of one of the phases A, B or C is explicitly measured by the phase-current sensor 123, 123' with the electrically-controlled clutch 124 activated. Then, in step (1214), if the phase current $I_{PHASE}$ is less than a threshold, then, in step (1210), the electrically-controlled clutch 124 deactivated. Otherwise, the process repeats with step (1212) until the condition of step (1214) is satisfied. Accordingly, the second embodiment of the shutdown process 1200' explicitly provides for deactivating the electrically-controlled clutch 124 at a zero or near-zero current condition.

Figure 13:
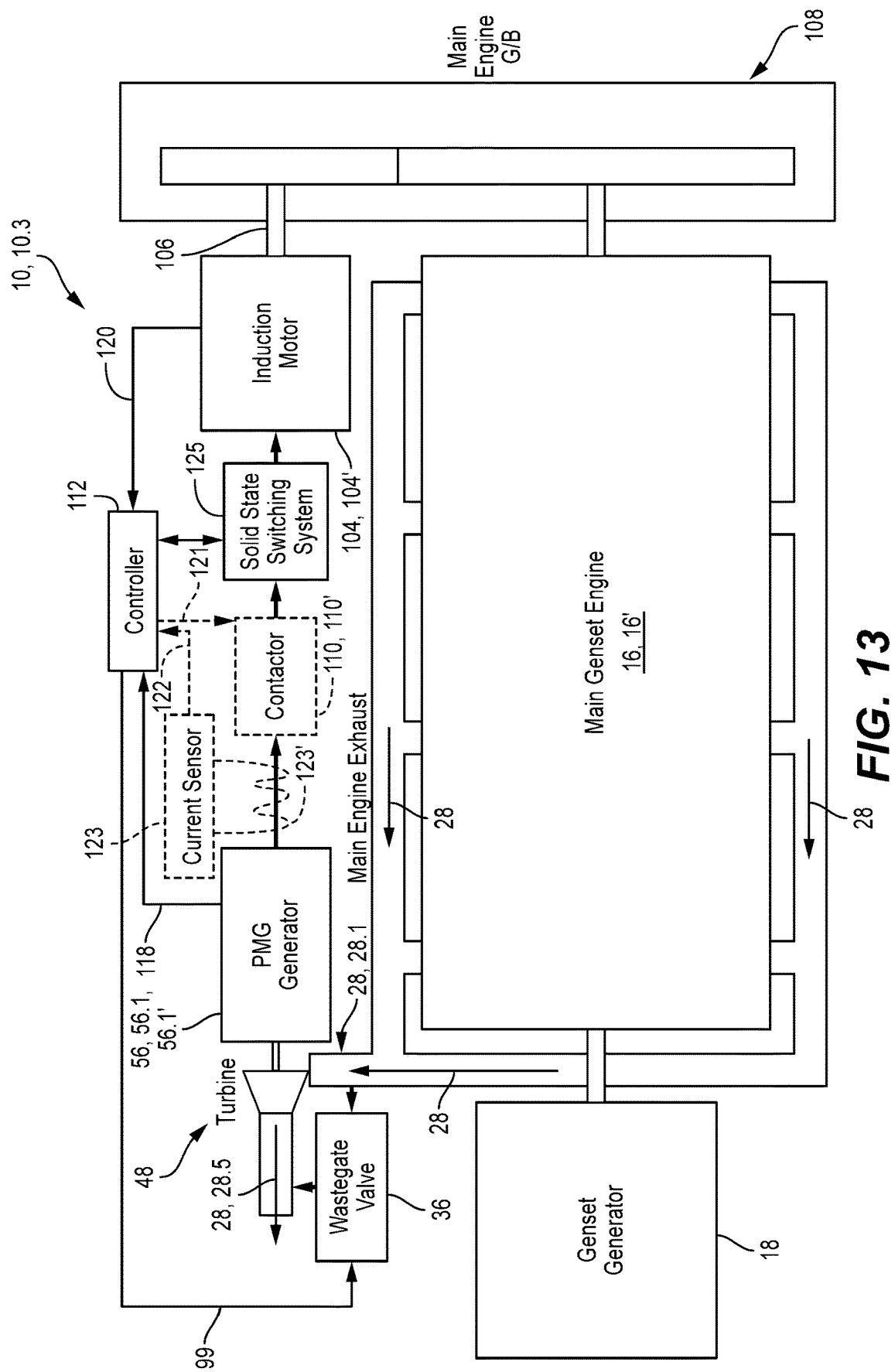
FIG. 13 illustrates a block diagram of a genset incorporating a third aspect of a turbo-electric turbo-compounding system.

Referring to FIG. 13, in accordance with a third aspect of the turbo-electric turbo-compounding system 10, 10.3, the synchronous AC generator 56, 56.1, 56.1' is connected to the induction motor 104, 104' via an associated solid-state switching system 125—or, more generally, a solid-state control system, —the latter of which is under control of a controller 112, and optionally also via an associated contactor 110, 110'—also under control of the controller 112— either between the synchronous AC generator 56, 56.1, 56.1' and the solid-state switching system 125, or between the solid-state switching system 125 and the induction motor 104, 104'. The third aspect of the turbo-electric turbo-compounding system 10, 10.3 operates the same as described hereinabove for the first aspect of the turbo-electric turbo-compounding system 10, 10.3 in respect of the elements common therebetween. The solid-state switching system 125 provides for actively limiting the current in each phase A, B, C (i.e. the associated phase current) responsive to measurements of either frequency, output voltage or output power of the synchronous AC generator 56, 56.1, 56.1', frequency of the induction motor 104, 104' or phase current in accordance with known control system design practice so as to provide for achieving stability more quickly than otherwise possible without the solid-state switching system 125. For example, the magnitude of the phase current would affect the overall open-loop gain of an associated speed-control system, which would there affect the stability of the associated speed-control system. The solid-state switching system 125 provides for additional torque control responsive to power or phase-current switching, so as to control the effective level of current from the synchronous AC generator 56, 56.1, 56.1' to the induction motor 104, 104', so as to either improve stability, or provide for controlling the ratio of rotational speed of the synchronous AC generator 56, 56.1, 56.1' to the rotational speed of the induction motor 104, 104' in order to provide for improved operating efficiency. The contactor 110, 110' would be optional if the solid-state switching system 125 were configured to provide for switching the associated phase current completely off. As with the first 10.1 and second 10.2 aspects, in accordance with the third aspect 10.3, the maximum level of phase current is also limited by the amount of "frequency slip" between the synchronous AC generator 56, 56.1, 56.1' and the induction motor 104, 104'.

Figure 14:
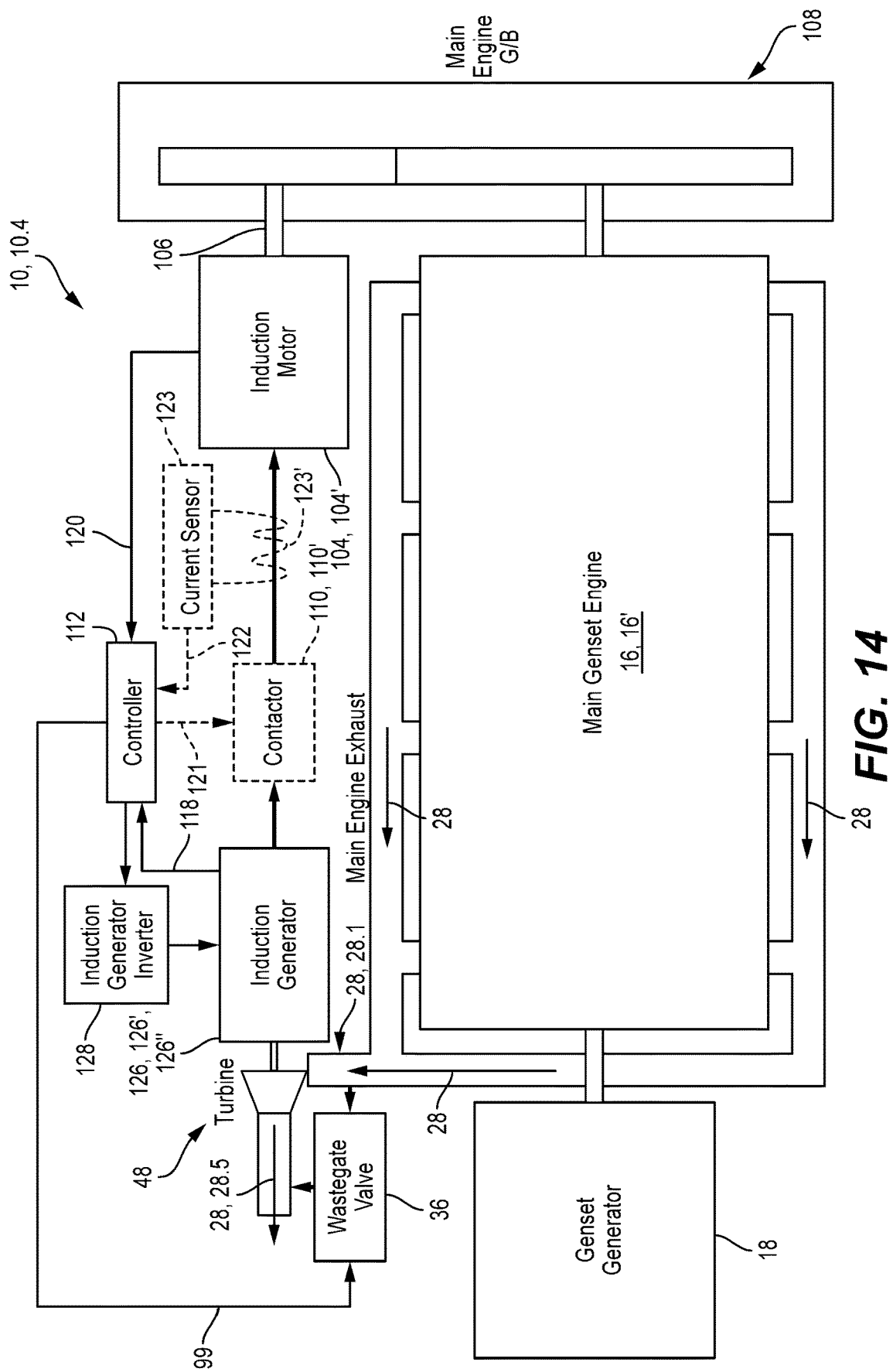
FIG. 14 illustrates a block diagram of a genset incorporating a fourth aspect of a turbo-electric turbo-compounding system.
Figure 15:
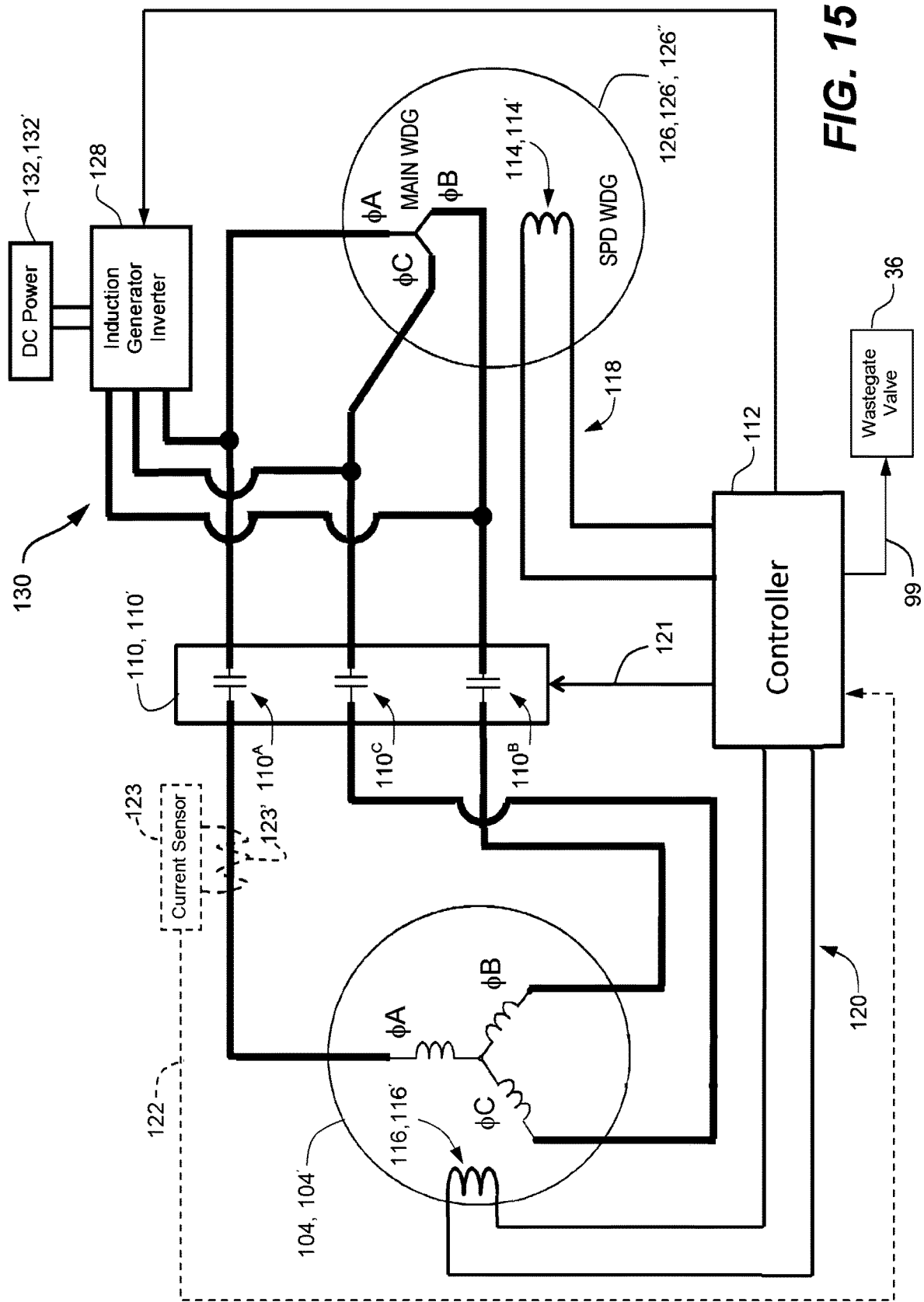
FIG. 15 illustrates a schematic block diagram of a three-phase asynchronous generator in cooperation with an associated induction-generator inverter, operatively coupled to a three-phase induction motor, in accordance with the fourth aspect of the turbo-electric turbo-compounding system illustrated in FIG. 14.

Referring to FIGS. 14 and 15, in accordance with a fourth aspect of a turbo-electric turbo-compounding system 10, 10.4, the synchronous AC generator 56, 56.1, 56.1' is replaced with an asynchronous AC generator 126, for example, an induction generator 126', for example, a three-phase induction generator 126", —or more generally, a multi-phase induction generator comprising at least three phases, wherein the number of phases is the same as the corresponding above-described multi-phase induction motor—that is directly connected to the induction motor 104, 104', wherein excitation to the induction generator 126, 126', 126" is provided by an associated induction-generator inverter 128 under control of a controller 112. To the extent that the induction-generator inverter 128 would not provide for preventing the generation of power by the asynchronous AC generator 126, 126', 126", the latter may optionally be interconnected to the induction generator 126, 126', 126" via an associated contactor 110, 110', under control of the controller 112 in the same manner as described hereinabove for the first aspect of the turbo-electric turbo-compounding system 10, 10.1.

An induction generator 126, 126', 126" is similar in construction to an induction motor, but, in order to generate power, is rotated above the synchronous speed associated with an AC excitation 130 that is simultaneously applied to the phases A, B, C thereof, and which is otherwise unable to generate power absent the applied AC excitation 130. The AC excitation 130 is generated by the induction-generator inverter 128 that generates controllable-frequency three-phase power from electrical power provided by a DC Power Supply 132, for example, a battery 132', at a frequency that is less than the synchronous frequency corresponding to the rotational speed of the synchronous AC generator 56.

Figure 16:
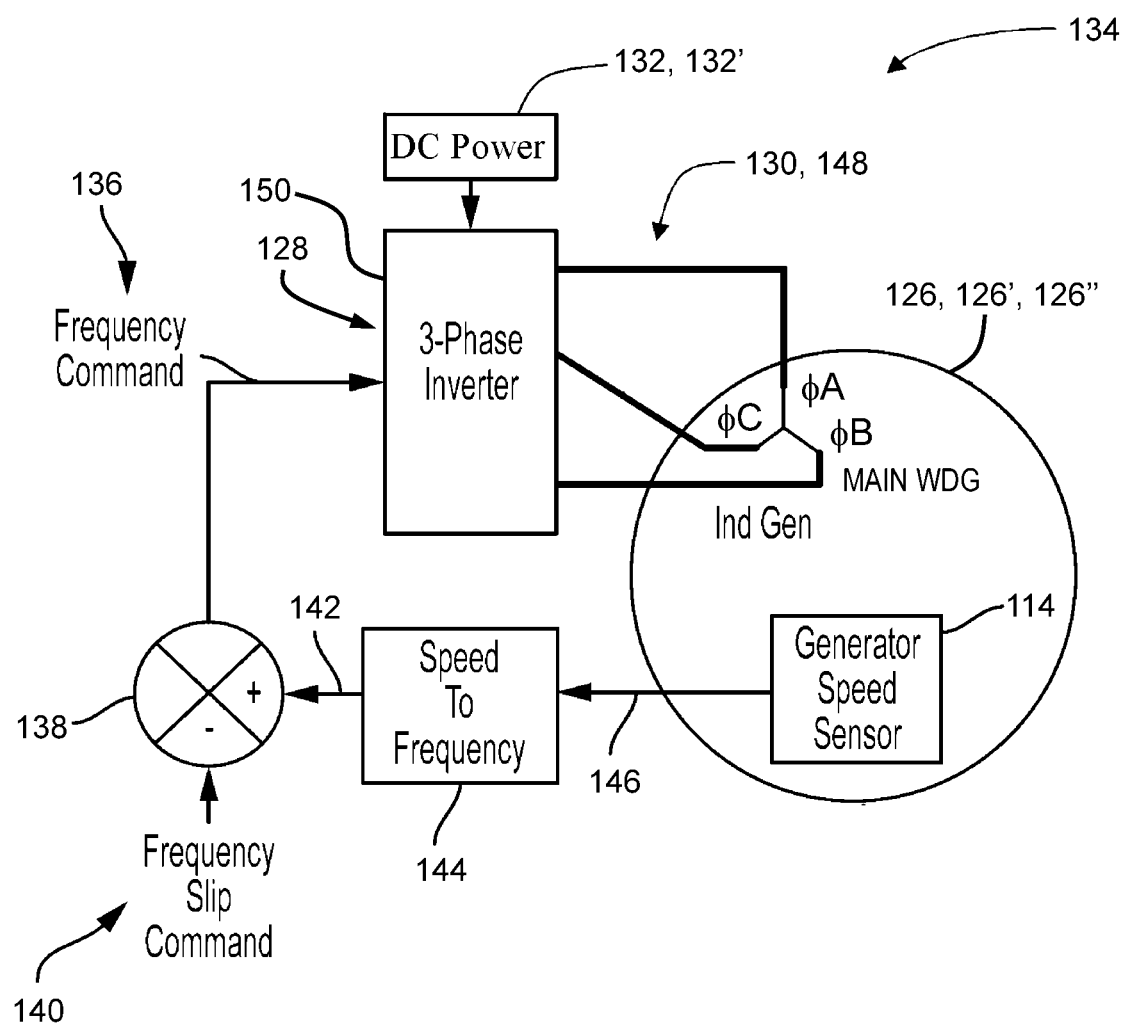
FIG. 16 illustrates a schematic block diagram of a three-phase asynchronous generator operatively coupled to an associated induction-generator inverter, in accordance with the fourth aspect of the turbo-electric turbo-compounding system illustrated in FIG. 14.
Figure 17:
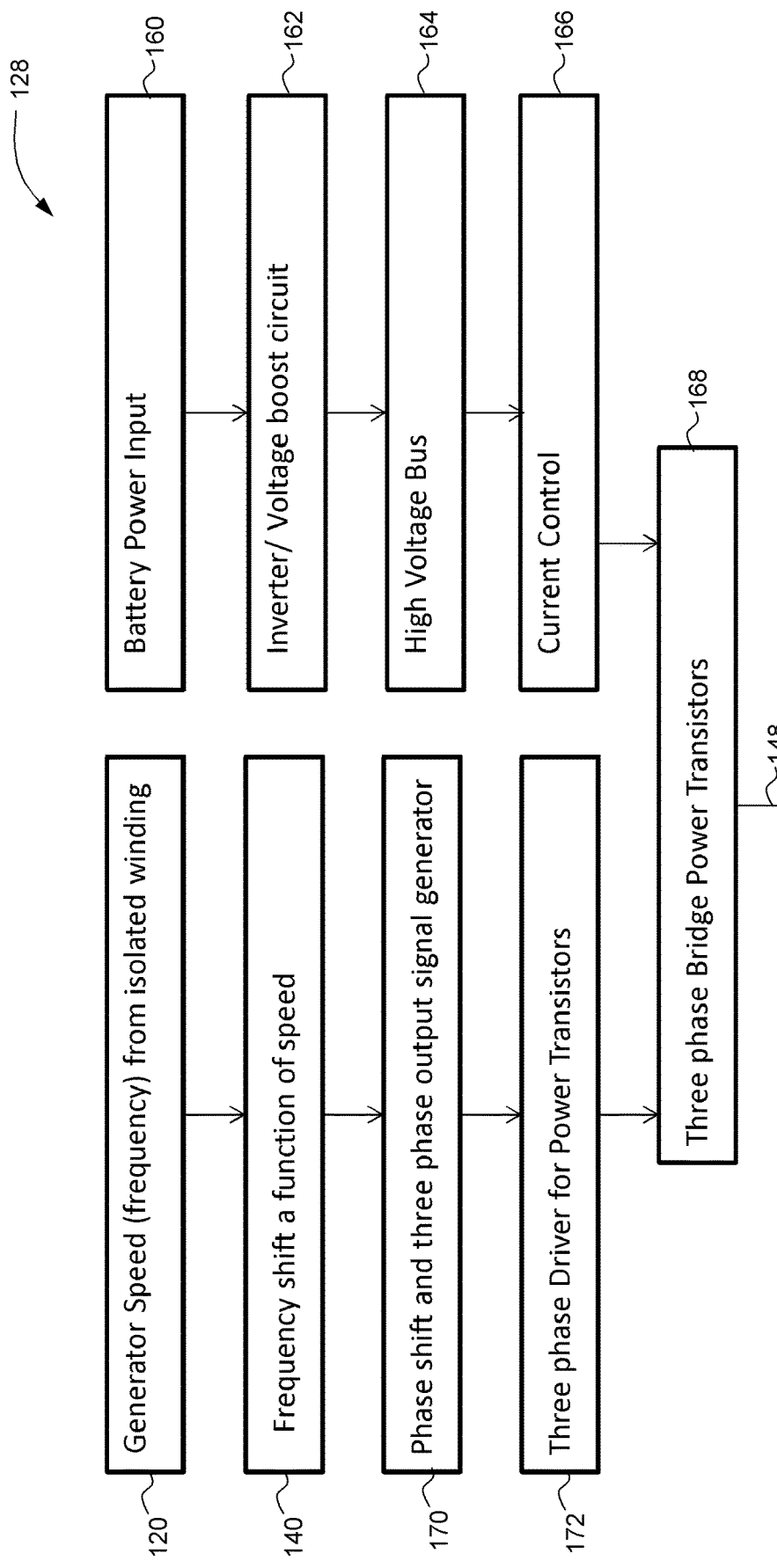
FIG. 17 illustrates a block diagram of one embodiment of an induction-generator inverter.

For example, referring to FIGS. 16 and 17, in accordance with one set of embodiments, the induction-generator inverter 128 incorporates an excitation frequency control system 134 that provides for controlling the frequency of the AC excitation 130 applied to the phases A, B, C of the asynchronous AC generator 126, 126', 126". More particularly, a frequency command signal 136 is generated by subtracting 138 a frequency-slip command signal 140 from a synchronous frequency signal 142 that is determined by a speed-to-frequency transformation 144 of a rotational speed signal 146 from the rotational-speed sensor 114 of the asynchronous AC generator 126, 126', 126". In one set of embodiments, the frequency-slip command signal 140 is a function of the rotational speed of the asynchronous AC generator 126, 126', 126", e.g. as given by the first rotational-speed or frequency signal 118, and is adapted so as to provide for frequency-slip to increase with increasing rotational speed. The frequency of the three-phase output signal 148 of an associated three-phase inverter 150 is then set to the frequency of the corresponding frequency-slip command signal 140, or more generally, a multi-phase output signal of an associated multi-phase inverter, comprising at least three phases, wherein the number of phases is the same as the number of phases of the associated multi-phase asynchronous AC generator 126, 126', 126".

The torque generated by the induction motor 104, 104' is responsive to the associated frequency slip thereof, i.e. the amount by which the frequency of the AC power generated by the asynchronous AC generator 126, 126', 126" exceeds the synchronous frequency corresponding to the rotational speed of the induction motor 104, 104', wherein the frequency of the AC power generated by the asynchronous AC generator 126, 126', 126" is responsive to the rotational speed thereof. The amount of current generated by the asynchronous AC generator 126, 126', 126"—and the associated resulting torque generated by the induction motor 104, 104'—is responsive to the frequency slip thereof, i.e. the amount by which the synchronous frequency corresponding to the rotational speed of the asynchronous AC generator 126, 126', 126" exceeds the frequency of the three-phase output signal 148 from the three-phase inverter 150.

Figure 18:
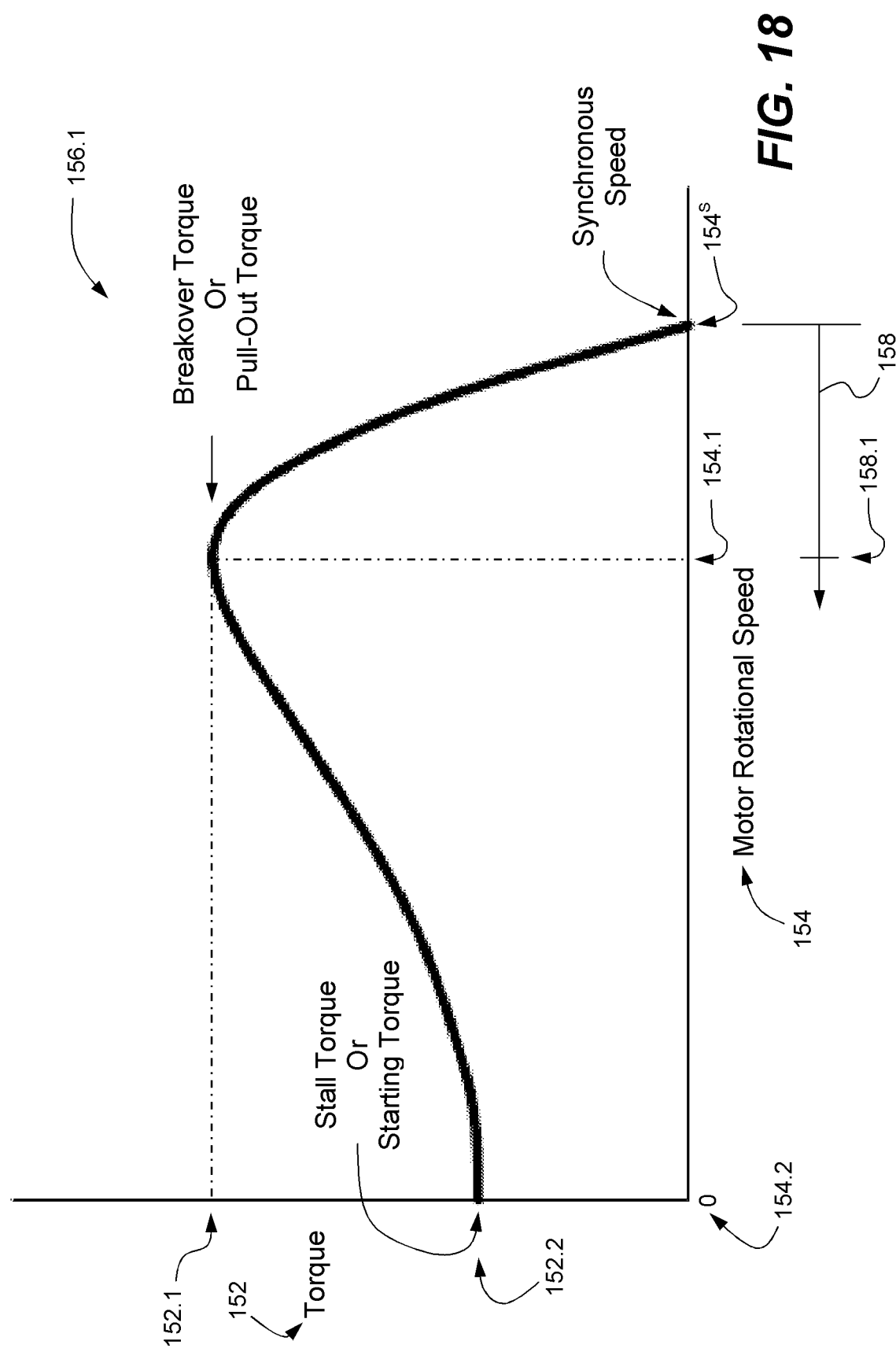
FIG. 18 illustrates a graph of shaft torque as a function of rotational speed relative to the associated synchronous speed, for a generic induction motor operating in a motoring mode of operation.

For example, FIG. 18 illustrates a graph of shaft torque 152 as a function of rotational speed 154 relative to the associated synchronous rotational speed $154^S$ for a generic induction motor—representative of the induction motor 104, 104', —in a motoring mode 156.1 of operation, wherein shaft torque 152 produced by the induction motor 104, 104' increases with increasing frequency slip 158 up to a maximum possible shaft torque 152.1, referred to as a "breakover torque", which occurs at an associated rotational speed 154.1 and frequency slip 158.1. The shaft torque 152 decreases with further increasing frequency slip 158, wherein the minimum shaft torque 152.2 occurs at stall, i.e. zero rotational speed 154.2. Accordingly, the induction motor 104, 104' is designed so that at any operating rotational speed 154, the maximum shaft torque 152 during operation thereof is less than the corresponding associated breakover shaft torque 152.1.

Figure 19:
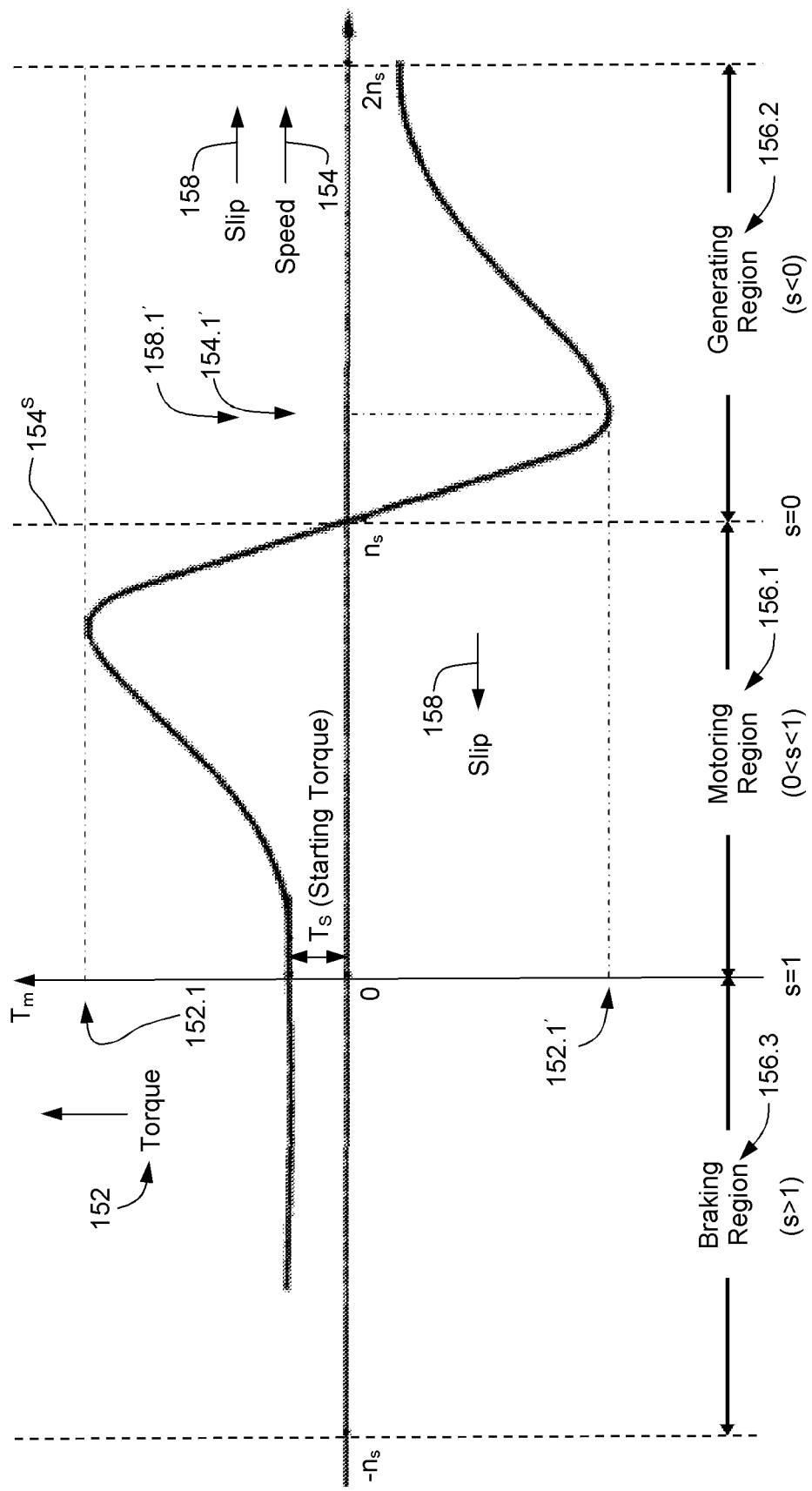
FIG. 19 illustrates a graph of shaft torque as a function of rotational speed relative to the associated synchronous speed, for an induction machine over a range of rotational speeds spanning generating, motoring and braking modes of operation.

Furthermore, FIG. 19 illustrates a graph of shaft torque 152 as a function of rotational speed 154 relative to the associated synchronous rotational speed $154^S$, for a generic induction machine in all modes of operation, including the motoring mode 156.1 illustrated in FIG. 18, representative of the induction motor 104, 104'; a generating mode 156.2 representative of the induction generator 126, 126', 126"; and, for completeness, a braking mode 156.3. The various modes of operation are delineated with respect to the value of a normalized slip parameter s, defined as follows:

$$s = \frac{(n_s - n)}{n_s}, \quad (1)$$

wherein $n_S$ is the synchronous rotational speed $154^S$, n is the rotational speed 154, and frequency slip 158 is proportional to $(n_S - n)$. Accordingly, for s>1, the induction machine operates in the braking mode 156.3; for 0<s<1, the induction machine operates in the motoring mode 156.1; and for s<0, the induction machine operates in the generating mode 156.2. For the induction generator 126, 126', 126"—which operates in the generating mode 156.2—the rotational speed 154 is greater than the synchronous rotational speed $154^S$, and the magnitude of the shaft torque 152 increases with increasing magnitude of frequency slip 158 up to a maximum possible shaft torque 152.1', also referred to as a "breakover torque", which occurs at an associated rotational speed 154.1' and frequency slip 158.1', and decreases with further increasing magnitude of frequency slip 158.

For the induction generator 126, 126', 126", the synchronous frequency is provided by the induction-generator inverter 128. The induction generator 126, 126', 126" operates at a rotational speed 154 above the corresponding synchronous rotational speed $154^S$, and the induction motor 104, 104' operates at a rotational speed 154 below the corresponding synchronous rotational speed $154^S$, in order to provide for torque to be effectively transmitted from the induction generator 126, 126', 126" to the induction motor 104, 104'. Furthermore, in one set of embodiments, the voltage from the induction-generator inverter 128 excitation source is adjusted so that the output of the induction generator 126, 126', 126" operates with a nearly constant ratio of frequency to voltage, in the same manner as described hereinabove for the permanent magnet AC generator 56.1, 56.1'. Accordingly, the induction-generator inverter 128 provides both for an appropriate amount of frequency slip, and for controlling the output voltage of the induction generator 126, 126', 126" as a function of frequency. One example of a control system that provides for this functionality in the contexts of a hybrid vehicle is disclosed in Application Note No. AN1930 entitled "3-Phase AC Induction Motor Vector Control Using a 56F80x, 56F8100 or 56F8300 Device" by Jaroslav Lepda and Petr Stekl, published by Freescale Semiconductor, Rev. 2, February 2005, which is incorporated by reference herein in its entirety.

For comparison, the rotational speed 154 of the bladed turbine rotor 48 would be higher when used with an induction generator 126, 126', 126" than when used with a permanent magnet AC generator 56.1, 56.1' at any corresponding loaded operating point of the induction motor 104, 104'.

For an asynchronous AC generator 126, 126', 126" comprising an induction generator 126, 126', 126", the associated frequency-slip command signal 140 is automatically controlled by the controller 112 to a level responsive to the rotational speed thereof, for example, directly related, e.g. proportional to the rotational speed of the bladed turbine rotor 48/asynchronous AC generator 126, 126', 126", so that the amount of frequency slip increases with increasing rotational speed. The generated AC electrical power from the induction generator 126, 126', 126" drives the induction motor 104, 104' at a rotational speed that is inherently determined by the induction motor 104, 104' responsive to the torque on the shaft of the rotor 106 of the induction motor 104, 104' that supplies power to the genset engine 16, 16' via the gearbox 108 therebetween. For a given frequency of the applied AC electrical power from the asynchronous AC generator 126, 126', 126"—which is determined by the rotational speed thereof, —the amount of frequency slip of the induction motor 104, 104' increases with torque, resulting in a corresponding increase in current to the induction motor 104, 104', which inherently acts to provide for the induction motor 104, 104' to operate at a corresponding stable rotational speed corresponding to the given level of torque. Accordingly, for any given state of operation of the genset engine 16, 16', the induction motor 104, 104' will inherently seek a corresponding rotational speed that depends upon the corresponding level of torque provided thereby to the genset engine 16, 16'.

Referring further to FIG. 17, in one set of embodiments, the induction-generator inverter 128 generates the three-phase output signal 148 by boosting the voltage of the DC-power input 160 from the DC Power Supply 132 with an inverter/voltage boost circuit 162, so as to generate a relatively-high voltage supply on a high-voltage bus 164 that is provided through a current control circuit 166 to power a set of three-phase bridge power transistors 168, or more generally, a set of multi-phase bridge power transistors, comprising at least three phases, wherein the number of phases is the same as the number of phases of the associated multi-phase asynchronous AC generator 126. For example, the voltage boost of the inverter/voltage boost circuit 162 can be provided for by either magnification of an AC signal using a transformer, or by any of various known pulse-based voltage magnification techniques, for example, as used by known voltage doubler or charge pump circuits, wherein the resulting level of the voltage of the high-voltage bus 164 can be either fixed, i.e. DC, or fluctuating. The waveform of a sinusoidal signal at the frequency of the frequency command signal 136 is then synthesized and phase shifted 170 so as to generate the three phases at a frequency that provides for the necessary torque from the induction motor 104, 104', and then input to a three-phase driver 172—or more generally, a multi-phase driver, comprising at least three phases, wherein the number of phases is the same as the number of phases of the associated multi-phase asynchronous AC generator 126—that provides for driving the three-phase bridge power transistors 168, for example, by pulse-modulation or pulse width modulation, so that the switched output of the three-phase bridge power transistors 168—powered from the high-voltage bus 164—provides the corresponding three-phase output signal 148, possibly including filtering by an associated filtering network in conjunction with the inductance of the windings of the asynchronous AC generator 126, 126', 126" and induction motor 104, 104'.

The induction motor 104, 104' operates at a rotational speed for which the corresponding associated synchronous frequency is less than the frequency of the output frequency of the asynchronous AC generator 126, 126', 126", wherein the magnitude of the frequency slip increases with load as necessary to generate the required torque in the shaft of the rotor 106 of the induction motor 104, 104', the same as for the first aspect. Under no-load conditions, frequency slip will be nearly zero, but non-zero as a result of parasitic losses, friction, and windage in the induction motor 104, 104'; and the ratio of the rotational speeds of the induction motor 104, 104' and the asynchronous AC generator 126, 126', 126" is determined by the ratio of the number of poles of the respective electrical machines.

It should be understood that that the solid-state switching system 125 of the third aspect of the turbo-electric turbo-compounding system 10, 10.3—an extension to the first aspect of the turbo-electric turbo-compounding system 10, 10.1—may also be used in cooperation with the second 10.2 or fourth 10.4 aspects of the turbo-electric turbo-compounding system 10, so as to provide either for enhanced speed control or for improved efficiency. Generally, the activation of the turbo-electric turbo-compounding system 10, 10.1, 10.2, 10.3, 10.4 in accordance with any of the first 10.1 through fourth 10.4 aspects is controlled by initially decoupling the synchronous 56, 56.1, 56.1' or asynchronous 126, 126', 126" AC generator from the genset engine 16, 16'—either electrically or mechanically, depending upon the aspect—and opening the wastegate valve 36, prior to starting the genset engine 16, 16'. Then, after starting the genset engine 16, 16', the rotational speeds of the synchronous 56, 56.1, 56.1' or asynchronous 126, 126', 126" AC generator and the induction motor 104, 104' are compared, and the synchronous 56, 56.1, 56.1' or asynchronous 126, 126', 126" AC generator and the genset engine 16, 16' are coupled when the frequency of the synchronous 56, 56.1, 56.1' or asynchronous 126, 126', 126" AC generator meets or exceeds the frequency of the induction motor 104, 104'—thereby satisfying an associated coupling-speed condition, —wherein if the frequency of the latter initially exceeds that of the former, the wastegate valve 36 is closed so that the coupling-speed condition can be met. If not already closed, the wastegate valve 36 is closed after the synchronous 56, 56.1, 56.1' or asynchronous 126, 126', 126" AC generator is coupled to the genset engine 16, 16'.

Figure 20:
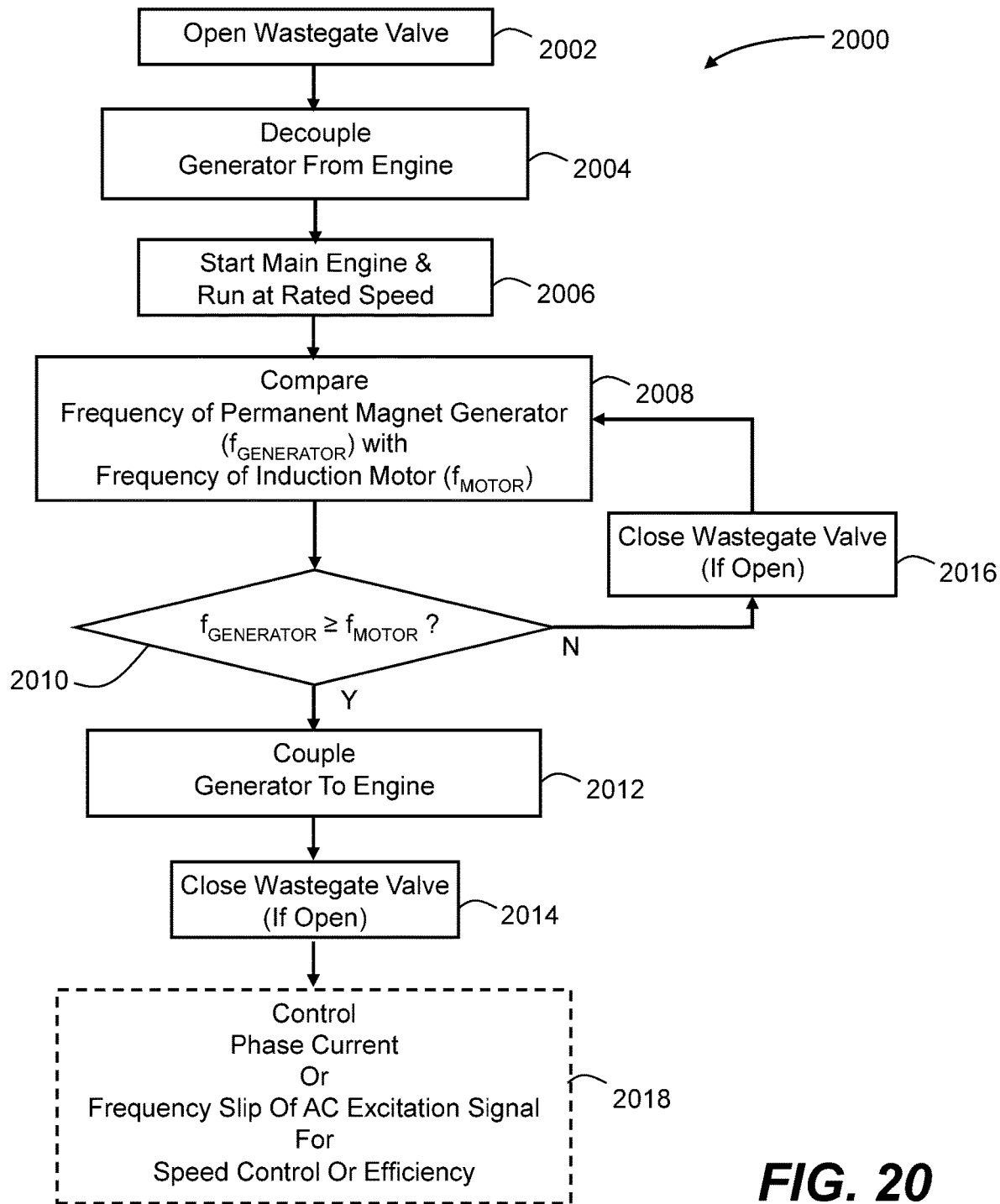
FIG. 20 illustrates a flow chart of a process for controlling the activation of a generic turbo-electric turbo-compounding system in accordance with any of the first through fourth aspects illustrated in FIG. 6, 10, 13 or 14.

More particularly, referring to FIG. 20, in accordance with a generic startup process 2000 for controlling the startup of a genset 12 in cooperation with any of the first 10.1 through fourth 10.4 aspects of the turbo-electric turbo-compounding system 10, in step (2002), the wastegate valve 36 is initially open so as to provide for the exhaust gases 28 to flow relatively unimpeded through the turbo-compounder 20 without substantially acting upon the bladed turbine rotor 48. In step (2004), the synchronous 56, 56.1, 56.1' or asynchronous 126, 126', 126" AC generator is decoupled from the genset engine 16, 16', for example, either a) by opening the contactor 110, 110' associated with the first aspect 10.1, and optionally associated with the third 10.3 or fourth 10.4 aspects, b) by deactivating the electrically-controlled clutch 124 associated with the second aspect 10.2, c) by nulling the phase current with the solid-state switching system 125 of the third aspect 10.3, or d) by nulling the associated AC excitation 130 from the induction-generator inverter 128 of the fourth aspect 10.4; so as to prevent an electrical loading of the synchronous 56, 56.1, 56.1' or asynchronous 126, 126', 126" AC generator by the induction motor 104, 104', or a mechanical loading of the induction motor 104, 104' by the genset engine 16, 16', which thereby prevents a more than insubstantial amount of electrical power from being extracted from the synchronous 56, 56.1, 56.1' or asynchronous 126, 126', 126" AC generator. As a result, the exhaust gases 28, 28.1, 28.2 can flow through the turbine nozzle 44 and across the bladed turbine rotor 48 without substantial loss. Accordingly, following step (2004), the exhaust gases 28 flowing through the turbo-electric turbo-compounding system 10, 10.2 will either bypass the bladed turbine rotor 48 or flow thereacross without causing a substantial electrical load on the synchronous AC generator 56, 56.1, 56.1', so as to provide for minimum back pressure in the exhaust discharge conduit 26, and thereby not impede a startup of the genset engine 16, 16', if the genset engine 16, 16' is not already running. Then, in step (2006), if not already started, the genset engine 16, 16' is started; and, if not already running at rated speed, the genset engine 16, 16' is run at rated speed, so as to provide for the generation of electrical power by the genset main generator 18.

Then, in step (2008), the first rotational-speed or frequency signal 118 of the synchronous 56, 56.1, 56.1' or asynchronous 126, 126', 126" AC generator, sensed by the associated first rotational speed or frequency sensor 114, is compared with the corresponding second rotational-speed or frequency signal 120 associated with the induction motor 104, 104'. If, in step (2010), the rotational speed, or corresponding frequency $f_{GENERATOR}$ of the synchronous AC generator 56, 56.1, 56.1' is greater than or equal to the corresponding rotational speed, or corresponding frequency $f_{MOTOR}$ of the induction motor 104, 104'—indicative of a prospective positive "frequency slip" condition—then, in step (2012), the synchronous 56, 56.1, 56.1' or asynchronous 126, 126', 126" AC generator is coupled to the genset engine 16, 16', for example, either a) by closing the contactor 110, 110' associated with the first aspect 10.1, and optionally associated with the third 10.3 or fourth 10.4 aspects, b) by activating the electrically-controlled clutch 124 associated with the second aspect 10.2, c) by providing for non-zero phase current by action of the solid-state switching system 125 of the third aspect 10.3, or d) by providing an associated AC excitation 130 from the induction-generator inverter 128 of the fourth aspect 10.4; so as to provide for the genset engine 16, 16' to load the induction motor 104, 104', and for the induction motor 104, 104' to load the synchronous 56, 56.1, 56.1' or asynchronous 126, 126', 126" AC generator, which in turn, loads the bladed turbine rotor 48, initially causing a rotational deceleration thereof if rotating. Alternatively, the coupling of the synchronous 56, 56.1, 56.1' or asynchronous 126, 126', 126" AC generator to the genset engine 16, 16' may also be dependent upon the absolute rotational speed of the synchronous 56, 56.1, 56.1' or asynchronous 126, 126', 126" AC generator exceeding a threshold level, for example, given as a particular percentage of rated rotational speed. Then, in step (2014), the wastegate valve 36 is closed fully, which causes substantially all of the exhaust gases 28.1 entering the inlet 22 of the turbo-compounder 20 to flow through the turbine nozzle 44 and across the bladed turbine rotor 48, thereby causing rotational acceleration of the bladed turbine rotor 48, so as to provide for the latter to reach an equilibrium speed for which the "frequency slip" and associated torque in the rotor shaft 52 corresponds to the level of power delivered to the induction motor 104, 104' from the synchronous AC generator 56, 56.1, 56.1', as described hereinabove. Otherwise, from step (2010), if the rotational speed, or corresponding frequency $f_{GENERATOR}$ of the synchronous AC generator 56, 56.1, 56.1' is initially not greater than or equal to the corresponding rotational speed, or corresponding frequency $f_{MOTOR}$ of the induction motor 104, 104', then, in step (2016), the wastegate valve 36 is closed, which causes exhaust gases 28.1 entering the inlet 22 of the turbo-compounder 20 to flow through the turbine nozzle 44 and across the bladed turbine rotor 48, thereby causing rotational acceleration of the bladed turbine rotor 48, so as to provide for the rotational speed, or corresponding frequency $f_{GENERATOR}$ of the synchronous AC generator 56, 56.1, 56.1' to become greater than or equal to the corresponding rotational speed, or corresponding frequency $f_{MOTOR}$ of the induction motor 104, 104'. Then, the startup process 2000 proceeds with step (2008) and continues as described hereinabove. Following step (2014), in step (2018), for the third aspect 10.3, the phase current is controlled by the solid-state switching system 125 so as to provide for either stable speed control or improved efficiency, and for the fourth aspect 10.4, the frequency slip of the AC excitation 130 is controlled by the excitation frequency control system 134 so as to provide for the associated asynchronous AC generator 126, 126', 126" to generate power.

The genset engine 16, 16' may be shut down without first decoupling the turbo-electric turbo-compounding system 10, 10.2 provided that the wastegate valve 36 is opened and the synchronous 56, 56.1, 56.1' or asynchronous 126, 126', 126" AC generator is decoupled from the genset engine 16, 16' prior to the next startup.

Figure 21A:
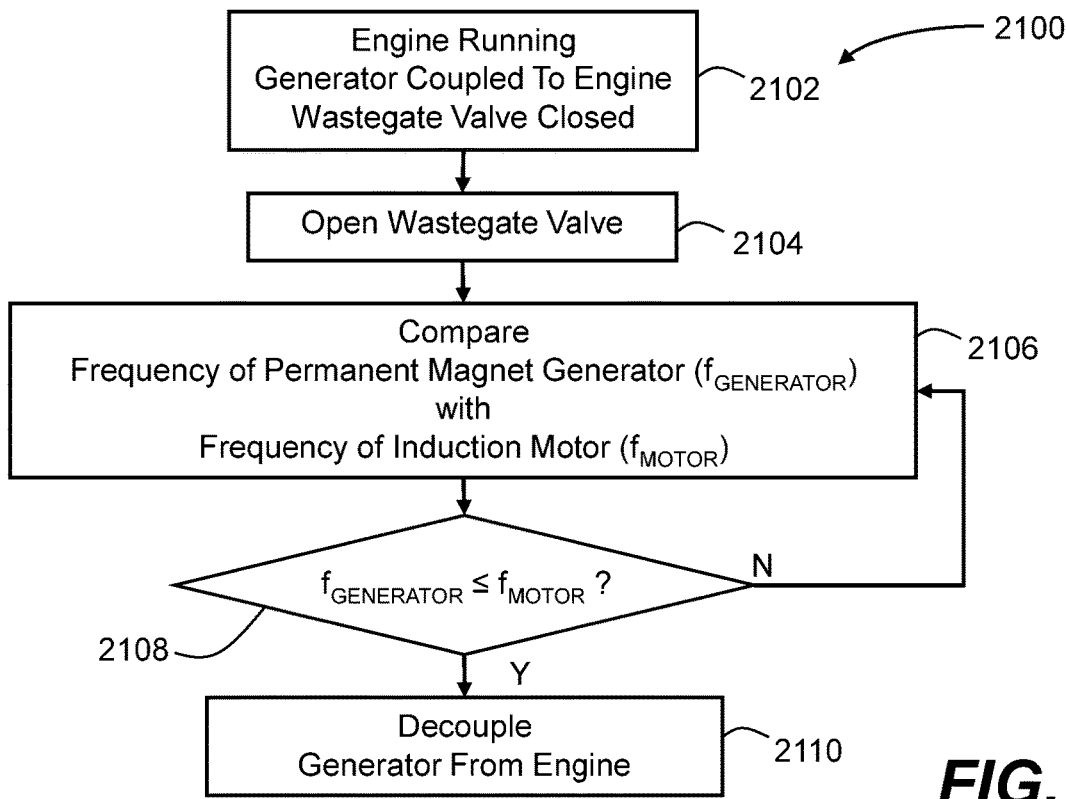
FIG. 21a illustrates a flow chart of a first embodiment of a generic process for controlling the deactivation of a generic turbo-electric turbo-compounding system in accordance with any of the first through fourth aspects illustrated in FIG. 6, 10, 13 or 14.
Figure 21B:
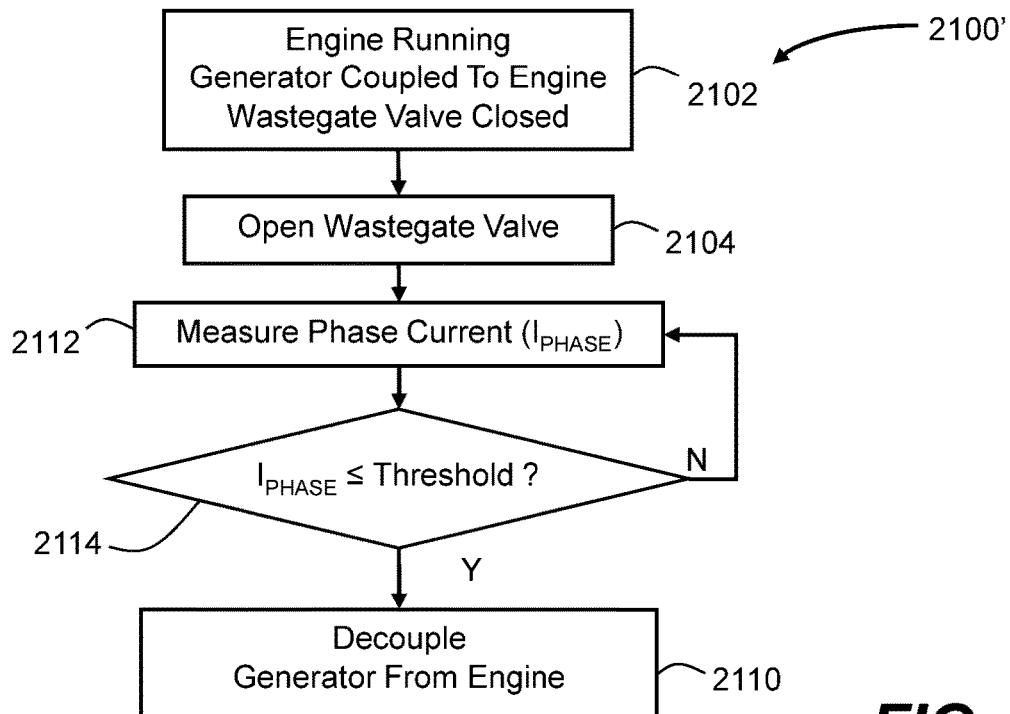
FIG. 21b illustrates a flow chart of a second embodiment of a generic process for controlling the deactivation of a generic turbo-electric turbo-compounding system in accordance with any of the first through fourth aspects illustrated in FIG. 6, 10, 13 or 14.

Alternatively, referring to FIGS. 21*a* and 21*b*, the turbo-electric turbo-compounding system 10, 10.1, 10.2, 10.3, 10.4 may be disabled without shutting down the genset engine 16, 16'. Referring to FIG. 21*a* in accordance with a first embodiment of a generic shutdown process 2100 for decoupling the first 10.1 through fourth 10.4 aspects of the turbo-electric turbo-compounding system 10, from step (2102) with the genset engine 16, 16' running, the wastegate valve 36 closed and the synchronous 56, 56.1, 56.1' or asynchronous 126, 126', 126" AC generator coupled to the genset engine 16, 16', in step (2104), the wastegate valve 36 is opened so as to prevent a subsequent overspeed of the bladed turbine rotor 48 upon removal of the associated electrical load from the synchronous 56, 56.1, 56.1' or asynchronous 126, 126', 126" AC generator or mechanical load from the induction motor 104, 104'. As a result, the exhaust gases 28 are bypassed around the bladed turbine rotor 48, the latter of which then decelerates from a rotational speed for which the associated frequency of the $f_{GENERATOR}$ of the synchronous 56, 56.1, 56.1' or asynchronous 126, 126', 126" AC generator was in excess of the frequency $f_{MOTOR}$ of the induction motor 104, 104' by a given amount of "frequency slip". In step (2106), the rotational speed, or corresponding output frequency $f_{GENERATOR}$, of the synchronous 56, 56.1, 56.1' or asynchronous 126, 126', 126" AC generator sensed by the associated first rotational speed or frequency sensor 114 is compared with the rotational speed, or corresponding frequency $f_{MOTOR}$, of the induction motor 104, 104' sensed by the associated second rotational speed or frequency sensor 116. If, and when, in step (2108), the rotational speed, or corresponding output frequency $f_{GENERATOR}$ of the synchronous 56, 56.1, 56.1' or asynchronous 126, 126', 126" AC generator is less than or equal to the corresponding rotational speed, or corresponding frequency $f_{MOTOR}$ of the induction motor 104, 104'—indicative of negligible associated phase current—then, in step (2110), the synchronous 56, 56.1, 56.1' or asynchronous 126, 126', 126" AC generator is decoupled from the genset engine 16, 16', thereby effectively removing the electrical load from the synchronous 56, 56.1, 56.1' or asynchronous 126, 126', 126" AC generator. Otherwise, the process repeats with step (2106) until the condition of step (2108) is satisfied.

Alternatively, referring to FIG. 21*b*, a second embodiment of a generic shutdown process 2100' for decoupling the first 10.1 through fourth 10.4 aspects of the turbo-electric turbo-compounding system 10 is the same as the above-described first embodiment of the generic shutdown process 2100 except that steps (2106) and (2108) of the first embodiment 2100 are respectively replaced with steps (2112) and (2114) of the second embodiment 2100', the latter which provide for determining when to decouple the synchronous 56, 56.1, 56.1' or asynchronous 126, 126', 126" AC generator from the genset engine 16, 16' explicitly responsive to a measurement—from the associated phase-current sensor 123, 123'—of phase current $I_{PHASE}$ from the synchronous 56, 56.1, 56.1' or asynchronous 126, 126', 126" AC generator to the induction motor 104, 104' for one of the corresponding phases A, B, C. More particularly, following above-described step (2104), in step (2112) the phase current $I_{PHASE}$ from the synchronous 56, 56.1, 56.1' or asynchronous 126, 126', 126" AC generator to the induction motor 104, 104' of one of the phases A, B or C is explicitly measured by the phase-current sensor 123, 123' with the synchronous 56, 56.1, 56.1' or asynchronous 126, 126', 126" AC generator coupled to the induction motor 104, 104'. Then, in step (2114), if the phase current $I_{PHASE}$ is less than a threshold, then, in step (2110), the synchronous 56, 56.1, 56.1' or asynchronous 126, 126', 126" AC generator is decoupled from the induction motor 104, 104'. Otherwise, the process repeats with step (2112) until the condition of step (2114) is satisfied. Accordingly, the second embodiment of the shutdown process 2100' explicitly provides for decoupling the synchronous 56, 56.1, 56.1' or asynchronous 126, 126', 126" AC generator from the induction motor 104, 104' at a zero or near-zero current condition.

It should be understood that determination of when to couple or decouple the synchronous 56, 56.1, 56.1' or asynchronous 126, 126', 126" AC generator and the genset engine 16, 16'—i.e. as provided for by steps (810-812), (906-908), (1108-1110), (1206-1208), (2008-2010) or (2106-2108)—could be either responsive to frequency as indicated, or responsive to speed, taking into account the difference in speeds of the synchronous 56, 56.1, 56.1' or asynchronous 126, 126', 126" AC generator and induction motor 104, 104' which depends upon the associated pole ratio thereof, and taking into account the effective pole counts of the corresponding first 114 and second 116 rotational speed or frequency sensors. Alternatively, for purposes of decoupling the synchronous 56, 56.1, 56.1' or asynchronous 126, 126', 126" AC generator and the genset engine 16, 16', this determination can be responsive to phase current directly, wherein the decoupling transition is made when a measured phase current is less than a threshold, for example, at or near zero. The use of phase current to control the decoupling of the synchronous 56, 56.1, 56.1' or asynchronous 126, 126', 126" AC generator and the genset engine 16, 16' is expected to improve stability of the associated control system, which might otherwise be subject to oscillations if the decoupling is controlled responsive to measurements of frequency or rotational speed. Furthermore, it should be understood that as either an alternative, or an addition, to the above-described bang-bang control of the wastegate valve 36, the wastegate valve 36 may also be controlled—for example, either continuously or by pulse modulation—so as to provide for modulating the power output of the associated synchronous 56, 56.1, 56.1' or asynchronous 126, 126', 126" AC generator, for example, so as to provide for the stability thereof, in which case, the associated phase-current sensor 123, 123' can be used in cooperation therewith to provide a measure of the load on the synchronous 56, 56.1, 56.1' or asynchronous 126, 126', 126" AC generator as a result of the electrical power supplied thereby to the genset engine 16, 16' via the induction motor 104.

The above-described shutdown processes 900, 900', 1200, 1200', 2100, 2100' presume that the wastegate valve 36 has sufficient flow area to provide for bypassing the exhaust gases 28, 28.1 with sufficiently low resulting associated pressure drop across the bladed turbine rotor 48 so that the bladed turbine rotor 48 does not undergo an over-speed condition when the synchronous 56, 56.1, 56.1' or asynchronous 126, 126', 126" AC generator is decoupled from the genset engine 16, 16'. Alternatively, prior to opening the wastegate valve 36 in steps (904), (1204) or (2104), it may be beneficial to first reduce the speed or power level of the genset engine 16, 16' until a speed or power level is reached for which the bladed turbine rotor 48 will not undergo an over-speed condition when the synchronous 56, 56.1, 56.1' or asynchronous 126, 126', 126" AC generator is decoupled from the genset engine 16, 16' with the wastegate valve 36 open.

It should be understood that the means for coupling power from the synchronous 56, 56.1, 56.1' or asynchronous 126, 126', 126" AC generator to the genset engine 16, 16'—e.g. the contactor 110, 110', electrically-controlled clutch 124, or the solid-state switching system 125—need not necessarily be disconnected when either commencing or terminating the operation of recovering power from the flow of exhaust gases 28, but instead, it is anticipated that the synchronous 56, 56.1, 56.1' or asynchronous 126, 126', 126" AC generator will naturally synchronize with the induction motor 104, 104' during the associated transient operation.

The turbo-electric turbo-compounding system 10 may further incorporate a provision for detecting if the electrical load on the synchronous 56, 56.1, 56.1' or asynchronous 126, 126', 126" AC generator becomes disconnected—for example, as a result of failure of either the synchronous 56, 56.1, 56.1' or asynchronous 126, 126', 126" AC generator, the induction motor 104, 104', an interconnecting element therebetween, or a mechanical coupling between the induction motor 104, 104' and the genset engine 16, 16'- and opening the wastegate valve 36 if the electrical load becomes disconnected so as to prevent an overspeed of the bladed turbine rotor 48.

It should be understood that the exhaust gases 28 could alternatively be first collected in a volute/scroll or other collector, and discharged from the turbo-compounder 20 away from the synchronous 56, 56.1, 56.1' or asynchronous 126, 126', 126" AC generator, without first flowing through the annular plenum 74 surrounding the core housing structure 60, so as to provide for reducing the associated heat load to the synchronous 56, 56.1, 56.1' or asynchronous 126, 126', 126" AC generator.

Notwithstanding that the turbo-electric turbo-compounding system 10, 10.1, 10.2, 10.3, 10.4 has been described in cooperation with a genset engine 16, 16' driving a genset main generator 18, it should be understood that the turbo-electric turbo-compounding system 10, 10.1, 10.2, 10.3, 10.4 is not limited to genset applications, and further, could be used with any type of heat engine that exhausts a flow of gas through a fluid conduit from which energy might be extracted so as to provide for improving the thermal efficiency thereof, including, but not limited to reciprocating engines operating under either a Diesel, Otto or Atkinison cycle, or a gas-turbine engine operating under a Brayton cycle, for either a stationary or mobile application. The turbo-electric turbo-compounding system 10, 10.1, 10.2, 10.3, 10.4 is well suited for application in engines that experience relatively long periods at relatively steady speeds, such as, but not limited to, gensets, marine engines (e.g. large marine engines used in cargo ships), and truck engines (e.g. long-haul on-highway truck engines).

It should be understood that for each above-described embodiment illustrated with a three-phase device or signal, that, in general, a corresponding multi-phase device or signal could also be used, wherein, the number of phases is at least three and is the same for all associated devices and signals, so as to provide for determinacy in respect of the directions of rotation of the generator and the induction motor, i.e. so as to guarantee that the associated induction motor will always rotate in the same direction responsive to a signal from the associated generator.

Figure 22:
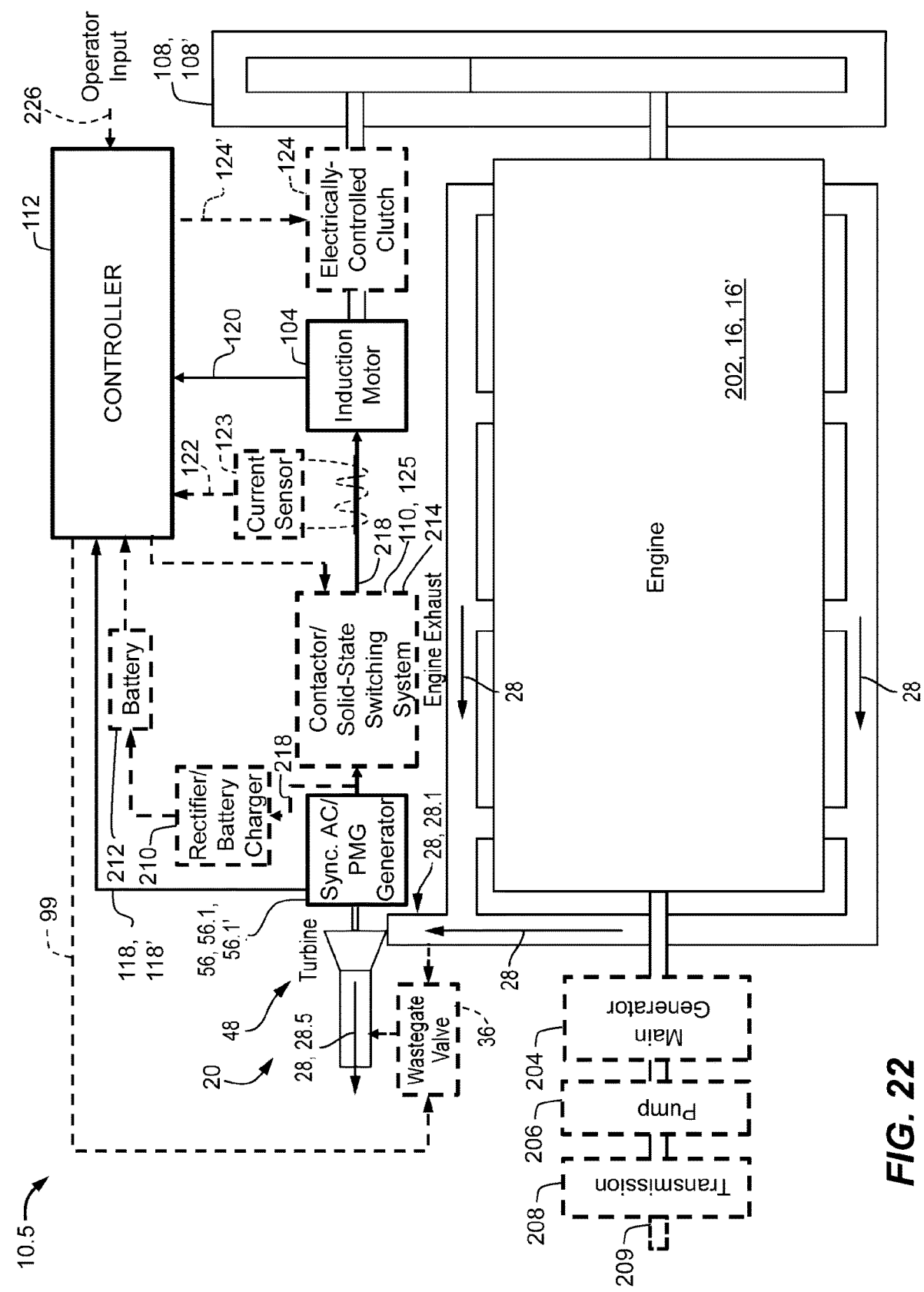
FIG. 22 illustrates a block diagram of a fifth aspect of a turbo-electric turbo-compounding system.
Figure 23:
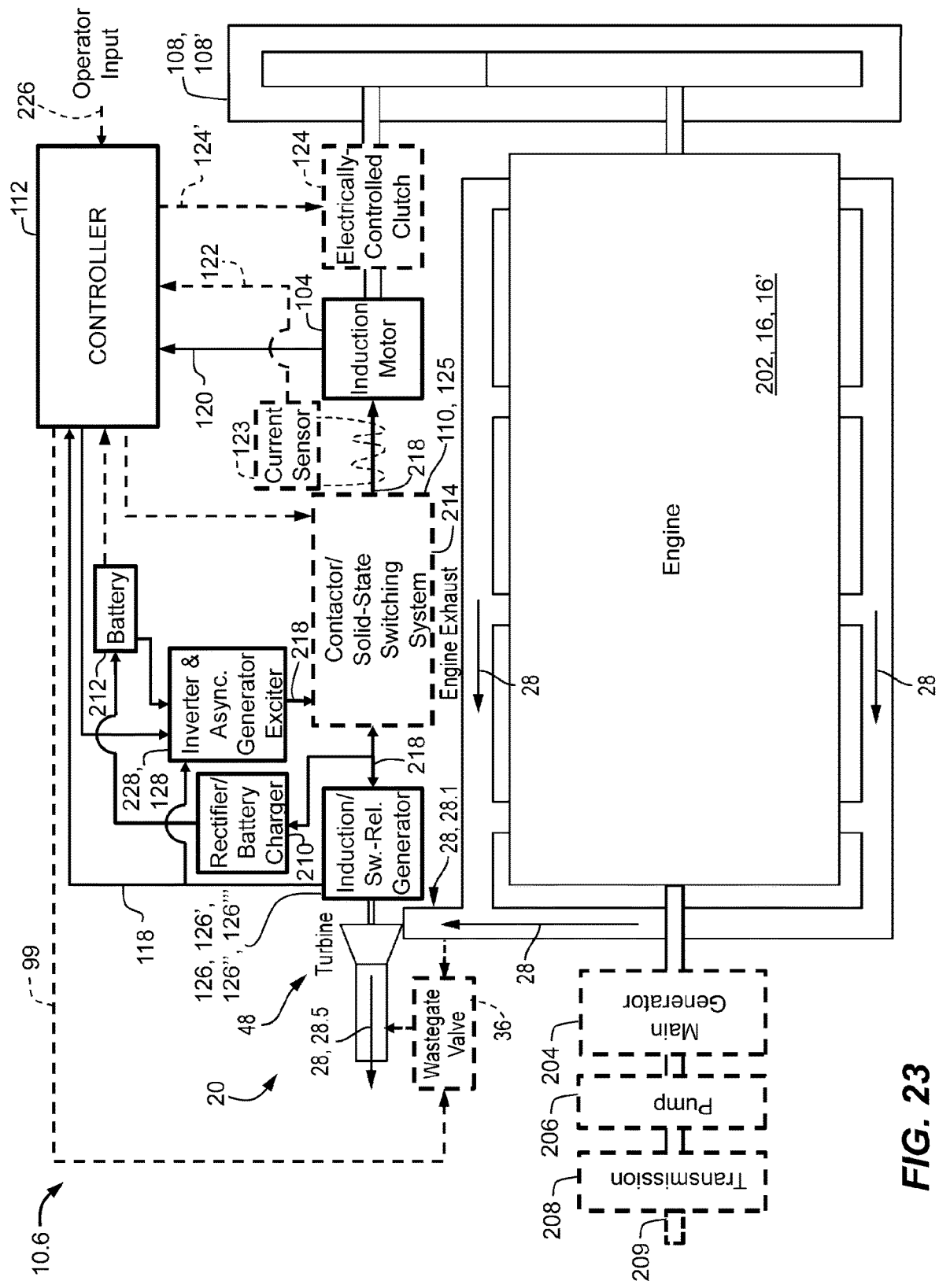
FIG. 23 illustrates a block diagram of a sixth aspect of a turbo-electric turbo-compounding system.

Referring to FIGS. 22 and 23, as for the above-described first through fourth aspects of the turbo-electric turbo-compounding system 10, 10.1, 10.2, 10.3, 10.4, fifth 10.5 and sixth 10.6 aspects of a turbo-electric turbo-compounding system 10, 10.5, 10.6—respectively illustrated in FIGS. 22 and 23, respectively, and differing from one another by the type of associated generator used for turbo-compounding—are suitable for either stationary or mobile applications, wherein the shaft power of the associated engine 202, 16, 16'—whose exhaust is used to power the associated turbo-compounder 20—can be used to provide either electrical power, hydraulic power, mechanical shaft power, or any combination thereof, via a corresponding respective main generator 204, hydraulic pump 206, transmission or torque converter 208, or output shaft 209. For example, the electrical output from the main generator 204 can be used to either provide the electrical power of a stationary genset; or to provide electrical power to one or more motors of the powertrain of a vehicle, for example, either one or more central motors, or one or more motors associated with individual drive wheels of the vehicle. Alternatively, or additionally, the hydraulic output of the hydraulic pump 206 could be used to drive either one or more central hydraulic motors, or one or more hydraulic motors associated with individual drive wheels of the vehicle, for example, in accordance with a hydrostatic propulsion system. Yet further alternatively, or additionally, the vehicle could be powered from the mechanical output of a transmission or torque converter 208 driven by the engine 202, 16, 16'. Yet further alternatively, or additionally, an output shaft 209 of the engine 202, 16, 16' could be used to drive auxiliary equipment.

Similar to the above-described first through third aspects of the turbo-electric turbo-compounding system 10, 10.1, 10.2, 10.3, the turbo-compounder 20 of the fifth aspect of the turbo-electric turbo-compounding system 10, 10.5 illustrated in FIG. 22 incorporates a multi-phase synchronous AC generator 56, 56.1, 56.1'—for example, a multi-phase permanent magnet AC generator 56, 56.1, 56.1'—having at least three phases. The output of the multi-phase synchronous AC generator 56 may power an associated rectifier/battery charger 210 used to charge an associated battery 212, for example, the latter of which may be used to power the associated controller 112, or provide power for operating electrical systems of the engine 202, 16, 16'. For example, in one set of embodiments, the battery charging current supplied by the rectifier/battery charger 210 provides for charging the battery 212 at an optimal charge rate that is a function of variables that are dependent upon the particular charging method.

More particularly, the battery 212 may be charged in accordance with any of the following methods:

Constant Voltage:

A constant voltage rectifier/battery charger 210 is basically a DC power supply which in its simplest form may consist of a step-down transformer from the mains with a rectifier to provide the DC voltage to charge the battery 212. Such simple designs are often found in cheap car battery chargers. The lead-acid cells used for cars and backup power systems typically use constant voltage chargers. In addition, lithium-ion cells often use constant voltage systems, although these usually are more complex with added circuitry to protect both the batteries and the user safety. The constant voltage charging method is responsive to battery voltage, and possibly battery temperature for protection against overcharging.

Constant Current:

Constant current chargers vary the voltage they apply to the battery 212 to maintain a constant current flow, switching off when the voltage reaches the level of a full charge. This design is usually used for nickel-cadmium and nickel-metal hydride cells or batteries. The constant-current charging method is responsive to battery voltage and battery current. Current limiting can prevent damage and therefore might preclude the need for associated temperature sensing.

Taper Charging:

Taper charging provides for charging from an unregulated but constant voltage source. The voltage delta and therefore the current diminishes as the cell voltage (back emf) builds up. This taper-charging method would be suitable only for sealed-lead-acid battery 212, and the charging rate and duration would be limited to preclude the danger of damaging the associated cells through overcharging. The taper-charging method is responsive to battery voltage, and possibly also time to prevent overcharging.

Pulsed Charging:

Pulsed charging provides for feeding the charge current to the battery 212 in pulses. The charging rate (based on the average current) can be precisely controlled by varying the width of the pulses. In accordance with one set of embodiments, during the charging process, one second pulses with short rest periods of 20 to 30 milliseconds are applied. The time between pulses provides for the chemical actions in the battery 212 to stabilize by equalizing the reaction throughout the bulk of the electrode before recommencing the charge. This enables the chemical reaction to keep pace with the rate of inputting the electrical energy. This method may reduce unwanted chemical reactions at the electrode surface such as gas formation, crystal growth and passivation. In one set of embodiments, the open circuit voltage of the battery 212 is sampled during the rest period. The pulsed-charging method is responsive to current pulse magnitude and duration, battery open circuit terminal voltage (during the off time) and possibly battery temperature.

Trickle Charging:

Trickle charging provides for compensating for self-discharge of the battery 212, using long-term constant current charging for standby use, with the charge rate responsive to the frequency of discharge. The trickle-charging method would not be suitable for some battery chemistries—for example NiMH and Lithium—that are susceptible to damage from overcharging. The rectifier/battery charger 210 may provide to switch to trickle charging when the battery 212 is fully charged. The trickle-charging method is responsive to battery current as function of time, and battery terminal open circuit voltage for switching to trickle charge mode.

Burp Charging (Also Referred to as Reflex or Negative Pulse Charging):

Used in conjunction with pulse charging, the burp-charging method applies a very short discharge pulse—typically 2 to 3 times the charging current for 5 milliseconds—during the charging rest period in order to provide for depolarizing the cell(s). These pulses dislodge any gas bubbles which may have built up on the electrodes during fast charging, speeding up the stabilization process and hence the overall charging process. The release and diffusion of the gas bubbles is known as "burping". Although the burp-charging method may provide for improving both the charge rate and the battery lifetime, and may provide for the removal of dendrites, at a minimum the burp-charging method would not damage the battery 212. The burp-charging method is responsive to the magnitude and duration of the current pulses, and battery open circuit terminal voltage.

IUI Charging:

The ICI charging method is a recently developed charging profile used for fast charging standard flooded lead acid batteries from particular battery manufacturers, and would not be suitable for all lead acid batteries. Initially the battery 212 is charged at a constant-current (I) rate until the cell voltage reaches a preset value—normally a voltage near to that at which gassing occurs. This first part of the charging cycle is known as the bulk charge phase. When the preset voltage has been reached, the rectifier/battery charger 210 switches into the constant voltage (U) phase and the current drawn by the battery 212 will gradually drop until it reaches another preset level. This second part of the cycle completes the normal charging of the battery 212 at a slowly diminishing rate. Finally, the rectifier/battery charger 210 switches again into the constant current mode (I) and the voltage continues to rise up to a new higher preset limit when the rectifier/battery charger 210 is switched off. This last phase is used to equalize the charge on the individual cells in the battery 212 in order to maximize the life of the battery 212. The IUI-charging method is responsive to battery current as a function of time, and battery terminal voltage.

Float Charging:

The battery 212 and the load are permanently connected in parallel across the DC charging source and held at a constant voltage below the upper voltage limit of the battery 212. Float charging is typically used for emergency power back-up systems, and primarily used with lead acid batteries. The float-charging method is responsive to battery voltage control, and possibly also to battery temp measurement.

Random Charging:

All of the above charging methods involve a controlled charge of the battery 212, however there are many applications where the energy to charge the battery 212 is only available, or is delivered, in some random, uncontrolled way. This applies to automotive applications where the energy depends on the engine speed which is typically continuously changing. The problem is more acute in electric vehicle (EV) and hybrid-electric vehicle (HEV) applications which use regenerative braking since this generates large power spikes during braking which the battery 212 must absorb. More benign applications are in solar panel installations which can only be charged when the sun is shining. These all require special techniques to limit the charging current or voltage to levels which the battery 212 can tolerate. The random-charging method is responsive to battery voltage and battery current.

Similar to the above-described fourth aspect of the turbo-electric turbo-compounding system 10, 10.4, the turbo-compounder 20 of the sixth aspect of the turbo-electric turbo-compounding system 10, 10.6 illustrated in FIG. 23 incorporates a multi-phase asynchronous AC generator 126—for example, a multi-phase induction generator 126, 126', 126" or a multi-phase switched-reluctance generator 126, 126'"—having at least three phases. As for the above-described fourth aspect of the turbo-electric turbo-compounding system 10, 10.4, the multi-phase asynchronous AC generator 126, 126', 126", 126'" is excited by an associated multi-phase inverter/asynchronous generator exciter 228, 128, for example, which is powered by an associated battery 212 that is charged from the output of the multi-phase asynchronous AC generator 126, 126', 126", 126'" by an associated rectifier/battery charger 210, wherein the battery 212 may also be used to power the associated controller 112, or provide power for operating electrical systems of the engine 202, 16, 16'.

For both the fifth 10.5 and sixth 10.6 aspects of the turbo-electric turbo-compounding system 10, 10.5, 10.6, the electrical output of the multi-phase AC generator 56, 56.1, 56.1', 126, 126', 126", 126' is operatively coupled to a multi-phase induction motor 104, 104', for example, in one set of embodiments, via either a multi-phase contactor 110 or a multi-phase solid-state switching system 125 of an associated switching system 214, 110, 125 that provides for electrically disconnecting the multi-phase induction motor 104, 104' from the multi-phase synchronous AC generator 56, 56.1, 56.1', thereby providing for decoupling the multi-phase synchronous AC generator 56, 56.1, 56.1' from the engine 202, 16, 16'. The output shaft of the rotor 106 of the multi-phase induction motor 104, 104' is mechanically coupled to the crankshaft of the genset engine 16, 16', for example, through a gearbox 108 or a belt drive system 108', so as to provide for transmitting supplemental mechanical shaft power to the output shaft 209 of the engine 202, 16, 16' when the multi-phase induction motor 104, 104' is powered by the multi-phase AC generator 56, 56.1, 56.1', 126, 126', 126", 126'". Alternatively, or additionally, the operative coupling of the multi-phase AC generator 56, 56.1, 56.1', 126, 126', 126", 126'" to the engine 202, 16, 16' can be controlled by an associated electrically-controlled clutch 124, for example, as described hereinabove for the second aspect of the turbo-electric turbo-compounding system 10, 10.2 illustrated in FIG. 10. More particularly, each of the fifth 10.5 and sixth 10.6 aspects of the turbo-electric turbo-compounding system 10, 10.5, 10.6 incorporates at least one means of decoupling the multi-phase AC generator 56, 56.1, 56.1', 126, 126', 126", 126''' from the engine 202, 16, 16', i.e. at least one of a multi-phase contactor 110, a multi-phase solid-state switching system 125, or an electrically-controlled clutch 124.

As explicitly illustrated in FIGS. 22 and 23 for the fifth 10.5 and sixth 10.6 aspects, the turbo-electric turbo-compounding system 10, 10.5, 10.6 need not necessarily incorporate a wastegate valve 36, 36' to protect against prospective overspeed of the bladed turbine rotor 48. For example, in one set of embodiments, the bladed turbine rotor 48 may be configured with sufficient strength to withstand prospective overspeed conditions that might result when the multi-phase AC generator 56, 56.1, 56.1', 126, 126', 126", 126''' of the turbo-compounder 20 becomes decoupled from the associated engine 202, 16, 16', for example, as a result of a failure of the associated gearbox 108 or a belt drive system 108', or if the multi-phase AC generator 56, 56.1, 56.1', 126, 126', 126", 126''' becomes electrically-decoupled from the multi-phase induction motor 104, 104' as a result of a disconnection by the associated switching system 214, 110, 125. Furthermore, the turbine shroud 72 of the turbo-compounder 20 can be configured to contain the bladed turbine rotor 48 in the event of a prospective failure thereof as a result of substantial overspeed. Alternatively, or additionally, the turbo-electric turbo-compounding system 10, 10.5, 10.6 could incorporate either an associated alarm or control system to either alert an operator of a prospective overspeed condition, or automatically control the engine 202, 16, 16', so as to provide for either reducing the speed or power level thereof, or stopping the operation thereof responsive to a prospective overspeed condition.

Figure 24:
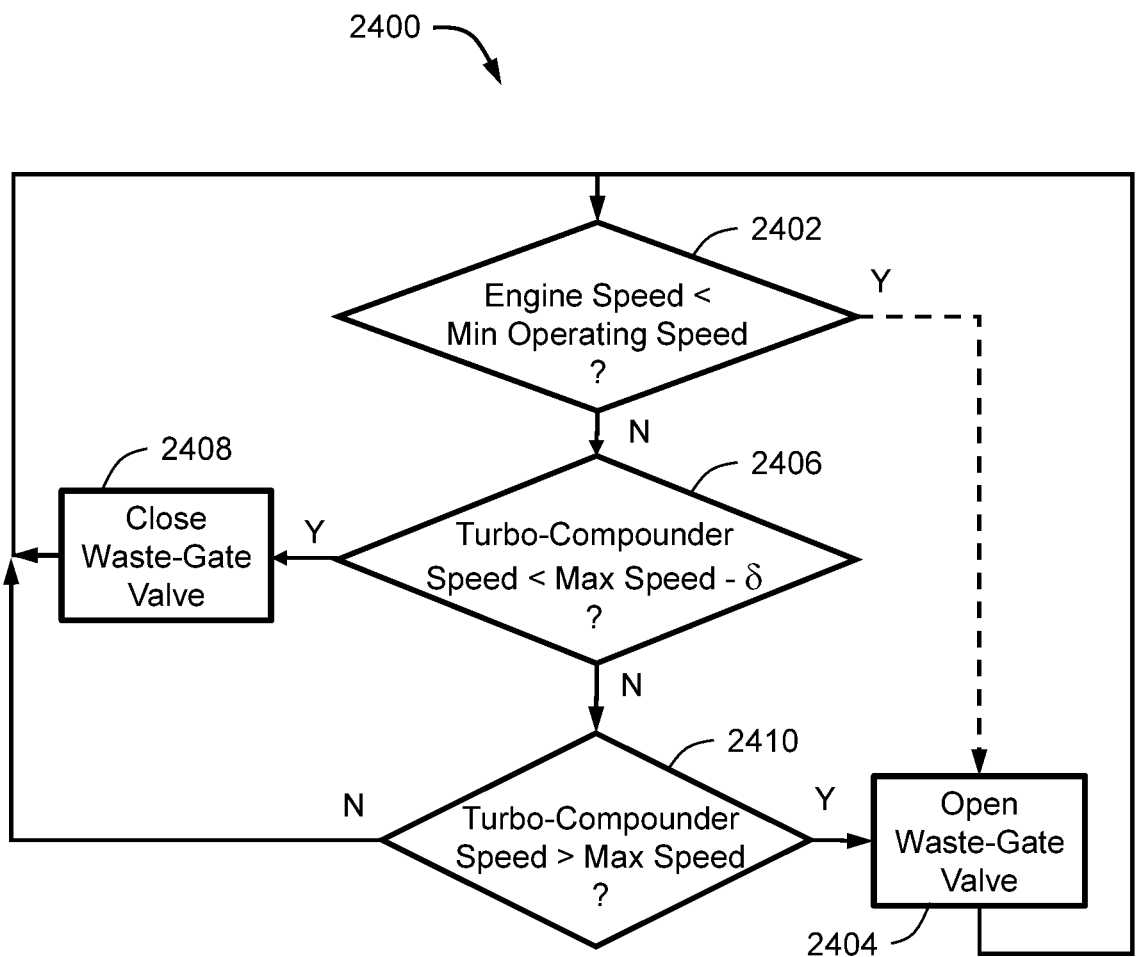
FIG. 24 illustrates a flow chart of a process for controlling a wastegate of a turbo-electric turbo-compounding system.
Figure 25:
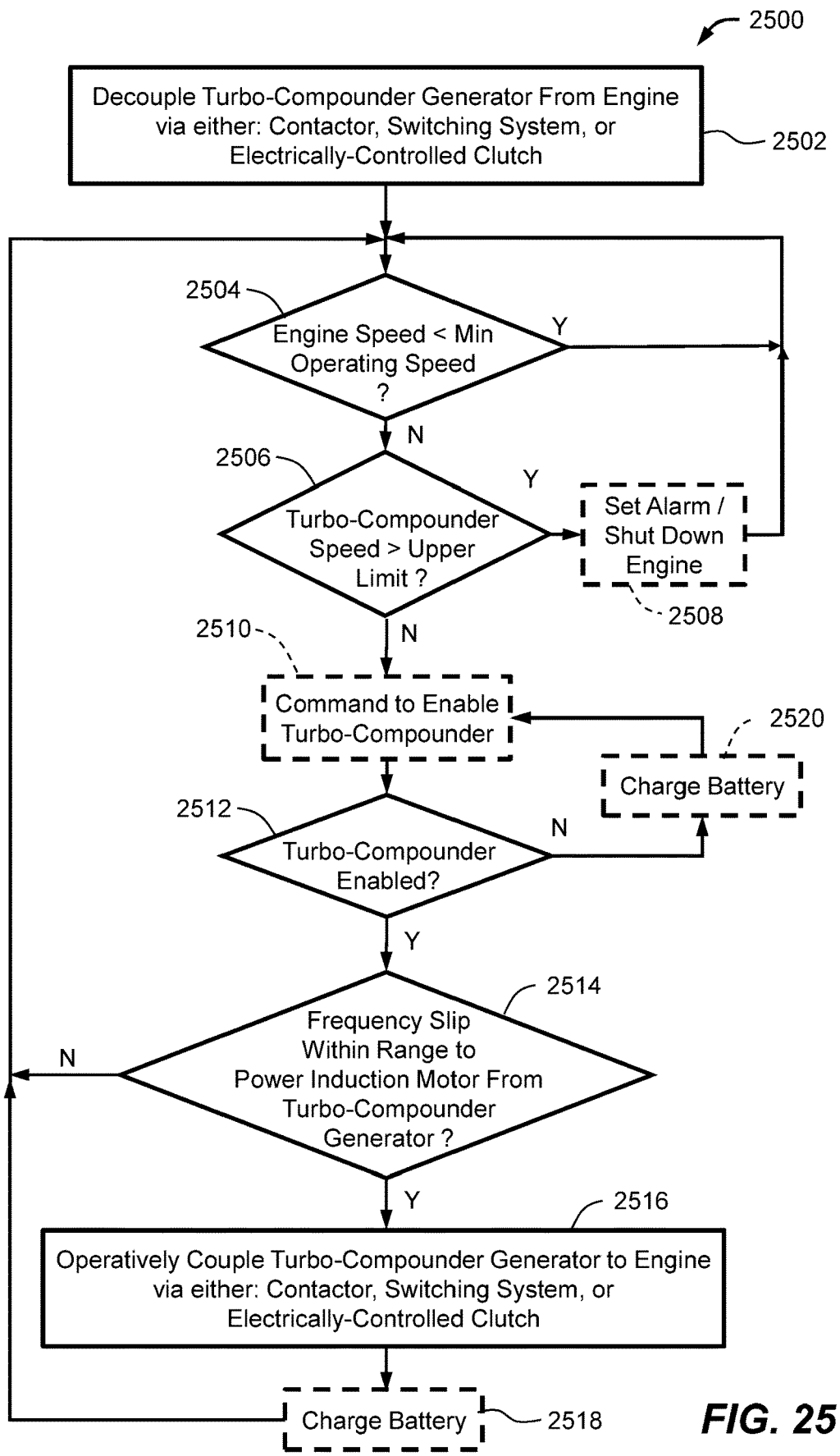
FIG. 25 illustrates a flow chart of a process for controlling an operative coupling of a generator of turbo-electric turbo-compounding system to an engine.
Figure 26:
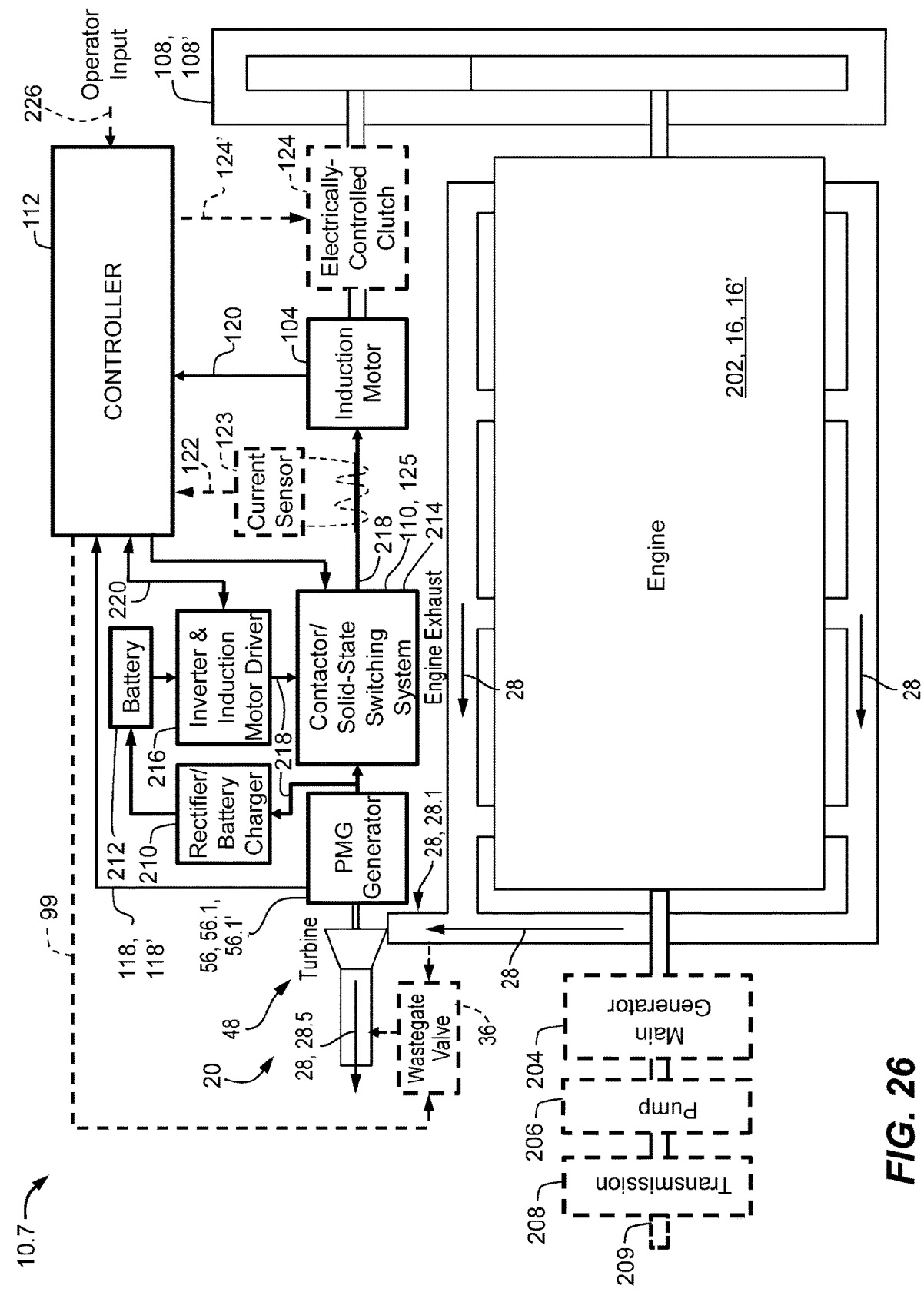
FIG. 26 illustrates a block diagram of a seventh aspect of a turbo-electric turbo-compounding system.

Referring to FIGS. 24 and 25, any of the turbo-electric turbo-compounding systems 10, 10.1, 10.2, 10.3, 10.4, 10.5, 10.6 disclosed heretofore may be controlled in accordance with a set of independent processes 2400, 2500 for embodiments of systems 10, 10.1, 10.2, 10.3, 10.4, 10.5, 10.6 that incorporate a wastegate valve 36, 36', or in accordance with a single process 2500 for embodiments of systems 10, 10.1, 10.2, 10.3, 10.4, 10.5, 10.6 that do not.

More particularly, referring to FIG. 24, for systems 10, 10.1, 10.2, 10.3, 10.4, 10.5, 10.6 that incorporate a wastegate valve 36, 36', beginning with step (2402) of a wastegate control process 2400, if the rotational speed of the engine 202, 16, 16' is less than a corresponding minimum operating speed, then—for some turbo-electric turbo-compounding systems 10, 10.1, 10.2, 10.3, 10.4, 10.5, 10.6 for which backpressure from the bladed turbine rotor 48 might adversely affect starting or low-speed operation, —the wastegate valve 36, 36' is opened in step (2404) to provide for starting or low-speed operation. Then, following the opening of the wastegate valve 36, 36' in step (2404), the process 2400 continues with repetition of step (2402). Otherwise, from step (2402), if the rotational speed of the engine 202, 16, 16' is greater than the corresponding minimum operating speed, then—or directly at the beginning of the wastegate control process 2400 for other turbo-electric turbo-compounding systems 10, 10.1, 10.2, 10.3, 10.4, 10.5, 10.6 for which backpressure from the bladed turbine rotor 48 would not adversely affect starting or low-speed operation, —in step (2406), if the rotational speed of the multi-phase AC generator 56, 56.1, 56.1', 126, 126', 126", 126''' of the turbo-compounder 20 is less than a maximum rotational speed by at least a hysteresis threshold δ—wherein the maximum rotational speed level is set to prevent damage to the turbo-compounder 20 as might result from overspeed, and the hysteresis threshold δ provides for wastegate control stability—then, in step (2408), the wastegate valve 36, 36' is closed in step (2408), and the process 2400 continues with repetition steps (2402) or (2406), depending upon the tolerance for backpressure by the turbo-electric turbo-compounding system 10, 10.1, 10.2, 10.3, 10.4, 10.5, 10.6. Otherwise, from step (2406), in step (2410), if the rotational speed of the multi-phase AC generator 56, 56.1, 56.1', 126, 126', 126", 126''' of the turbo-compounder 20 is greater than the maximum rotational speed, then the wastegate valve 36, 36' is opened in step (2404), and the process 2400 continues with repetition of steps (2402) or (2406), depending upon the tolerance for backpressure by the turbo-electric turbo-compounding system 10, 10.1, 10.2, 10.3, 10.4, 10.5, 10.6.

Furthermore, referring to FIG. 25, a turbo-compounder activation control process 2500 commences in step (2502) by decoupling the multi-phase AC generator 56, 56.1, 56.1', 126, 126', 126", 126''' of the turbo-compounder 20 from the engine 202, 16, 16' by either electrically disconnecting the multi-phase AC generator 56, 56.1, 56.1', 126, 126', 126", 126''' from the multi-phase induction motor 104, 104' by switching the state of the associated contactor 110 or solid-state switching system 125 of the associated switching system 214, 110, 125 to be disconnected or OFF, or by mechanically disconnecting the multi-phase induction motor 104, 104' from the engine 202, 16, 16' by switching the state of an electrically-controlled clutch 124 to be deactivated. Then, in step (2504), if the rotational speed of the engine 202, 16, 16' is less than a corresponding minimum operating speed, then the process 2500 continues with repetition of step (2504). Otherwise, from step (2504), in step (2506), if the rotational speed of the multi-phase AC generator 56, 56.1, 56.1', 126, 126', 126", 126''' of the turbo-compounder 20 is greater than a maximum rotational speed—wherein the maximum rotational speed level is set to prevent damage to the turbo-compounder 20 from overspeed, —then, in step (2508), in accordance with one set of embodiments, either or both an alarm is triggered or the engine is either shut down or reduced in power, and the process 2500 continues with repetition of step (2504). Otherwise, from step (2506), either responsive to an operator or external control input in step (2510) to enable the turbo-electric turbo-compounding system 10, or if the turbo-electric turbo-compounding system 10 is automatically enabled when the engine 202, 16, 16' is in operation, then, in step (2512), if the turbo-electric turbo-compounding system 10 is enabled for operation and, in step (2514), if the frequency slip 158 is within range to provide for powering the multi-phase induction motor 104, 104' from the multi-phase AC generator 56, 56.1, 56.1', 126, 126', 126", 126''', then, in step (2516), the multi-phase AC generator 56, 56.1, 56.1', 126, 126', 126", 126''' is operatively coupled to the engine 202, 16, 16'—for example, by either electrically connecting the multi-phase AC generator 56, 56.1, 56.1', 126, 126', 126", 126''' to the multi-phase induction motor 104, 104' by switching the state of the associated contactor 110 or solid-state switching system 125 of the associated switching system 214, 110, 125 to be connected or ON, or by mechanically connecting the multi-phase induction motor 104, 104' to the engine 202, 16, 16' by switching the state of the electrically-controlled clutch 124 to be activated—so as to provide for the multi-phase induction motor 104, 104' powered by the multi-phase AC generator 56, 56.1, 56.1', 126, 126', 126", 126''' to mechanically supplement the mechanical power output of the engine 202, 16, 16'.

For example, referring again to FIGS. 18 and 19, the frequency slip 158 would be within range to provide for powering the multi-phase induction motor 104, 104' from the multi-phase AC generator 56, 56.1, 56.1', 126, 126', 126", 126''' if in a range so that the associated normalized slip parameter s is in the range of 0 to 1 so as to operate the multi-phase induction motor 104, 104' in the motoring mode 156.1. For example, in one set of embodiments, the value of the frequency slip 158 satisfying step (2514) is between 0 and the frequency slip 158.1 associated with the maximum possible shaft torque 152.1, i.e. "breakover torque". The frequency slip 158 is responsive to the amount by which the rotational speed of the multi-phase AC generator 56, 56.1, 56.1', 126, 126', 126", 126''' exceeds the rotational speed of the multi-phase induction motor 104, 104', the former of which is responsive to the mass flow rate of exhaust gases 28, which is responsive to the power level of the engine 202, 16, 16', the latter of which is responsive to the rotational speed of the engine 202, 16, 16'.

Following step (2516), if a battery 212 and associated rectifier/battery charger 210 are present, then, in step (2518), the battery 212 is charged by the rectifier/battery charger 210 from power generated by the multi-phase AC generator 56, 56.1, 56.1', 126, 126', 126", 126''', after which the process 2500 continues with repetition of step (2504). Similarly, if, from step (2512), the turbo-electric turbo-compounding system 10 is not enabled for operation, then, if a battery 212 and associated rectifier/battery charger 210 are present, then, in step (2520), the battery 212 is charged by the rectifier/battery charger 210 from power that might be generated by the multi-phase AC generator 56, 56.1, 56.1', 126, 126', 126", 126''', after which the process 2500 continues with repetition of step(s) (2510/2512). Although explicitly illustrated as discrete steps (2520, 2518) in FIG. 25, it should be understood that if a battery 212 and associated rectifier/battery charger 210 are present, then typically the battery 212 would be continuously charged—to the extent necessary responsive to the state of charge of the battery 212—by the rectifier/battery charger 210 from power generated by the multi-phase AC generator 56, 56.1, 56.1', 126, 126', 126", 126'''.

Referring to FIGS. 26-42, seventh through ninth aspects of a turbo-electric turbo-compounding system 10, 10.7, 10.8, 10.9 are configured to incorporate a battery 212 that is charged by an associated rectifier/battery charger 210 that is powered by the associated multi-phase AC generator 56, 56.1, 56.1', 126, 126', 126", wherein the associated multi-phase induction motor 104, 104' can be powered from either the battery 212, the associated multi-phase AC generator 56, 56.1, 56.1', 126, 126', 126", or, depending upon the configuration, both the battery 212 and the associated multi-phase AC generator 56, 56.1, 56.1', 126, 126', 126". As for the above-described first through sixth aspects turbo-electric turbo-compounding system 10, 10.1, 10.2, 10.3, 10.4, 10.5, 10.6, the seventh through ninth aspects of a turbo-electric turbo-compounding system 10, 10.7, 10.8, 10.9 are suitable for either stationary or mobile applications, for example, to power a self-propelled mobile vehicle or vessel, wherein the shaft power of the associated engine 202, 16, 16'—whose exhaust is used to power the associated turbo-compounder 20—can be used to provide either electrical power, hydraulic power, mechanical shaft power, or any combination thereof, via a corresponding respective main generator 204, hydraulic pump 206, transmission or torque converter 208, or output shaft 209. For example, the electrical output from the main generator 204 can be used to either provide the electrical power of a stationary genset; or to provide electrical power to one or more motors of the powertrain of a vehicle, for example, either one or more central motors, or one or more motors associated with individual drive wheels of the vehicle. Alternatively, or additionally, the hydraulic output of the hydraulic pump 206 could be used to drive either one or more central hydraulic motors, or one or more hydraulic motors associated with individual drive wheels of the vehicle, for example, in accordance with a hydrostatic propulsion system. Yet further alternatively, or additionally, the vehicle could be powered from the mechanical output of a transmission or torque converter 208 driven by the engine 202, 16, 16'. Yet further alternatively, or additionally, an output shaft 209 of the engine 202, 16, 16' could be used to drive auxiliary equipment.

More particularly, referring to FIGS. 26-32, in accordance with a seventh aspect of the turbo-electric turbo-compounding system 10, 10.7, the turbo-compounder 20 incorporates a multi-phase synchronous AC generator 56, 56.1, 56.1'—for example, a permanent magnet AC generator 56.1—that is driven by the exhaust gases 28 from the engine 202, 16, 16'. Similar to the above-described first 10.1, third 10.3 and fifth 10.5 aspects of the turbo-electric turbo-compounding system 10.1, 10.3, 10.5, the electrical output of the multi-phase synchronous AC generator 56, 56.1, 56.1' is operatively coupled to a multi-phase induction motor 104, 104' via either a multi-phase contactor 110 or a multi-phase solid-state switching system 125 of an associated switching system 214 that provides for electrically disconnecting the multi-phase induction motor 104, 104' from the multi-phase synchronous AC generator 56, 56.1, 56.1', thereby providing for decoupling the multi-phase synchronous AC generator 56, 56.1, 56.1' from the engine 202, 16, 16', and that provides for connecting the multi-phase induction motor 104, 104' to a multi-phase inverter/induction motor driver 216 powered by the battery 212. The output shaft of the rotor 106 of the multi-phase induction motor 104, 104' is mechanically coupled to the crankshaft of the genset engine 16, 16', for example, through a gearbox 108 or a belt drive system 108', so as to provide for transmitting supplemental mechanical shaft power to the output shaft 209 of the engine 202, 16, 16' when the multi-phase induction motor 104, 104' is powered by either the multi-phase synchronous AC generator 56, 56.1, 56.1', or the battery 212 via the multi-phase inverter/induction motor driver 216, responsive to selection by the switching system 214 and responsive to the operation of the turbo-compounder 20 when the multi-phase induction motor 104, 104' is powered by the multi-phase synchronous AC generator 56, 56.1, 56.1'. The battery 212 is charged by the rectifier/battery charger 210 from electrical power generated by the multi-phase synchronous AC generator 56, 56.1, 56.1', and provides electrical power to the multi-phase inverter/induction motor driver 216 that, under selected modes of operation, is operatively coupled to the multi-phase induction motor 104, 104' to provide for driving the multi-phase induction motor 104, 104' either alone, or in cooperation with electrical power from the multi-phase synchronous AC generator 56, 56.1, 56.1'.

Figure 27:
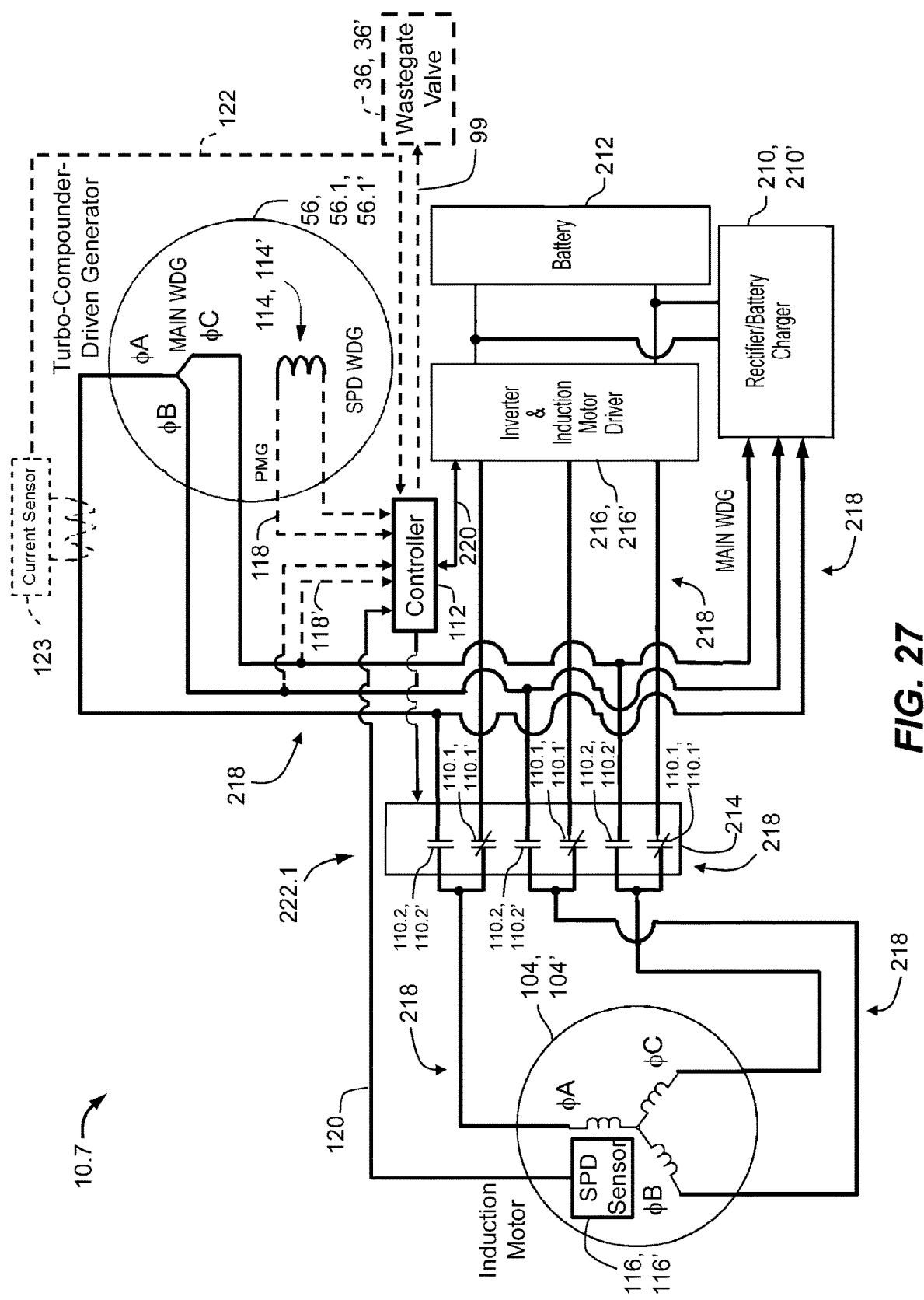
FIG. 27 illustrates a schematic block diagram of the seventh aspect of a turbo-electric turbo-compounding system, configured for three-phase operation.

The electrical power connections 218 from the multi-phase synchronous AC generator 56, 56.1, 56.1' to the switching system 214 and to the rectifier/battery charger 210, from the multi-phase inverter/induction motor driver 216 to the switching system 214, and from the switching system 214 to the multi-phase induction motor 104, 104', are each multi-phase connections of the same number of phases—at least three in number—as the multi-phase synchronous AC generator 56, 56.1, 56.1' and the multi-phase induction motor 104, 104'. For example, in accordance with one set of embodiments, FIG. 27 illustrates three phases, in cooperation with a three-phase permanent magnet AC generator 56, 56.1, 56.1', a three-phase multi-phase induction motor 104, 104', a three-phase inverter/induction motor driver 216, 216', a three-phase rectifier/battery charger 210, 210', and two, independently-controllable first 110.1 and second 110.2 N-pole contactors, for example first 110.1, 110.1' and second 110.2, 110.2' 3-pole contactors, wherein the first 3-pole contactor 110.1, 110.1'—comprising one pole for each phase—is operative between the multi-phase induction motor 104, 104' and the multi-phase inverter/induction motor driver 216, and the second 3-pole contactor 110.2, 110.2'—comprising one pole for each phase—is operative between the multi-phase induction motor 104, 104' and the three-phase permanent magnet AC generator 56, 56.1, 56.1'. The controller 112 receives first 118 and second 120 rotational-speed or frequency signals from respective first 114 and second 116 rotational speed or frequency sensors, respectively responsive to the respective rotational speeds of the multi-phase synchronous AC generator 56, 56.1, 56.1' and the multi-phase induction motor 104, 104', wherein, for example, the first 118 and second 120 rotational-speed or frequency signals could be generated by corresponding respective rotational-speed-sensing windings 114', 116'. A first rotational-speed or frequency signal 118' of the multi-phase synchronous AC generator 56, 56.1, 56.1' could alternatively be responsive to the output between a pair of phases of the multi-phase synchronous AC generator 56, 56.1, 56.1', for example, with appropriate filtering thereof. The controller 112 controls the switching states of the associated 3-pole contactors 110.1', 110.2' so as to provide for selecting a particular, below-described operating mode of the turbo-electric turbo-compounding system 10, 10.7, and provides for outputting a frequency control signal 220 to the multi-phase inverter/induction motor driver 216 for controlling the output frequency thereof responsive to either the first 118 or second 120 rotational-speed or frequency signal, depending upon the particular operating mode, i.e. responsive to either the rotational speed of the three-phase induction motor 104, 104', or responsive to the rotational speed and phase of the multi-phase synchronous AC generator 56, 56.1, 56.1', depending upon the particular operating to mode.

Figure 28:
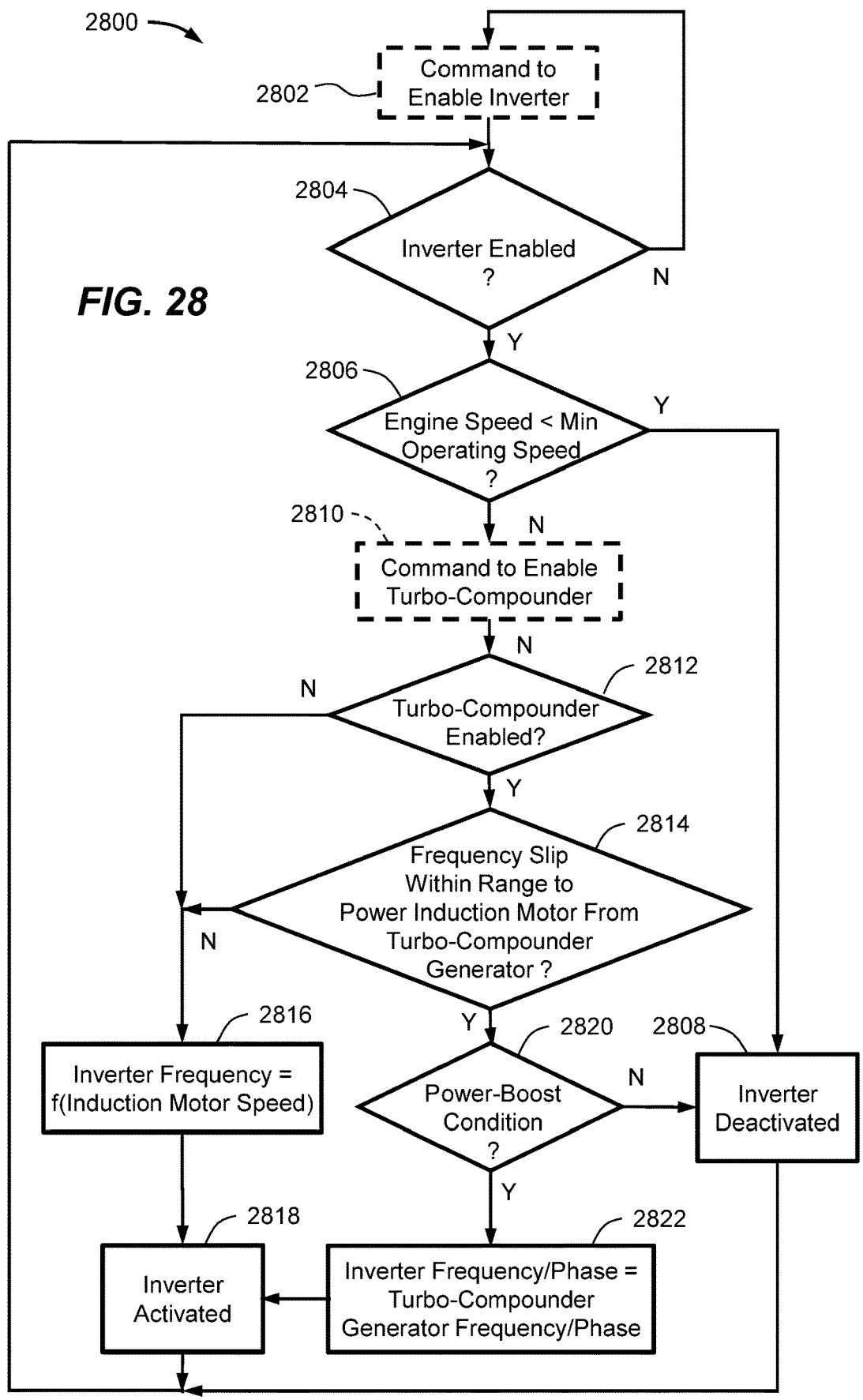
FIG. 28 illustrates a flow chart of a process for controlling an activation of a battery-powered inverter of a turbo-electric turbo-compounding system in accordance with any of the seventh through ninth aspects thereof.
Figure 29:
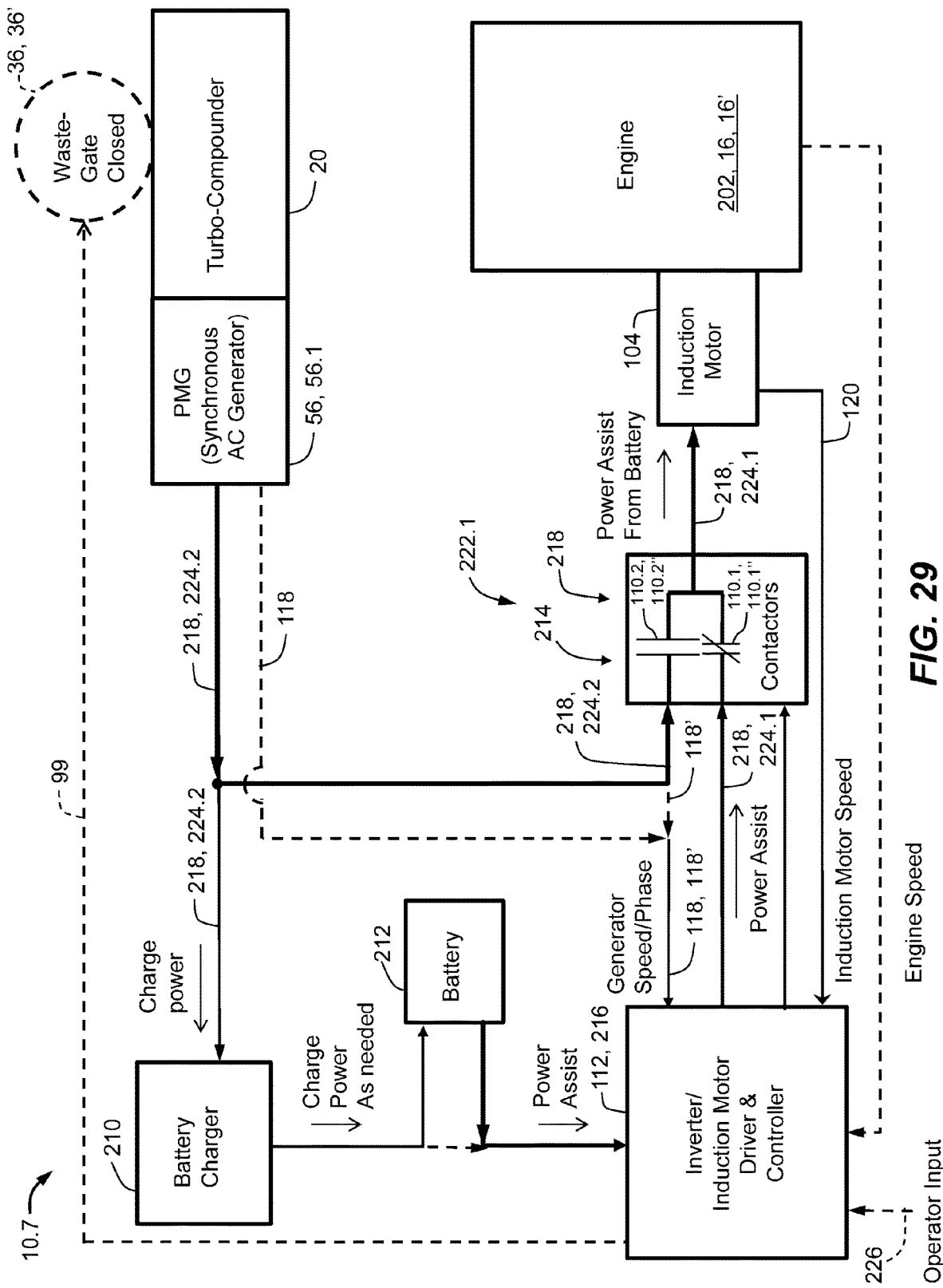
FIG. 29 illustrates a block diagram of the seventh aspect of the turbo-electric turbo-compounding system in accordance with a first mode of operation.

Referring to FIG. 28, an inverter/induction-motor-driver activation control process 2800 commences either in step (2802) with operator or external control input of a command to enable activation of the multi-phase inverter/induction motor driver 216, or directly in step (2804). If, in step (2804), —either from step (2802), or if the multi-phase inverter/induction motor driver 216 is automatically enabled—activation of the multi-phase inverter/induction motor driver 216 is enabled, then, in step (2806), if the rotational speed of the engine 202, 16, 16' is less than a minimum operating speed, then the multi-phase inverter/induction motor driver 216 is deactivated in step (2808), and the process 2800 continues with repetition of step (2804), Otherwise from step (2804), the multi-phase inverter/induction motor driver 216 is not enabled, then the process 2800 continues with repetition of step (2802). Otherwise from step (2806), if the rotational speed of the engine 202, 16, 16' is not less than a minimum operating speed, then, either responsive to an operator or external control input in step (2810) to enable the turbo-electric turbo-compounding system 10, or if the turbo-electric turbo-compounding system 10 is automatically enabled when the engine 202, 16, 16' is in operation, then, in step (2812), if the turbo-electric turbo-compounding system 10 is enabled for operation, then, in step (2814), if the frequency slip 158 is not within range to provide for powering the multi-phase induction motor 104, 104' from the multi-phase AC generator 56, 56.1, 56.1', 126, 126', 126", 126''', or, from step (2812), if the turbo-electric turbo-compounding system 10 is not enabled, then, in step (2816), the frequency of the multi-phase inverter/induction motor driver 216 is set, responsive to the rotational speed of the multi-phase induction motor 104, 104', for example, with the associated frequency slip 158 set so that the associated normalized slip parameter s is in the range of 0 to 1. For example, in one set of embodiments, the value of the frequency slip 158 is between 0 and the frequency slip 158.1 associated with the maximum possible shaft torque 152.1, i.e. "breakover torque", wherein the amount of frequency slip 158 is automatically adjusted as a function of the applied load. Then, in step (2818), the multi-phase inverter/induction motor driver 216 is activated so as to provide for driving the multi-phase induction motor 104, 104' solely from the multi-phase inverter/induction motor driver 216 with power supplied by the battery 212, for example, in accordance with a below-described first operating mode 222.1, after which, the process 2800 continues with repetition of step (2804), Otherwise from step (2814), if the frequency slip 158 is within range to provide for powering the multi-phase induction motor 104, 104' from the multi-phase AC generator 56, 56.1, 56.1', 126, 126', 126", 126''', and, in step (2820), if an associated power-boost condition is either automatically enabled or operator selected (e.g. by a "Power Boost" command), then, in step (2822)), the frequency of the multi-phase inverter/induction motor driver 216 is set to match that of the multi-phase AC generator 56, 56.1, 56.1', 126, 126', 126", 126''' so as to provide for the multi-phase induction motor 104, 104' to be powered by both the multi-phase AC generator 56, 56.1, 56.1', 126, 126', 126", 126''' and the multi-phase inverter/induction motor driver 216/battery 212, so as to provide for further supplementing the mechanical power output of the engine 202, 16, 16', for example, so as to provide extra power for passing or steeper grades. Following step (2822), in step (2818), the multi-phase inverter/induction motor driver 216 is activated so as to provide for driving the multi-phase induction motor 104, 104' both from the multi-phase AC generator 56, 56.1, 56.1', 126, 126', 126", 126''', and from the multi-phase inverter/induction motor driver 216 with power supplied by the battery 212, for example, in accordance with a below-described third operating mode 222.3, after which, the process 2800 continues with repetition of step (2804), Otherwise, from step (2820), if the power-boost condition is not enabled, then the multi-phase inverter/induction motor driver 216 is deactivated in step (2808), for example, in accordance with a below-described second operating mode 222.2, after which the process 2800 continues with repetition of step (2804), Referring to FIG. 29, in accordance with the first operating mode 222.1 of the turbo-electric turbo-compounding system 10, 10.7, each of the contacts of a first N-pole contactor 110.1, 110.1" is in an ON (i.e. conducting) state, and each of the contacts of a second N-pole contactor 110.2, 110.2" is in an OFF (i.e. non-conducting) state, so as to provide for the multi-phase induction motor 104, 104' to be solely powered from the battery 212 via the multi-phase inverter/induction motor driver 216, wherein the output frequency of the N-phase power 224.1 generated by the multi-phase inverter/induction motor driver 216 is responsive to the rotational speed of the multi-phase induction motor 104, 104', i.e. responsive to the associated second rotational-speed or frequency signal 120, so as to provide for the multi-phase induction motor 104, 104' to operate in the motoring mode 156.1 as indicated in FIGS. 18 and 19, with a sufficient amount of frequency slip 158 to generate a desired level of torque, subject to a limitation on the maximum current that can be provided by the multi-phase inverter/induction motor driver 216. For example, with the turbo-electric turbo-compounding system 10, 10.7 incorporated in a vehicle, the first operating mode 222.1 would typically be automatically selected by the controller 112 when the vehicle is accelerated from a standstill, or when operating the vehicle at a relatively low speed with the engine 202, 16, 16' at a relatively low power level, both of which conditions provide for a relatively low rate of flow of exhaust gases 28 from the engine 202, 16, 16'. With the engine 202, 16, 16' running at a relatively low rotational speed, so too would be the rotational speed of the bladed turbine rotor 48 and multi-phase synchronous AC generator 56, 56.1, 56.1' operatively coupled thereto and driven thereby, even with the wastegate valve 36, 36'—if incorporated—closed, so that an overspeed condition of the bladed turbine rotor 48 would be unlikely. Accordingly, the wastegate valve 36, 36'— if incorporated—would typically remain closed during the first operating mode 222.1. However, the controller 112 would continue to monitor the rotational speed of the multi-phase synchronous AC generator 56, 56.1, 56.1' via the first rotational-speed or frequency signal 118, 118', and if this were to exceed a threshold in advance of a prospective overspeed condition, either the wastegate valve 36, 36'— if incorporated—could be opened, or the turbo-electric turbo-compounding system 10, 10.7 could be switched to a different, below-described mode of operation that would provide for loading the multi-phase synchronous AC generator 56, 56.1, 56.1' and thereby either prevent or mitigate against overspeed of the bladed turbine rotor 48.

The battery 212 is charged by the rectifier/battery charger 210 from N-phase power 224.2 generated by the multi-phase synchronous AC generator 56, 56.1, 56.1'. The rectifier/battery charger 210 provides a controlled charge current at a rate that is responsive to the state of charge of the battery 212. For example, the rate of charge would typically be relatively high for a battery 212 at a relatively low state of charge, and the rate of charge would typically taper off to a trickle as the battery 212 approaches a fully-charged state. In one set of embodiments, the rectifier/battery charger 210 is continuously connected to the multi-phase synchronous AC generator 56, 56.1, 56.1' so that the multi-phase synchronous AC generator 56, 56.1, 56.1' would always be loaded at least to some degree. In one set of embodiments, the output of the rectifier/battery charger 210 is continuously connected to the terminals of the battery 212, so as to provide for supplementing the power provided by the battery 212 to the multi-phase inverter/induction motor driver 216. Alternatively, the rectifier/battery charger 210 could be disconnected from the multi-phase inverter/induction motor driver 216 when the multi-phase induction motor 104, 104' is being powered from the battery 21.

The multi-phase inverter/induction motor driver 216 receives power from the battery 212, monitors the phase angle of the N-phase power 224.2 from the multi-phase synchronous AC generator 56, 56.1, 56.1', and provides N-phase power 224.1 to the multi-phase induction motor 104, 104' as a stand-alone power source, or as a supplemental power source to the multi-phase synchronous AC generator 56, 56.1, 56.1'. When the frequency of the N-phase power 224.2 from the multi-phase synchronous AC generator 56, 56.1, 56.1' is less than the frequency corresponding to the synchronous rotational speed 154$^S$ of the multi-phase induction motor 104, 104' for example, as a result of the engine running at relatively low power levels with corresponding relatively low exhaust flow rates, —the multi-phase synchronous AC generator 56, 56.1, 56.1' would be unable to drive the multi-phase induction motor 104, 104', so the turbo-electric turbo-compounding system 10, 10.7 would be limited to using the first operating mode 222.1 to provide for driving the multi-phase induction motor 104, 104' from the multi-phase inverter/induction motor driver 216, and if the turbo-electric turbo-compounding system 10, 10.7 had been supplying power to the multi-phase induction motor 104, 104' from the multi-phase synchronous AC generator 56, 56.1, 56.1', the controller 112 would automatically revert to the first operating mode 222.1.

Figure 30:
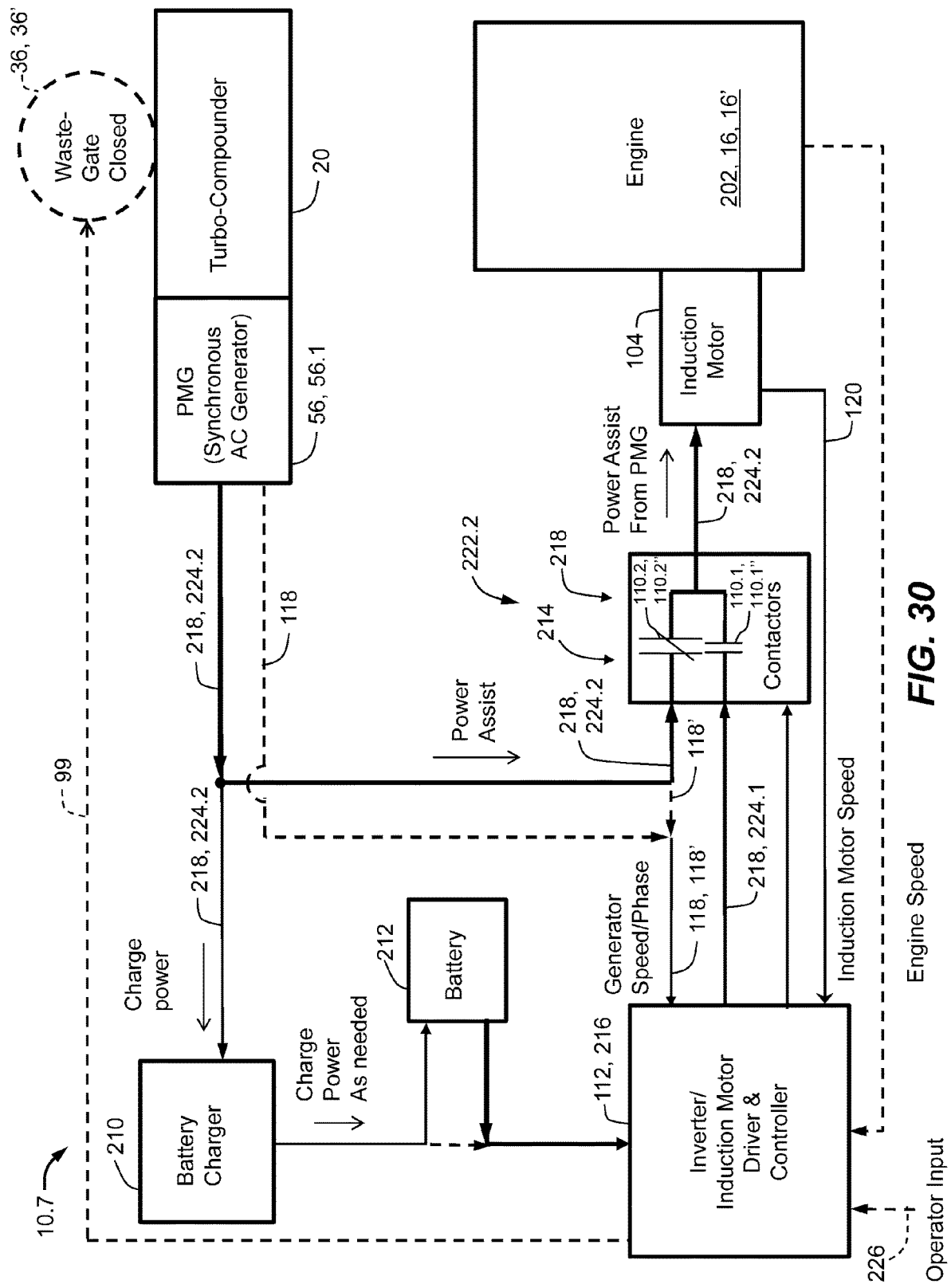
FIG. 30 illustrates a block diagram of the seventh aspect of the turbo-electric turbo-compounding system in accordance with a second mode of operation.

Referring to FIG. 30, in accordance with the second operating mode 222.2 of the turbo-electric turbo-compounding system 10, 10.7, each of the contacts of the first N-pole contactor 110.1, 110.1" is in an OFF (i.e. non-conducting) state, and each of the contacts of the second N-pole contactor 110.2, 110.2" is in an ON (i.e. conducting) state, so as to provide for the multi-phase induction motor 104, 104' to be solely powered by N-phase power 224.2 from the multi-phase synchronous AC generator 56, 56.1, 56.1', as described hereinabove for the first 10.1, second 10.2, third 10.3 or fifth 10.5 aspects of the turbo-electric turbo-compounding system 10, 10.1, 10.2, 10.3, 10.5, wherein the wastegate valve 36, 36'— if incorporated—is controlled as described hereinabove for the first 10.1, second 10.2, third 10.3 or fifth 10.5 aspects of the turbo-electric turbo-compounding system 10, 10.1, 10.2, 10.3, 10.5, and is closed when the multi-phase induction motor 104, 104' is being powered from the multi-phase synchronous AC generator 56, 56.1, 56.1'; and the battery 212 is charged as described hereinabove for the first operating mode 222.1. For example, the second operating mode 222.2 would typically be automatically selected by the controller 112 when the power level of the engine 202, 16, 16' is sufficiently high, resulting in a sufficiently high rate of flow of exhaust gases 28, so that the frequency of the N-phase power 224.2 from the multi-phase synchronous AC generator 56, 56.1, 56.1' exceeds the frequency corresponding to the synchronous rotational speed 154s of the multi-phase induction motor 104, 104', thereby providing for the multi-phase synchronous AC generator 56, 56.1, 56.1' to operate the multi-phase induction motor 104, 104' in the motoring mode 156.1. For example, in one set of embodiments, with the turbo-electric turbo-compounding system 10, 10.7 incorporated in a vehicle, the second operating mode 222.2 would typically be automatically selected by the controller 112 for normal-speed operation of the vehicle.

Figure 31:
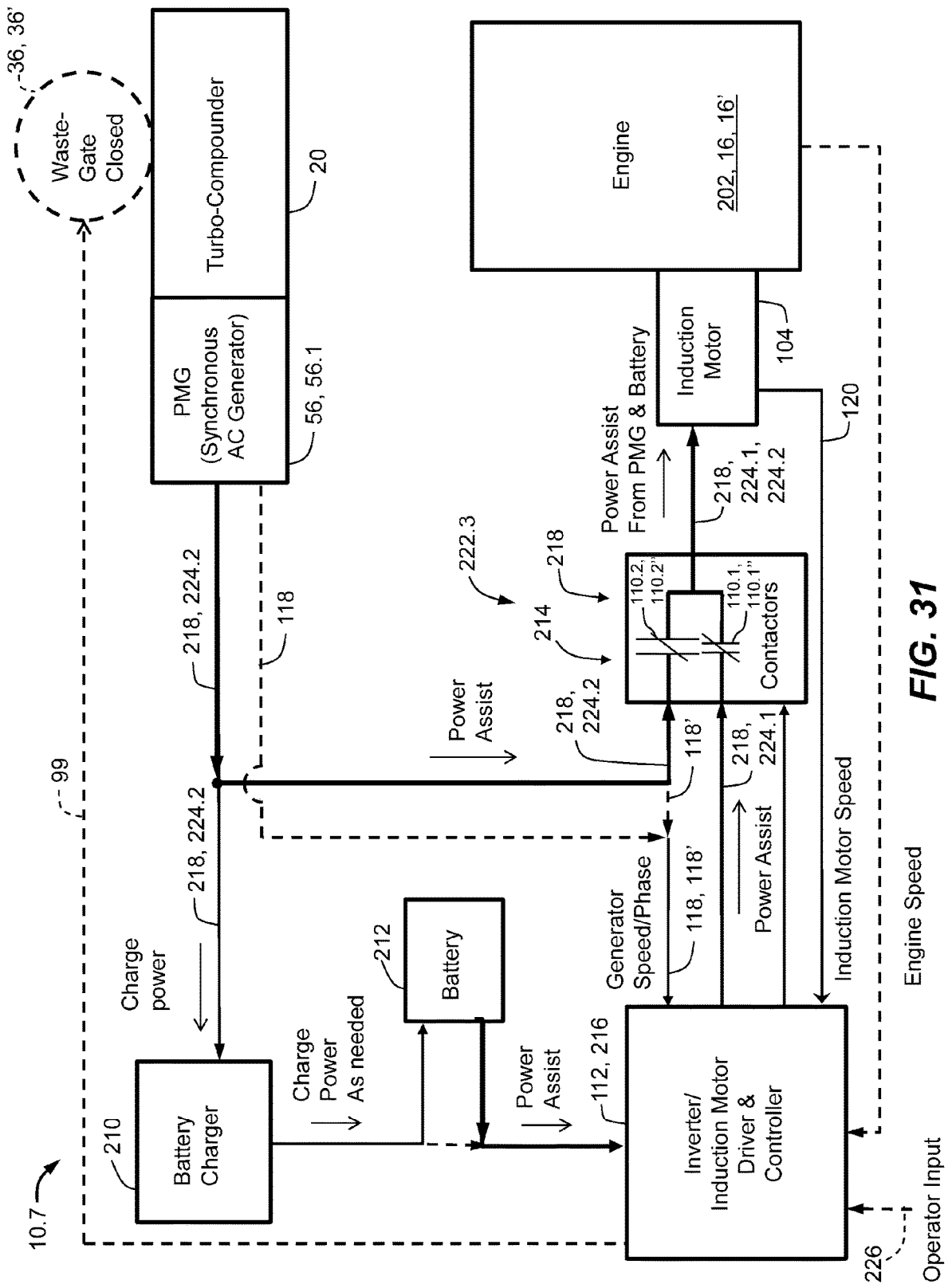
FIG. 31 illustrates a block diagram of the seventh aspect of the turbo-electric turbo-compounding system in accordance with a third mode of operation.

Referring to FIG. 31, in accordance with the third operating mode 222.3 of the turbo-electric turbo-compounding system 10, 10.7, each of the contacts of the first N-pole contactor 110.1, 110.1" is in an ON (i.e. conducting) state, and each of the contacts of the second N-pole contactor 110.2, 110.2" is also in an ON (i.e. conducting) state, so as to provide for the multi-phase induction motor 104, 104' to be powered both from the battery 212 via the N-phase power 224.1 from the multi-phase inverter/induction motor driver 216 as described hereinabove for the first operating mode 222.1, and by N-phase power 224.2 from the multi-phase synchronous AC generator 56, 56.1, 56.1', as described hereinabove for the second operating mode 222.2, and for the first 10.1, second 10.2, third 10.3 and fifth 10.5 aspects of the turbo-electric turbo-compounding system 10, 10.1, 10.2, 10.3, 10.5, but wherein the output frequency and phase of the N-phase power 224.1 generated by the multi-phase inverter/induction motor driver 216 is controlled to match that of the N-phase power 224.2 from the multi-phase synchronous AC generator 56, 56.1, 56.1', for example, responsive to the first rotational-speed or frequency signal 118, 118', i.e. either responsive to an associated first rotational-speed or frequency sensor 114, 114', or responsive to directly monitoring the N-phase power 224.2 from the multi-phase synchronous AC generator 56, 56.1, 56.1'. Furthermore, the relationship of voltage magnitude of the N-phase power 224.1 generated by the multi-phase inverter/induction motor driver 216 as a function of the frequency thereof is programmed to be similar to that of the N-phase power 224.2 from the multi-phase synchronous AC generator 56, 56.1, 56.1'. The wastegate valve 36, 36'— if incorporated—is controlled in accordance with the previously-described operation of the first 10.1, second 10.2, third 10.3 and fifth 10.5 aspects of the turbo-electric turbo-compounding system 10, 10.1, 10.2, 10.3, 10.5, and is closed when the multi-phase induction motor 104, 104' is being powered from the multi-phase synchronous AC generator 56, 56.1, 56.1'; and the battery 212 is charged as described hereinabove for the first operating mode 222.1. For example, in one set of embodiments, with the turbo-electric turbo-compounding system 10, 10.7 incorporated in a vehicle, the third operating mode 222.3 would typically be automatically selected by the controller 112 when the vehicle is accelerated from a normal speed to a higher speed, using supplemental power from the battery 212 via the multi-phase inverter/induction motor driver 216 in order to do so, provided that the frequency of the N-phase power 224.2 from the multi-phase synchronous AC generator 56, 56.1, 56.1' exceeds the frequency corresponding to the synchronous rotational speed 154s of the multi-phase induction motor 104, 104', thereby providing for the multi-phase synchronous AC generator 56, 56.1, 56.1' to operate the multi-phase induction motor 104, 104' in the motoring mode 156.1. In one set of embodiments, the multi-phase inverter/induction motor driver 216 monitors the state of charge of the battery 212, and if the state of charge of the battery 212 is less than a threshold, the controller 112 automatically reverts to the second operating mode 222.2 until the battery 212 becomes sufficiently charged to resume operation in the third operating mode 222.3 if appropriate at that time.

Figure 32:
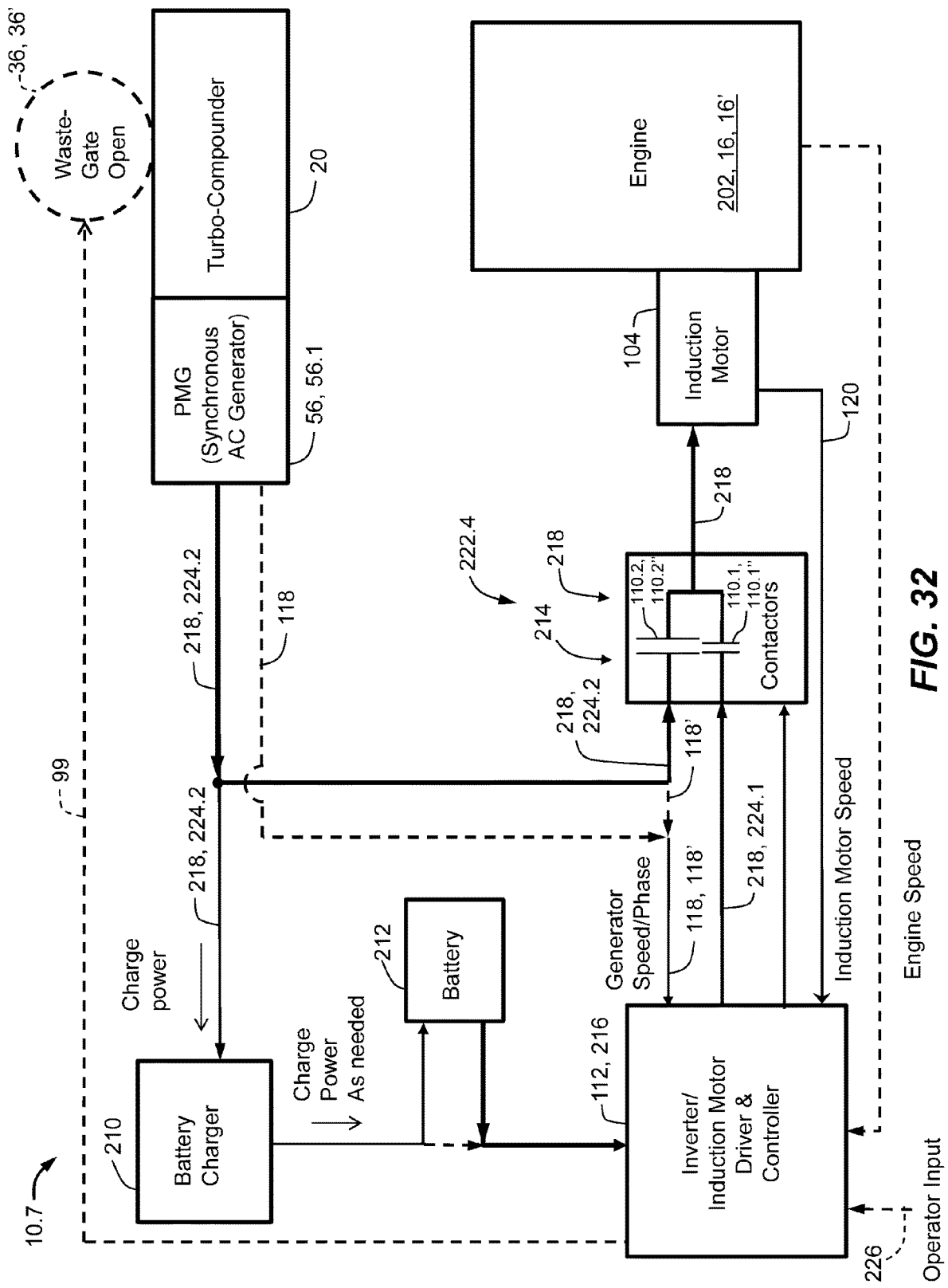
FIG. 32 illustrates a block diagram of the seventh aspect of the turbo-electric turbo-compounding system in accordance with a fourth mode of operation.
Figure 33:
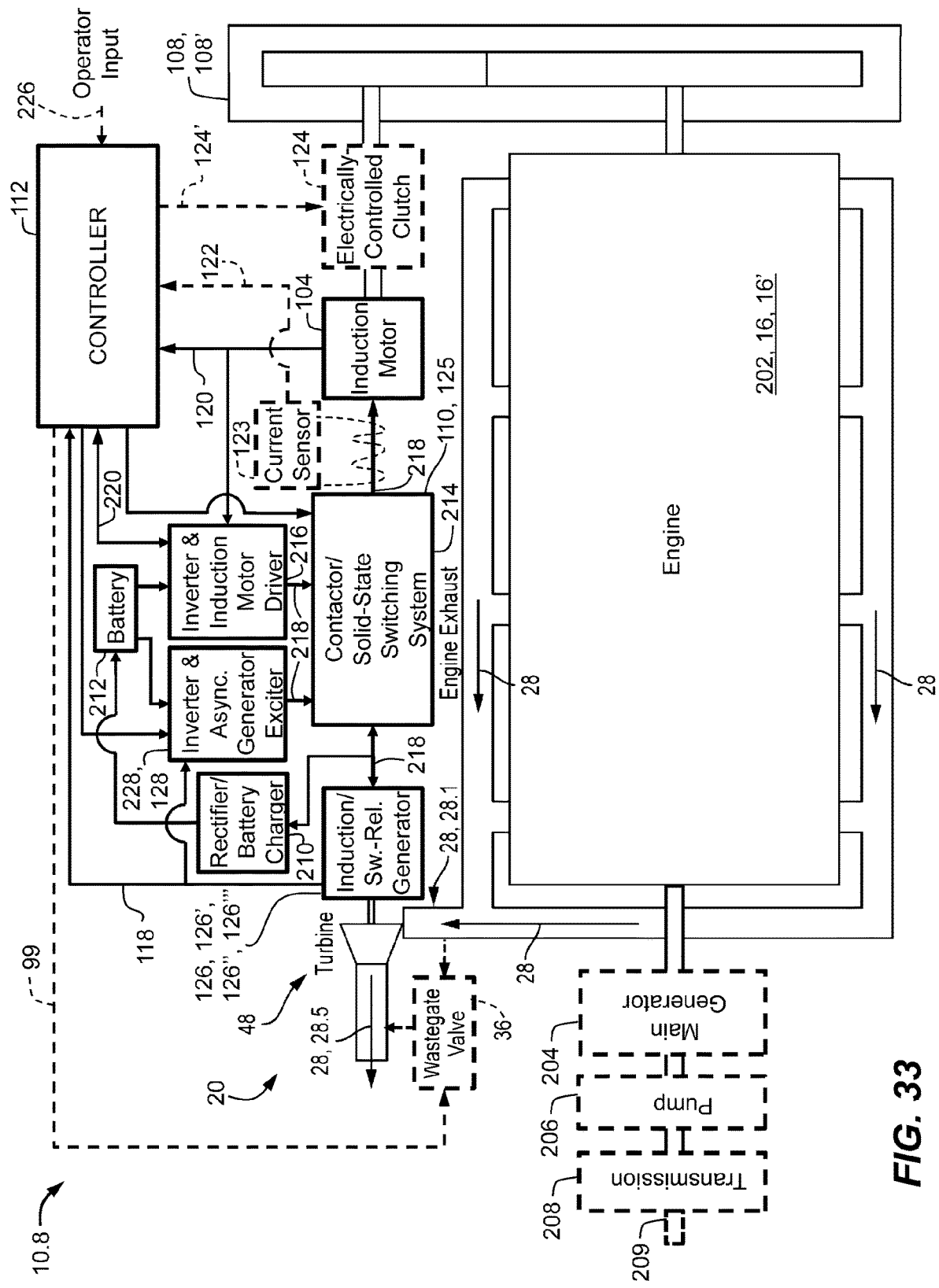
FIG. 33 illustrates a eighth aspect of a turbo-electric turbo-compounding system.
Figure 34:
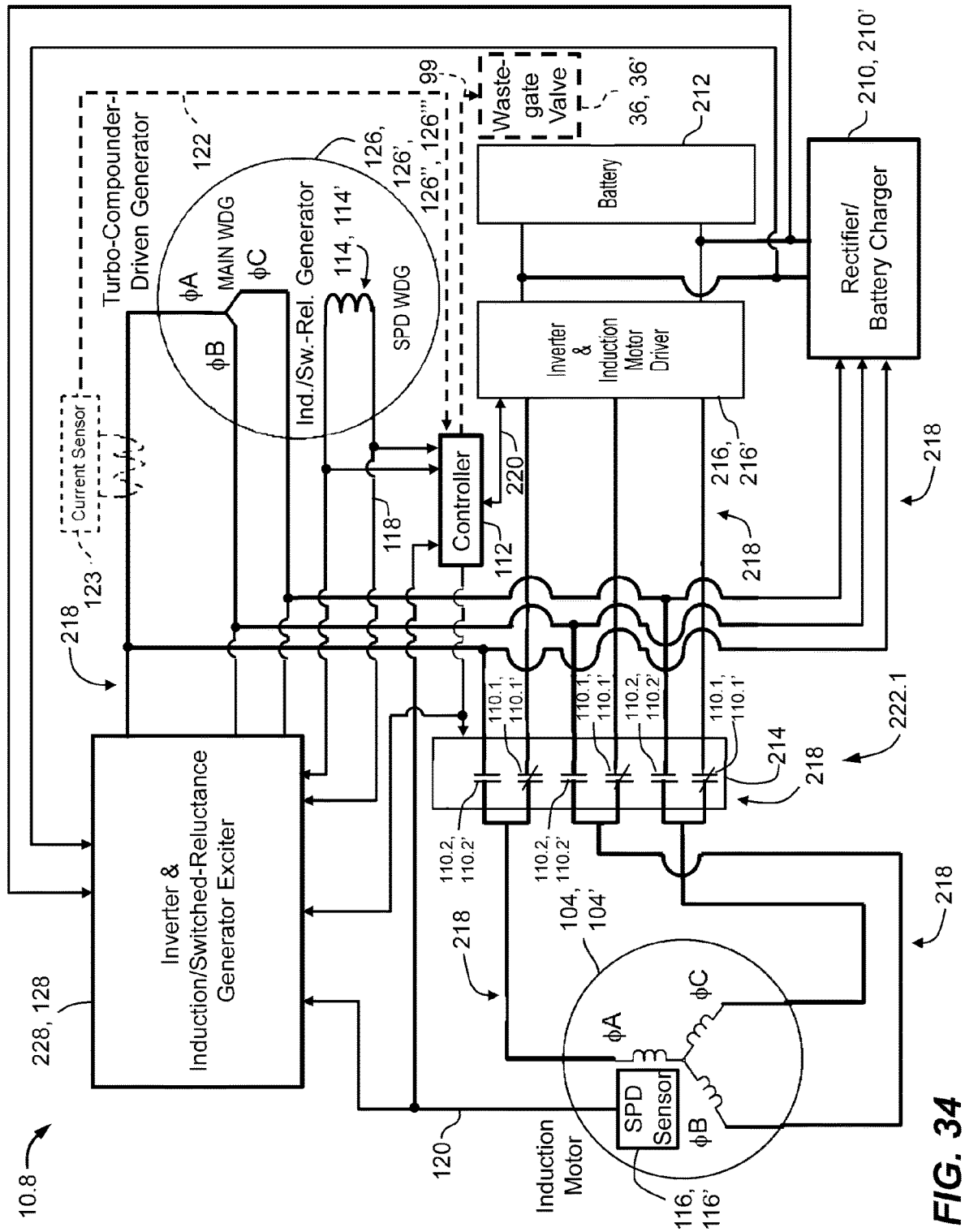
FIG. 34 illustrates a schematic block diagram of the eighth aspect of a turbo-electric turbo-compounding system, configured for three-phase operation.
Figure 35:
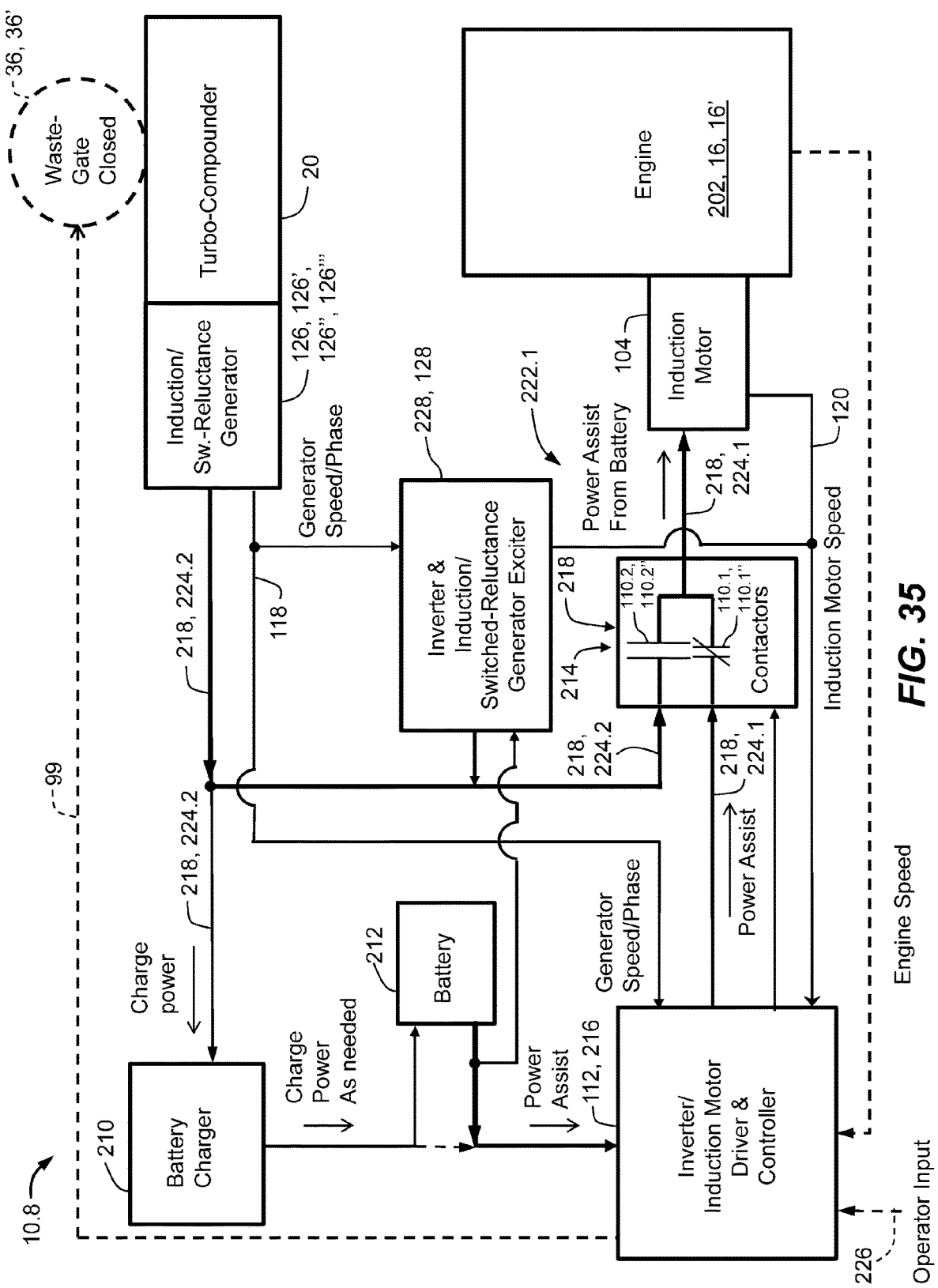
FIG. 35 illustrates a block diagram of the eighth aspect of the turbo-electric turbo-compounding system in accordance with the first mode of operation.
Figure 36:
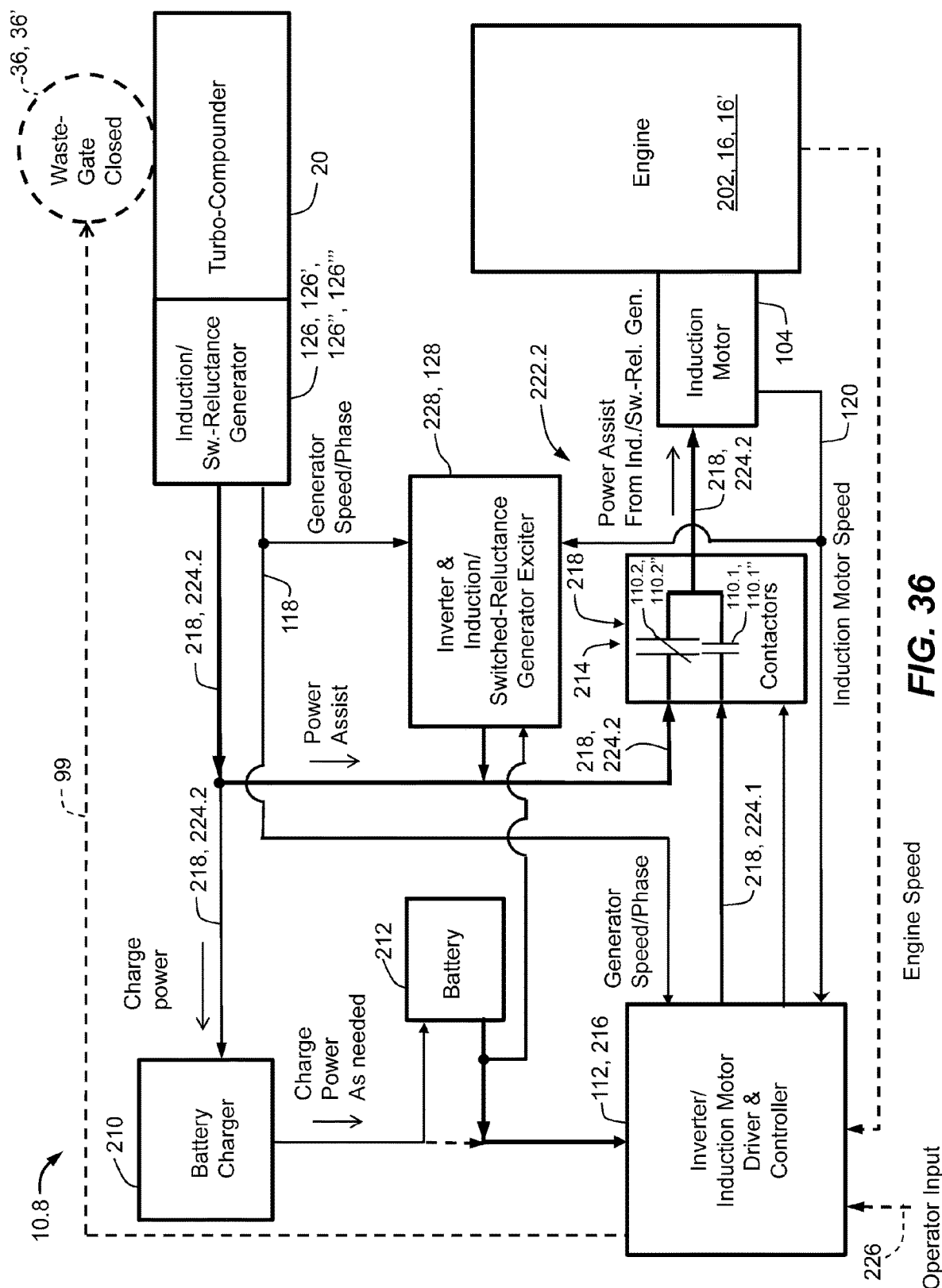
FIG. 36 illustrates a block diagram of the eighth aspect of the turbo-electric turbo-compounding system in accordance with the second mode of operation.
Figure 37:
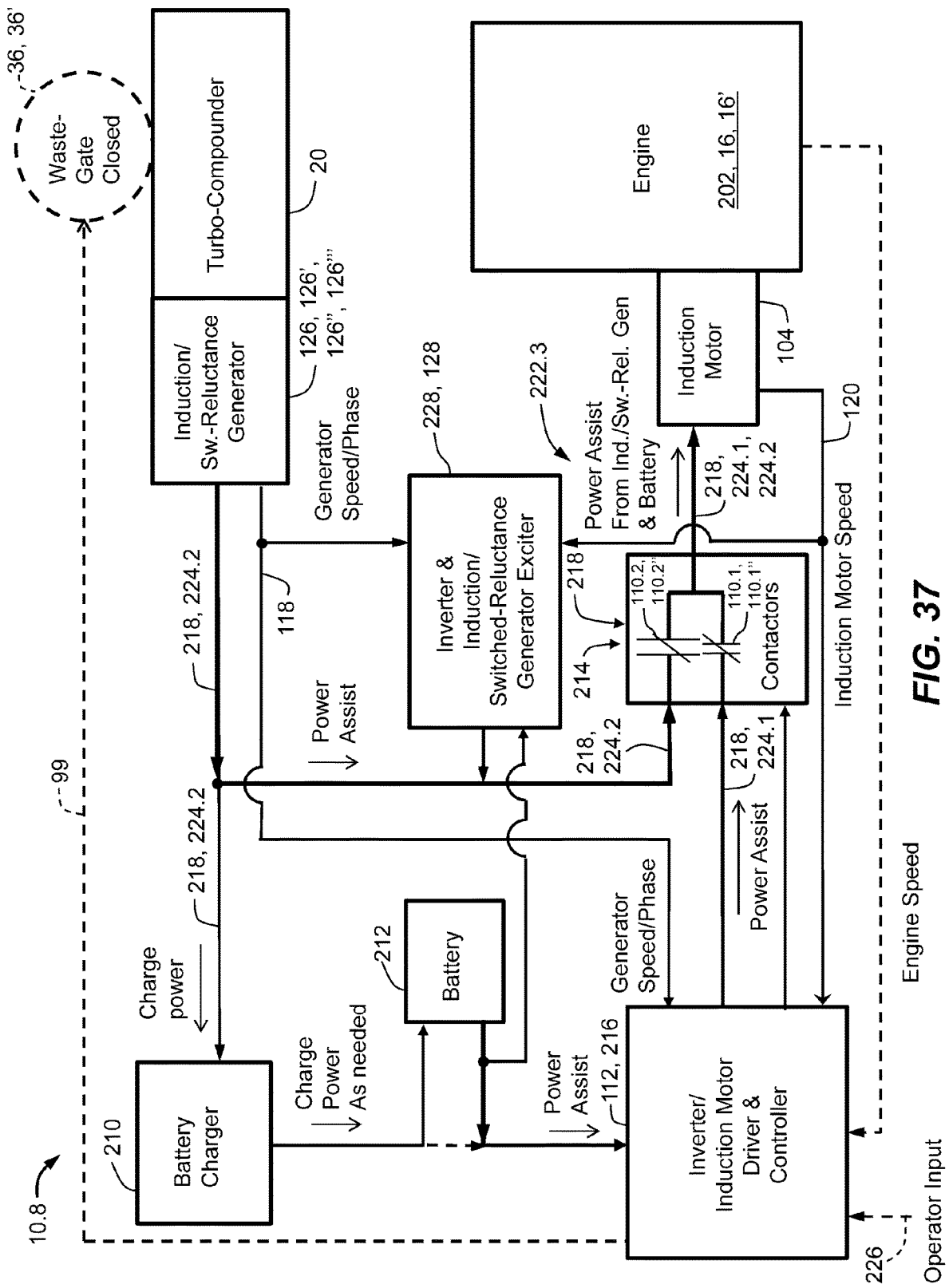
FIG. 37 illustrates a block diagram of the eighth aspect of the turbo-electric turbo-compounding system in accordance with the third mode of operation.
Figure 38:
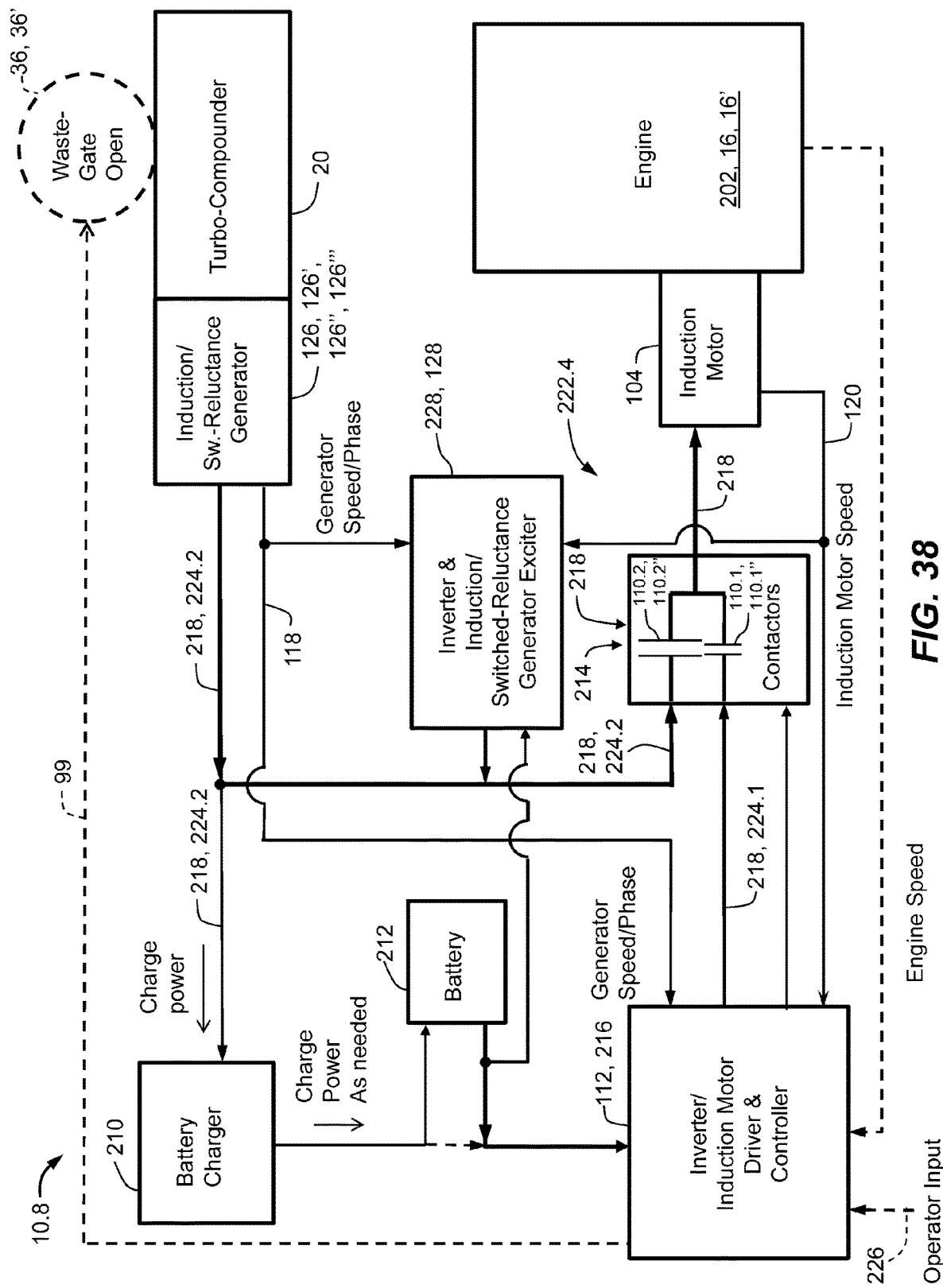
FIG. 38 illustrates a block diagram of the eighth aspect of the turbo-electric turbo-compounding system in accordance with the fourth mode of operation.
Figure 39:
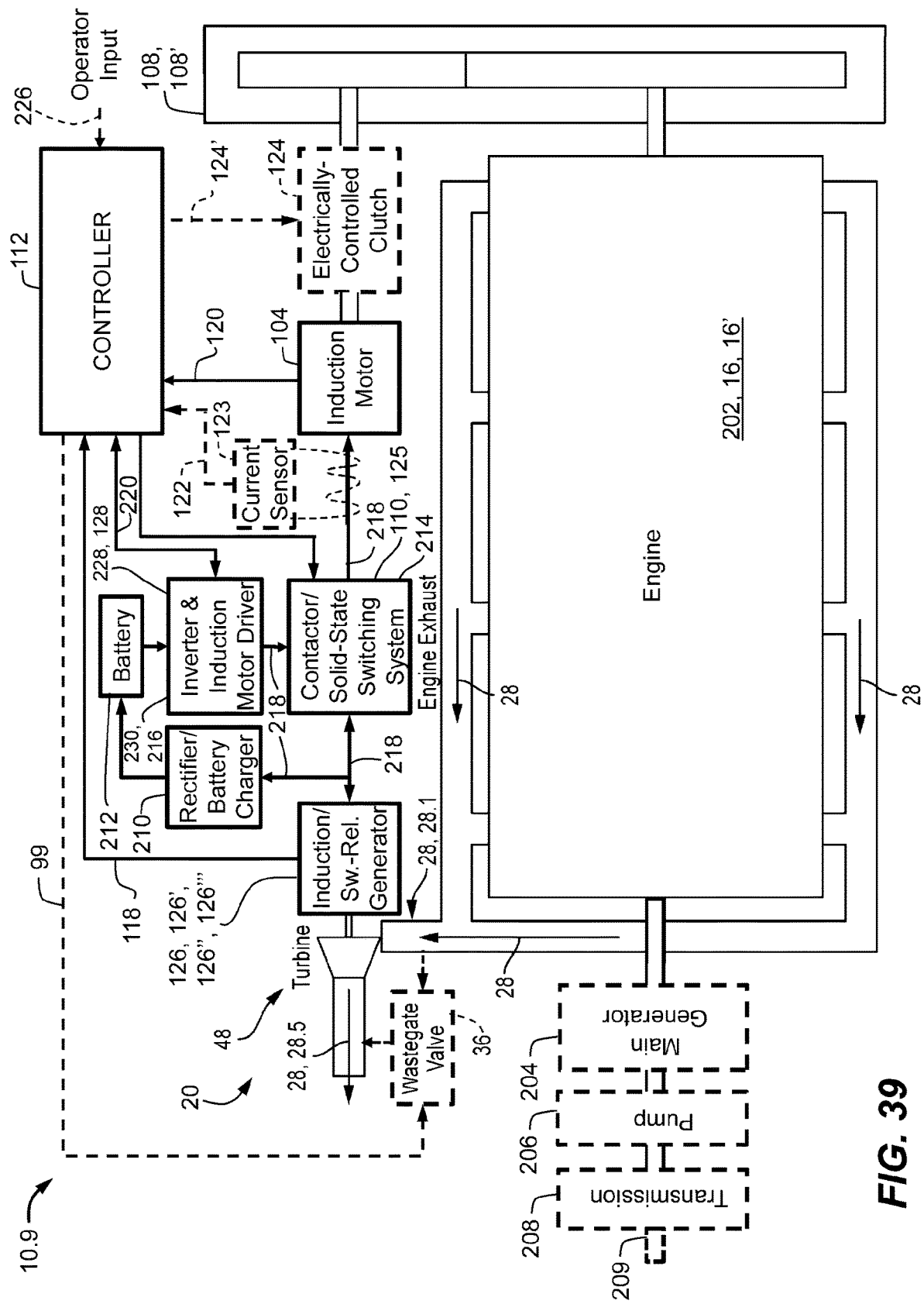
FIG. 39 illustrates a ninth aspect of a turbo-electric turbo-compounding system.

Referring to FIG. 32, in accordance with a fourth operating mode 222.4 of the turbo-electric turbo-compounding system 10, 10.7, each of the contacts of the first N-pole contactor 110.1, 110.1" is in an OFF (i.e. non-conducting) state, and each of the contacts of the second N-pole contactor 110.2, 110.2" is also in an OFF (i.e. non-conducting) state, so as to provide for decoupling the multi-phase synchronous AC generator 56, 56.1, 56.1' from the multi-phase induction motor 104, 104', and thereby provide for decoupling the multi-phase synchronous AC generator 56, 56.1, 56.1' from the engine 202, 16, 16', wherein the wastegate valve 36, 36'— if incorporated—is open so as to provide for bypassing the exhaust gases 28 (or, more particularly, the portion thereof that can flow through the open wastegate valve 36, 36') around the bladed turbine rotor 48, and thereby prevent an overspeed of the bladed turbine rotor 48. One example of a condition that would trigger the fourth operating mode 222.4 would be if the multi-phase induction motor 104, 104' becomes disconnected from the engine 202, 16, 16', for example, as a result of a failure of the associated gearbox 108 or belt drive system 108' mechanically coupling the rotor 106 of the multi-phase induction motor 104, 104' to the crankshaft of the genset engine 16, 16', for example, which can be inferred by monitoring the rotational speed of the engine 202, 16, 16' and comparing this to the rotational speed of the multi-phase induction motor 104, 104', accounting for the expected ratio of associated rotational speeds provided for by the associated gearbox 108 or belt drive system 108'. More particularly, in one set of embodiments, the fourth operating mode 222.4 would typically be automatically selected by the controller 112 when the ratio of the sensed rotational speeds of the engine 202, 16, 16' in relation to the multi-phase induction motor 104, 104' differs from a nominal ratio by more than a threshold, which could occur from any of the first 222.1, second 222.2 or third 222.3 operating modes. In one set of embodiments, during operation under the first operating mode 222.1—i.e. with power assist from the battery 212/multi-phase inverter/induction motor driver 216 alone—the multi-phase inverter/induction motor driver 216 monitors the state of charge of the battery 212, and if the state of charge of the battery 212 is less than a threshold, the controller 112 automatically reverts to the fourth operating mode 222.4 until the battery 212 becomes sufficiently charged to resume operation in the first operating mode 222.1 if appropriate at that time.

At any time during operation under any of the first 222.1, second 222.2 or third 222.3 operating modes, if the rotational speed of the multi-phase synchronous AC generator 56, 56.1, 56.1' exceeds a predetermined threshold, the controller 112 automatically opens the wastegate valve 36, 36'— if incorporated—to protect the bladed turbine rotor 48 from overspeed.

The controller 112 provides for controlling the first 110.1, 110.1" and second 110.2, 110.2" N-pole contactor to support each mode of operation, either or both automatically responsive to conditions, and/or, in some embodiments, responsive or further responsive to operator input 226 of executive control commands, for example, in one set of embodiments, the latter of which comprises a system ON/OFF command and a boost command. Responsive to a system ON command, the turbo-electric turbo-compounding system 10, 10.7, the controller 112 automatically sets the first operating mode 222.1 if the frequency of the N-phase power 224.2 from the multi-phase synchronous AC generator 56, 56.1, 56.1' is less than or equal to a threshold frequency, and automatically sets the second operating mode 222.2 if the frequency of the N-phase power 224.2 from the multi-phase synchronous AC generator 56, 56.1, 56.1' is greater than the threshold frequency, wherein the threshold frequency is given by a frequency that exceeds the frequency corresponding to the synchronous rotational speed 154s of the multi-phase induction motor 104, 104' by a margin, wherein, for example, in one set of embodiments, the amount of the margin is sufficient to provide for transmitting a greater amount of power to the multi-phase induction motor 104, 104' than could be transmitted by the multi-phase inverter/induction motor driver 216 alone. Responsive to a system boost command, the controller 112 automatically sets the third operating mode 222.3 if the frequency of the N-phase power 224.2 from the multi-phase synchronous AC generator 56, 56.1, 56.1' is greater than the frequency corresponding to the synchronous rotational speed 154s of the multi-phase induction motor 104, 104'.

Typically the multi-phase synchronous AC generator 56, 56.1, 56.1' would be implemented with a multi-phase permanent magnet AC generator 56, 56.1, 56.1', although it should be understood that the multi-phase synchronous AC generator 56 is not limited thereto, and could be embodied by any type of multi-phase synchronous AC generator 56, for example, including, but not limited to, a field-controlled multi-phase synchronous AC generator 56.

Referring to FIGS. 33-38, an eighth aspect of the turbo-electric turbo-compounding system 10, 10.8 is structurally the same as the above-described seventh aspect 10.7 of the turbo-electric turbo-compounding system 10, 10.7, except that the multi-phase synchronous AC generator 56, 56.1, 56.1' is replaced by a multi-phase asynchronous AC generator 126—for example, either a multi-phase induction generator 126, 126', 126" or a multi-phase switched-reluctance generator 126, 126', in combination with an associated multi-phase inverter/asynchronous generator exciter 228, 128, wherein the number of phases of the multi-phase asynchronous AC generator 126, 126', 126", 126''' is the same as the number of phases of the multi-phase inverter/asynchronous generator exciter 228, 128, and the same as the number of phases of the multi-phase inverter/induction motor driver 216, 216'. The operation of the multi-phase asynchronous AC generator 126, 126', 126", 126''' in cooperation with the associated multi-phase inverter/asynchronous generator exciter 228, 128 is the same as described hereinabove for the fourth 10.4 and sixth 10.6 aspects of the turbo-electric turbo-compounding system 10, 10.4, 10.6, wherein the multi-phase inverter/asynchronous generator exciter 228, 128—using power from the battery 212, 132, 132'—provides a reactive excitation current that provides for the multi-phase asynchronous AC generator 126, 126', 126", 126''' to function as a generator. The multi-phase induction generator 126, 126', 126" in cooperation with the multi-phase inverter/asynchronous generator exciter 228, 128 can beneficially operate at relatively lower frequencies than a corresponding multi-phase permanent magnet AC generator 56, 56.1, 56.1', and thereby provide for generating N-phase power 224.2 over a relatively wider range of frequencies than would a multi-phase permanent magnet AC generator 56, 56.1, 56.1', however at the relative disadvantage of requiring the multi-phase inverter/asynchronous generator exciter 228, 128 and operating at a relatively lower efficiency than the multi-phase permanent magnet AC generator 56, 56.1, 56.1'. Alternatively, a multi-phase switched-reluctance generator 126, 126'—for which a multi-phase inverter/asynchronous generator exciter 228, 128 would provide timed excitation—would be expected to be relatively more efficient and robust than a multi-phase induction generator 126, 126', 126", but at the relative disadvantage of the associated multi-phase inverter/asynchronous generator exciter 228, 128 being relatively more complex and relatively less efficient.

With the multi-phase inverter/asynchronous generator exciter 228, 128 independent of the multi-phase inverter/induction motor driver 216, the operating modes 222.1, 222.2, 222.3, 222.4 of the eighth aspect 10.8 of the turbo-electric turbo-compounding system 10, 10.8—respectively illustrated in FIGS. 35-38—are the same as described hereinabove for the seventh aspect 10.7 of the turbo-electric turbo-compounding system 10, 10.7.

Figure 40:
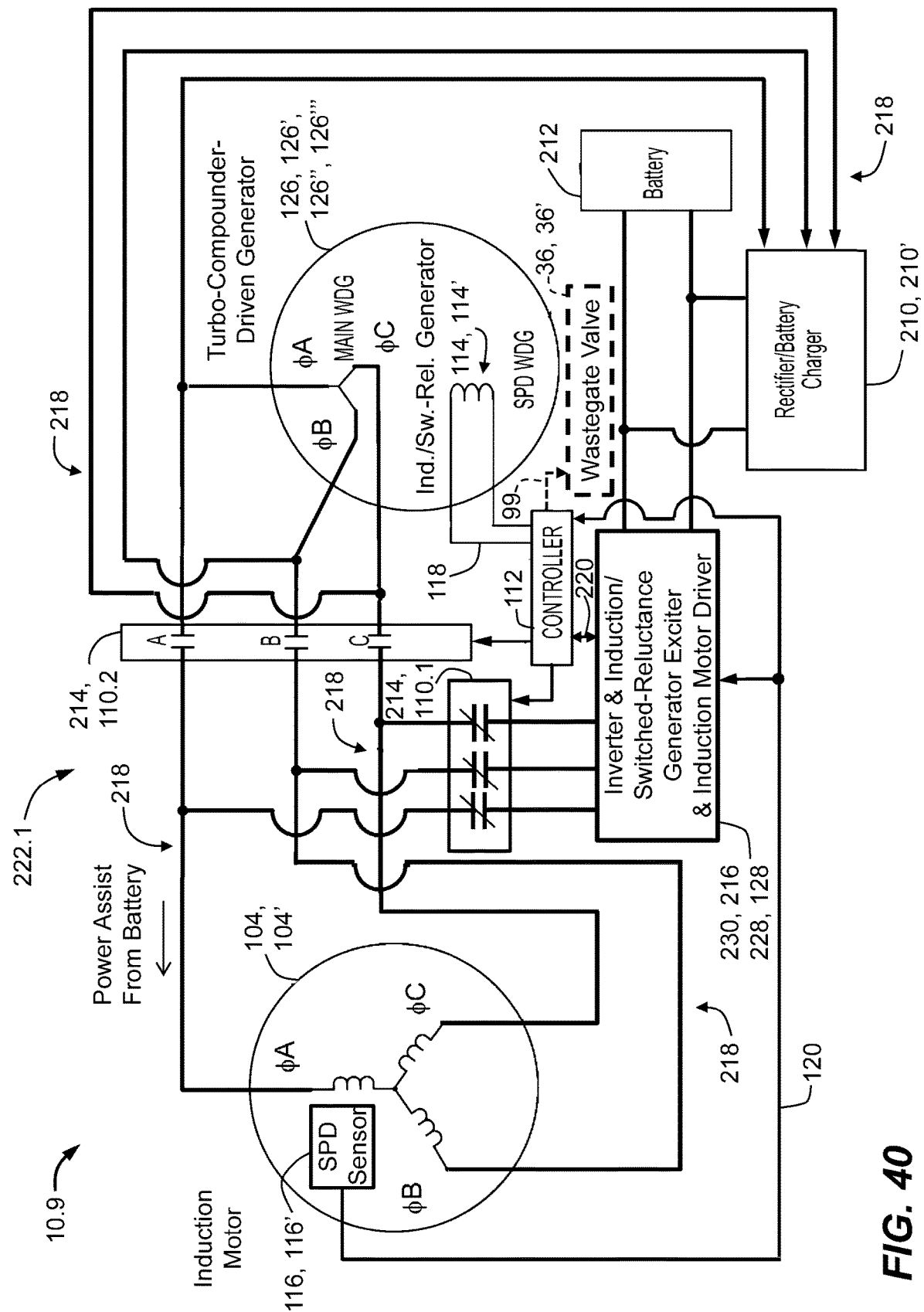
FIG. 40 illustrates a block diagram of the ninth aspect of the turbo-electric turbo-compounding system in accordance with the first mode of operation.
Figure 41:
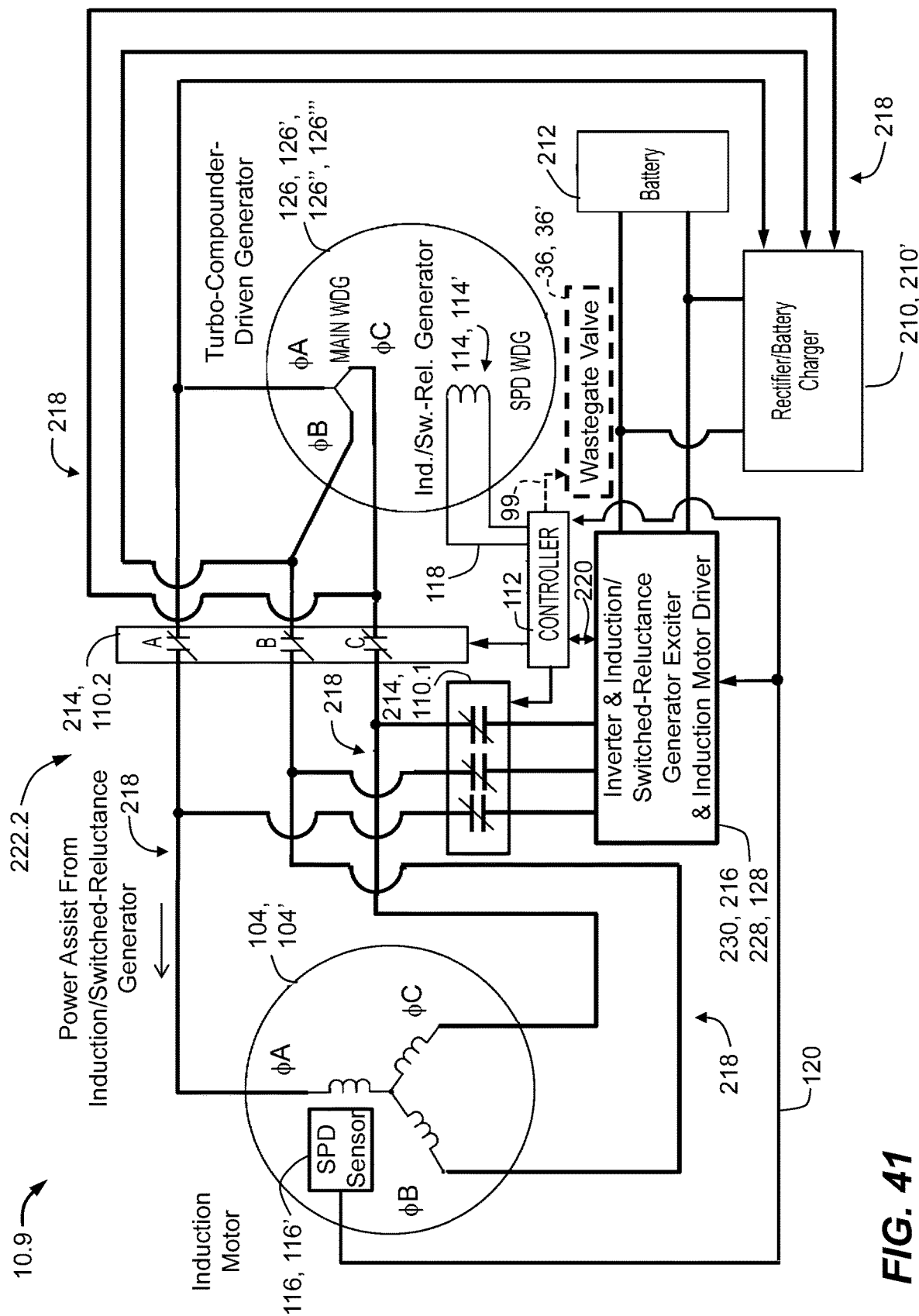
FIG. 41 illustrates a block diagram of the ninth aspect of the turbo-electric turbo-compounding system in accordance with the second mode of operation.
Figure 42:
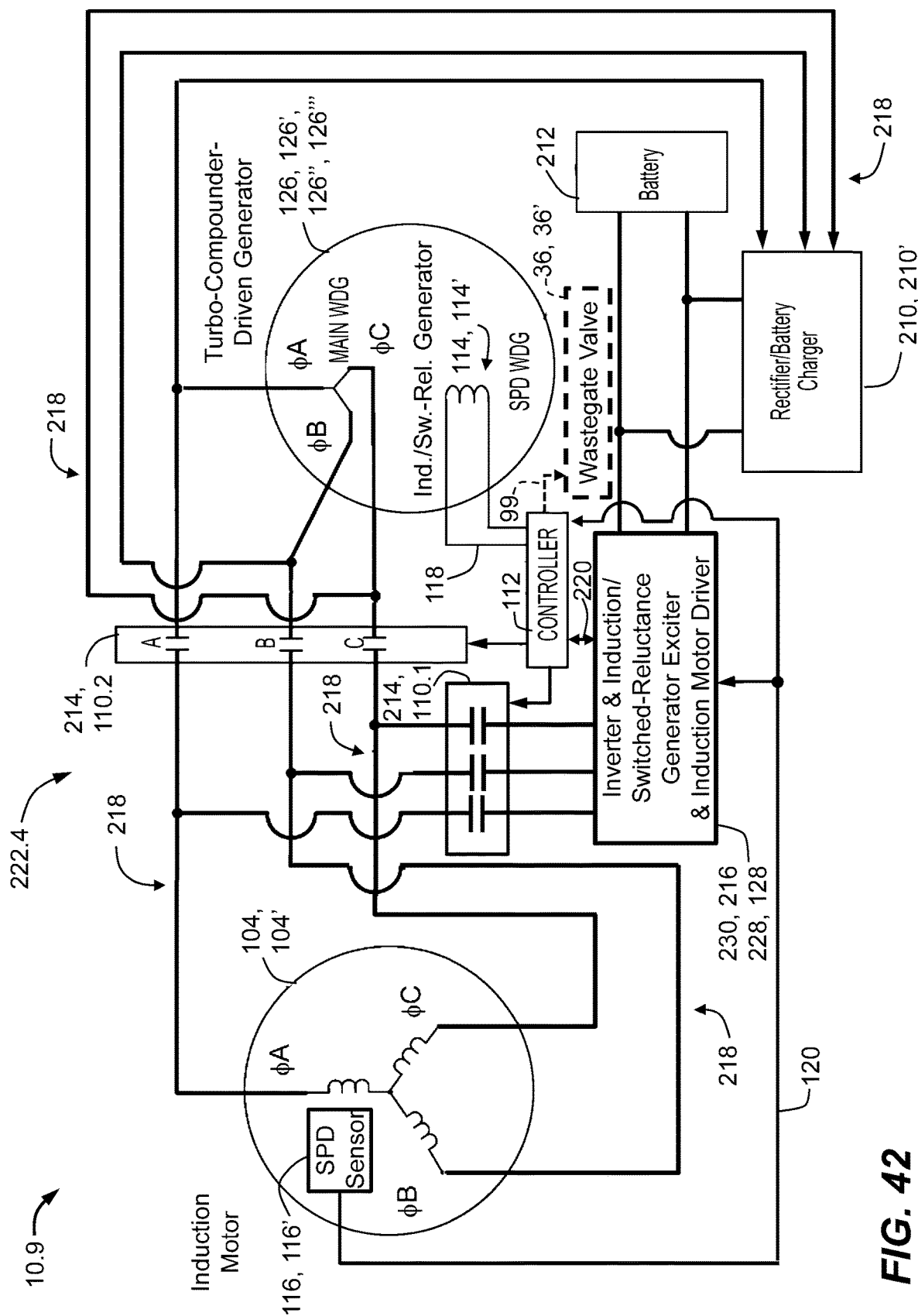
FIG. 42 illustrates a block diagram of the ninth aspect of the turbo-electric turbo-compounding system in accordance with the fourth mode of operation.

Referring to FIGS. 39-42, a ninth aspect 10.9 of the turbo-electric turbo-compounding system 10, 10.9 also incorporates a multi-phase asynchronous AC generator 126, 126', 126", 126''' similar to the eighth aspect 10.8 of the turbo-electric turbo-compounding system 10, 10.8, however the multi-phase inverter/induction motor driver 216 and the multi-phase inverter/asynchronous generator exciter 228, 128 are combined as a single multi-phase inverter/induction motor driver 230, 216, 228, 128 that provides for driving the multi-phase induction motor 104, 104' when the turbo-electric turbo-compounding system 10, 10.9 is operated in the above-described first operating mode 222.1 as illustrated in FIG. 40. The multi-phase inverter/induction motor driver 230, 216, 228, 128 provides for exciting the multi-phase asynchronous AC generator 126, 126', 126", 126''' when the turbo-electric turbo-compounding system 10, 10.9 is operated in the above-described second operating mode 222.2 as illustrated in FIG. 41, but for which the ninth aspect of the turbo-electric turbo-compounding system 10, 10.9 differs from the eighth aspect 10.8 of the turbo-electric turbo-compounding system 10, 10.8 in that each of the contacts of the first N-pole contactor 110.1, 110.1" is in an ON (i.e. conducting) state, and each of the contacts of the second N-pole contactor 110.2, 110.2" is also in an ON (i.e. conducting) state, so as to both provide for the multi-phase inverter/induction motor driver 230, 216, 228, 128 to provide excitation for the multi-phase asynchronous AC generator 126, 126', 126", 126''', and to provide for the multi-phase induction motor 104, 104' to be powered by N-phase power 224.2 from the multi-phase asynchronous AC generator 126, 126', 126", 126', wherein the output frequency and phase of the multi-phase inverter/induction motor driver 230, 216, 228, 128 are controlled responsive to the first rotational-speed or frequency signal 118 responsive to the associated first rotational-speed or frequency sensor 114, 114' that provides a measure responsive to the rotational speed of the multi-phase asynchronous AC generator 126, 126', 126", 126'. The use of a single multi-phase inverter/induction motor driver 230, 216, 228, 128 precludes simultaneously powering the multi-phase induction motor 104, 104' from both the battery 212 and the multi-phase asynchronous AC generator 126, 126', 126", 126''' because the multi-phase inverter/induction motor driver 230, 216, 228, 128 would, under most conditions, operate at different frequencies for the different operating modes 222.1, 222.2 for given rotational speeds of the multi-phase induction motor 104, 104' and the multi-phase asynchronous AC generator 126, 126', 126", 126'''. However, referring to FIG. 42, operation of the ninth aspect 10.9 of the turbo-electric turbo-compounding system 10, 10.9 under the fourth operating mode 222.4 is the same as described hereinabove for the seventh 10.7 and eighth 10.8 aspects. The ninth aspect of the turbo-electric turbo-compounding system 10, 10.9 incorporating a multi-phase induction generator 126, 126', 126" beneficially provides for operation over a relatively wider range of frequencies than could the seventh aspect 10.7 incorporating a multi-phase permanent magnet AC generator 56, 56.1, 56.1', and the associated single multi-phase inverter/induction motor driver 230, 216, 228, 128 would be cost effective relative to the eighth aspect 10.8. However, the seventh aspect 10.7 of the turbo-electric turbo-compounding system 10, 10.7 incorporating a multi-phase permanent magnet AC generator 56, 56.1, 56.1' would be expected to be more efficient than the ninth aspect 10.9.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of any claims that are supportable by the specification and drawings, and any and all equivalents thereof.

What is claimed is:

1. A method of recovering power from a flow of exhaust from an internal combustion engine, comprising:
   a. receiving the flow of exhaust from the internal combustion engine;
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said multi-phase induction motor with electrical power generated by said multi-phase AC generator; and
   e. operatively mechanically coupling, an output shaft of said multi-phase induction motor to an output shaft of said internal combustion engine so as to provide for recovering power from said first portion of said flow of exhaust,
      wherein said multi-phase AC generator comprises a multi-phase induction generator, the number of phases to said multi-phase induction motor is at least three and equal in number to the number of phases of said multi-phase induction generator, each phase of said multi-phase induction motor is electrically associated with a corresponding phase of said multi-phase inducting generator, further comprising generating a multi-phase excitation signal, wherein a frequency of said multi-phase excitation signal is responsive to a rotational speed of said multi-phase induction generator, and each phase of said multi-phase excitation signal is electrically associated with a corresponding phase of said multi-phase inducting generator.

2. A method of recovering power from a flow of exhaust from an internal combustion engine, comprising:
   a. receiving the flow of exhaust from the internal combustion engine;
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said multi-phase induction motor with electrical power generated by said multi-phase AC generator; and
   e. operatively mechanically coupling, an output shaft of said multi-phase induction motor to an output shaft of said internal combustion engine so as to provide for recovering power from said first portion of said flow of exhaust,
      wherein the operation of operatively coupling said electrical output of said multi-phase AC generator to said multi-phase induction motor comprises operatively coupling said electrical output of said multi-phase AC generator to said multi-phase induction motor through at least one contactor, relay or solid-state switching or control system that provides for decoupling said multi-phase C generator from said internal combustion engine, and that provides for operatively coupling said multi-phase AC generator to said internal combustion engine, responsive to a control signal.

3. A method of recovering power from a flow of exhaust from an internal combustion engine as recited in claim 2, wherein said multi-phase AC generator comprises a multi-phase AC synchronous generator, the number of phases of said multi-phase induction motor is at least three and equal in number to the number of phases of said multi-phase AC synchronous generator, and each phase of said multi-phase induction motor is electrically associated with a corresponding phase of said multi-phase AC synchronous generator.

4. A method of recovering power from a flow of exhaust from an internal combustion engine, comprising:
   a. receiving the flow of exhaust from the internal combustion engine:
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said Multi-phase induction motor with electrical power generated by said multi-phase AC generator; and
   e. operatively mechanically coupling an output shall of said multi-phase induction motor to an output shaft of said internal combustion engine so as to provide for recovering power from said first portion of said flow of exhaust, wherein the operation of operatively mechanically coupling said output shaft of said multi-phase induction motor to said output shaft of said internal combustion engine comprises mechanically coupling said output shaft of said multi-phase induction motor to said output shaft of said internal combustion engine through an electrically-controlled clutch that provides for decoupling said multi-phase AC generator from said internal combustion engine, and that provides for operatively coupling said multi-phase AC generator to said internal combustion engine, responsive to a control signal.

5. A method of recovering power from a flow of exhaust from an internal combustion engine as recited in claim 4, wherein said multi-phase AC generator comprises a multi-phase AC synchronous generator, the number of phases of said multi-phase induction motor is at least three and equal in number to the number of phases of said multi-phase AC synchronous generator, and each phase of said multi-phase induction motor is electrically associated with a corresponding phase of said multi-phase AC synchronous generator.

6. A method of recovering power from a flow of exhaust from an internal combustion engine comprising:
   a. receiving the flow of exhaust from the internal combustion engine;
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said Multi-phase induction motor with electrical power generated by said multi-phase AC generator;
   e. operatively mechanically coupling an output shall of said multi-phase induction motor to an output shaft of said internal combustion engine so as to provide for recovering power from said first portion of said flow of exhaust; and
   operating said multi-phase induction motor at a rotational speed that is lower than a rotational speed of said multi-phase AC generator by an amount greater than might otherwise result from frequency slip, responsive to a difference in a number of poles therebetween.

7. A method of recovering power from a flow of exhaust from an internal combustion engine as recited in claim 6, wherein said multi-phase AC generator comprises a multi-phase AC synchronous generator, the number of phases of said multi-phase induction motor is at least three and equal in number to the number of phases of said multi-phase AC synchronous generator, and each phase of said multi-phase induction motor is electrically associated with a corresponding phase of said multi-phase AC synchronous generator.

8. A method of recovering power from a flow of exhaust from an internal combustion engine, comprising:
   a. receiving the flow of exhaust from the internal combustion engine;
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said Multi-phase induction motor with electrical power generated by said multi-phase AC generator; and
   e. operatively mechanically coupling an output shall of said multi-phase induction motor to an output shaft of said internal combustion engine so as to provide for recovering power from said first portion of said flow of exhaust, wherein at least one of the operations selected from the group consisting of the operation of operatively coupling said electrical output of said multi-phase AC generator to said multi-phase induction motor and the operation of operatively mechanically coupling said output shaft of said multi-phase induction motor to said output shaft of said internal combustion engine provides for decoupling said multi-phase AC generator from said internal combustion engine when either commencing or terminating the operation of recovering said power from said first portion of said flow of exhaust, and provides for operatively coupling said multi-phase AC generator to said internal combustion engine when recovering said power from said first portion of said flow of exhaust.

9. A method of recovering power from a flow of exhaust from an internal combustion engine as recited in claim 8 wherein the operation of commencing the operation of recovering said power from said first portion of said flow of exhaust comprises:
   a. decoupling said multi-phase AC generator from said internal combustion engine;
   b. if not already started, starting said internal combustion engine and running said internal combustion engine at a rated speed;
   c. comparing a first signal responsive to a frequency or rotational speed of said multi-phase AC generator, with a corresponding second signal responsive to a corresponding frequency or rotational speed of said multi-phase induction motor; and
   d. if said first signal is greater than or equal to said second signal, then operatively coupling said multi-phase AC generator to said internal combustion engine so as to provide for said multi-phase AC generator to supply said power to said internal combustion engine.

10. A method of recovering power from a flow of exhaust from an internal combustion engine as recited in claim 8, wherein the operation of terminating the operation of recovering said power from said first portion of said flow of exhaust comprises:
   a. comparing a first signal responsive to a frequency or rotational speed of said multi-phase AC generator, with a corresponding second signal responsive to a corresponding frequency or rotational speed of said multi-phase induction motor; and
   b. if said first signal is less than or equal to said second signal, then decoupling said multi-phase AC generator from said internal combustion engine so as to prevent said multi-phase AC generator from supplying said power to said internal combustion engine.

11. A method of recovering power from a flow of exhaust from an internal combustion engine as recited in claim 8, wherein the operation of terminating the operation of recovering said power from said first portion of said flow of exhaust comprises:
- a. comparing a measure of phase current with a threshold, wherein said measure of phase current is responsive to a measurement of phase current in a conductor that electrically connects a phase of said multi-phase AC generator to a corresponding phase of said multi-phase induction motor; and
- b. if said measure of phase current is less than said threshold, then decoupling said multi-phase AC generator from said internal combustion engine so as to prevent said multi-phase AC generator from supplying said power to said internal combustion engine.

12. A method of recovering power from a flow of exhaust from an internal combustion engine as recited in claim 8, wherein said multi-phase AC generator comprises a multi-phase AC synchronous generator, the number of phases of said multi-phase induction motor is at least three and equal in number to the number of phases of said multi-phase AC synchronous generator, and each phase of said multi-phase induction motor is electrically associated with a corresponding phase of said multi-phase AC synchronous generator.

13. A method of recovering power from a flow of exhaust from an internal combustion engine comprising:
- a. receiving the flow of exhaust from the internal combustion engine;
- b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
- c. driving a multi-phase AC generator with said bladed turbine rotor responsive said first portion of said flow of exhaust, when present, impinging upon said plurality of blades of said bladed turbine rotor;
- d. operatively coupling an electrical output of said multi-phase AC generator to a multi-phase induction motor so as to provide for powering said Multi-phase induction motor with electrical power generated by said multi-phase AC generator; and
- e. operatively mechanically coupling an output shall of said multi-phase induction motor to an output shaft of said internal combustion engine so as to provide for recovering power from said first portion of said flow of exhaust;
- f. charging a battery responsive to a first multi-phase AC source of power from said multi-phase AC generator;
- g. transforming DC power supplied by said battery to a second multi-phase AC source of power;
- h. selectively controlling a flow of said first multi-phase AC source of power from said multi-phase AC generator to said multi-phase induction motor responsive to a mode of operation; and
- i. selectively controlling a flow of said second multi-phase AC source of power to said multi-phase induction motor responsive to said mode of operation, wherein in a first said mode of operation, said multi-phase induction motor is powered exclusively from said second multi-phase AC source of power, in a second said mode of operation, said multi-phase induction motor is powered exclusively from said first multi-phase AC source of power, and in a fourth said mode of operation, said multi-phase induction motor is not powered by either said first multi-phase AC source of power or by said second multi-phase AC source of power.

14. A method of recovering power from a flow of exhaust from an internal combustion engine as recited in claim 13, wherein the number of phases of said multi-phase induction motor is at least three, said number of said phases of said multi-phase induction motor is equal in number to the number of phases of said first multi-phase AC source of power, and said number of said phases of said multi-phase induction motor is equal in number to the number of phases of said second multi-phase AC source of power.

15. A method of recovering power from a flow of exhaust from an internal combustion engine as recited in claim 13, further comprising powering a mobile application selected from the group consisting of a self-propelled mobile vehicle and a self-propelled mobile vessel with said internal combustion engine.

16. A method of recovering power from a flow of exhaust from an internal combustion engine as recited in claim 13, further comprising driving at least one of a mechanical transmission, a hydraulic pump or an electrical generator with an output shaft of said internal combustion engine.

17. A method of recovering power from a flow of exhaust from an internal combustion engine as recited in claim 13, wherein said multi-phase AC generator comprises a multi-phase AC synchronous generator, and each phase of said multi-phase induction motor is electrically associated with a corresponding phase of said multi-phase AC synchronous generator, and said number of said phases of said multi-phase induction motor is at least three and equal in number to the number of phases of said multi-phase AC synchronous generator.

18. A method of recovering power from a flow of exhaust from an internal combustion engine as recited in claim 17, wherein in a third said mode of operation, said multi-phase induction motor is powered by both said first multi-phase AC source of power and by said second multi-phase AC source of power.

19. A method of recovering power from a flow of exhaust from an internal combustion engine as recited in claim 17, wherein said multi-phase AC generator comprises a multi-phase AC permanent-magnet generator.

20. A method of recovering power from a flow of exhaust from an internal combustion engine as recited in claim 13, wherein said multi-phase AC generator comprises a multi-phase AC asynchronous generator, further comprising generating a multi-phase excitation signal, wherein a frequency of said multi-phase excitation signal is responsive to a rotational speed of said multi-phase AC asynchronous generator, and each phase of said multi-phase excitation signal is electrically associated with a corresponding phase of said multi-phase AC asynchronous generator.

21. A method of recovering power from a flow of exhaust from an internal combustion engine as recited in claim 20, wherein in a third said mode of operation, said multi-phase induction motor is powered by both said first multi-phase AC source of power and by said second multi-phase AC source of power.

22. A method of recovering power from a flow of exhaust from an internal combustion engine as recited in claim 13, wherein said multi-phase AC generator comprises a multi-phase AC asynchronous generator, further comprising exciting said multi-phase AC asynchronous generator from said second multi-phase AC source of power.

23. A method of recovering power from a flow of exhaust from an internal combustion engine as recited in claim 13, wherein in a third said mode of operation, said multi-phase induction motor is powered by both said first multi-phase AC source of power and by said second multi-phase AC source of power.

24. A method of recovering power from a flow of exhaust from an internal combustion engine as recited in claim 13, further comprising measuring a first signal responsive to a rotational speed of said multi-phase AC generator, wherein if, responsive to said first signal, said rotational speed of said multi-phase AC generator is greater than a first threshold, then loading said multi-phase AC generator by at least one of the operations of charging said battery from said first multi-phase AC source of power from said multi-phase AC generator, or driving said multi-phase induction motor from said first multi-phase AC source of power from said multi-phase AC generator.

25. A method of recovering power from a flow of exhaust from an internal combustion engine as recited in claim 24, further comprising measuring a second signal responsive to a rotational speed of said multi-phase AC induction motor, wherein if, responsive to said first and second signals, a frequency slip of said first multi-phase AC source of power relative to a frequency corresponding to said rotational speed of said multi-phase AC induction motor is within range to power said multi-phase induction motor from said first multi-phase AC source of power in accordance with an associated motoring mode, then driving said multi-phase induction motor from said first multi-phase AC source of power.

26. A method of recovering power from a flow of exhaust from an internal combustion engine comprising:
   a. receiving the flow of exhaust from the internal combustion engine;
   b. causing a first portion of said flow of exhaust, when present, to impinge upon a plurality of blades of a bladed turbine rotor, wherein said first portion of said flow of exhaust is less than or equal to all of said flow of exhaust from said internal combustion engine;
   c. driving a multi-phase AC generator with said bladed turbine rotor responsive said first portion of said flow of exhaust, when present, impinging upon said plurality of blades of said bladed turbine rotor;
   d. operatively coupling an electrical output of said multi-phase AC generator to a multi-phase induction motor so as to provide for powering said multi-phase induction motor with electrical power generated by said multi-phase AC generator; and
   e. operatively mechanically coupling an output shall of said multi-phase induction motor to an output shaft of said internal combustion engine so as to provide for recovering power from said first portion of said flow of exhaust;
   f. controlling a division of said flow of exhaust from said internal combustion engine between said first portion of said flow of exhaust and a remaining second portion of said flow of exhaust, wherein said remaining second portion of said flow of exhaust is greater than or equal to none of said flow of exhaust, and less than or equal to all of said flow of exhaust;
   g. causing said remaining second portion of said flow of exhaust, if greater than said none of said flow of exhaust, to bypass said plurality of blades of said bladed turbine rotor;
   h. measuring a signal responsive to a rotational speed of said multi-phase AC generator;
   i. if, responsive to said signal, said rotational speed of said multi-phase AC generator is less than a first threshold, then controlling said division of said flow of exhaust so that said remaining second portion of said flow of exhaust includes at most a negligible amount of said flow of exhaust that might flow through a closed wastegate valve at an associated operating condition of said internal combustion engine; and
   j. if, responsive to said signal, said rotational speed of said multi-phase AC generator is greater than a second threshold, then controlling said division of said flow of exhaust so that said remaining second portion of said flow of exhaust includes all of said flow of exhaust received from said internal combustion engine that will flow through an open said wastegate valve at said associated operating condition of said internal combustion engine, wherein said second threshold is greater than or equal to said first threshold.

27. A method of recovering power from a flow of exhaust from an internal combustion engine as recited in claim 26, wherein said multi-phase AC generator comprises a multi-phase AC synchronous generator, the number of phases of said multi-phase induction motor is at least three and equal in number to the number of phases of said multi-phase AC synchronous generator, and each phase of said multi-phase induction motor is electrically associated with a corresponding phase of said multi-phase AC synchronous generator.

* * * * *